United States Patent
Li et al.

(10) Patent No.: US 12,532,349 B2
(45) Date of Patent: Jan. 20, 2026

(54) RANDOM ACCESS METHOD, APPARATUS, AND SYSTEM

(71) Applicant: HUAWEI TECHNOLOGIES CO., LTD., Guangdong (CN)

(72) Inventors: Jiaojiao Li, Beijing (CN); Xi Xie, Beijing (CN); Junren Chang, Beijing (CN); Lei Chen, Beijing (CN); Yingchao Mao, Beijing (CN)

(73) Assignee: Huawei Technologies Co., LTD., Shenzhen (CN)

(*) Notice: Subject to any disclaimer, the term of this patent is extended or adjusted under 35 U.S.C. 154(b) by 313 days.

(21) Appl. No.: 18/344,121

(22) Filed: Jun. 29, 2023

(65) Prior Publication Data

US 2023/0345547 A1  Oct. 26, 2023

Related U.S. Application Data

(63) Continuation of application No. PCT/CN2020/141619, filed on Dec. 30, 2020.

(51) Int. Cl.
H04W 74/00 (2009.01)
H04W 74/0833 (2024.01)
H04W 74/0836 (2024.01)
H04W 74/0838 (2024.01)

(52) U.S. Cl.
CPC ..... *H04W 74/006* (2013.01); *H04W 74/0833* (2013.01); *H04W 74/0836* (2024.01); *H04W 74/0838* (2024.01)

(58) Field of Classification Search
CPC .......... H04W 74/006; H04W 74/0833; H04W 74/0836; H04W 74/0838
See application file for complete search history.

(56) References Cited

U.S. PATENT DOCUMENTS

| 2019/0132882 A1* | 5/2019 | Li ................. H04W 72/23 |
| 2020/0059957 A1 | 2/2020 | Pan et al. |
| 2021/0344405 A1* | 11/2021 | Yuan ............... H04B 7/088 |

(Continued)

FOREIGN PATENT DOCUMENTS

| CN | 111557119 A | 8/2020 |
| CN | 111757488 A | 10/2020 |
| WO | 2020167794 A1 | 8/2020 |

OTHER PUBLICATIONS

3GPP TS 38.211 V16.3.0, "3rd Generation Partnership Project, Technical Specification Group Radio Access Network; NR; Physical channels and modulation(Release 16)," Sep. 2020, 133 pages.

(Continued)

*Primary Examiner* — Kashif Siddiqui
(74) *Attorney, Agent, or Firm* — Fish & Richardson P.C.

(57) ABSTRACT

This disclosure describes a random access method, an apparatus, and a system, to resolve an RNTI conflict during random access of different types of terminal devices or different types of services. An example method includes: sending a random access preamble to a network device on a first random access channel occasion RO, where the first RO corresponds to a first device type and/or a first service type; and listening to physical downlink control information PDCCH scrambled by using a first radio network temporary identifier RNTI associated with the first RO. Calculation of the first RNTI is associated with the first device type and/or the first service type.

16 Claims, 18 Drawing Sheets

(56) References Cited

U.S. PATENT DOCUMENTS

2022/0086915 A1\* 3/2022 Canonne-Velasquez ..................... H04B 7/0695
2022/0124826 A1\* 4/2022 You ..................... H04W 74/002
2022/0174744 A1\* 6/2022 Lin ..................... H04W 74/0833
2022/0279596 A1\* 9/2022 Agiwal ............. H04W 72/0453
2023/0106898 A1 4/2023 Jiang

OTHER PUBLICATIONS

International Search Report and Written Opinion in International Appln. No. PCT/CN2020/141619, mailed on Jul. 28, 2021, 17 pages (with English translation).
Extended European Search Report in European Appln No. 20967590.9, dated Feb. 20, 2024, 10 pages.

\* cited by examiner

RANDOM ACCESS METHOD, APPARATUS, AND SYSTEM

CROSS-REFERENCE TO RELATED APPLICATIONS

This application is a continuation of International Application No. PCT/CN2020/141619, filed on Dec. 30, 2020, the disclosure of which is hereby incorporated by reference in its entirety.

TECHNICAL FIELD

This application relates to the field of communication technologies, and in particular, to a random access method, an apparatus, and a system.

BACKGROUND

In the conventional technology, after a cell search process, a terminal device has obtained downlink synchronization with a cell. Therefore, the terminal device can receive downlink data. However, the terminal device can perform uplink transmission only when the terminal device obtains uplink synchronization with the cell. Currently, the terminal device establishes a connection to the cell and obtains uplink synchronization by using a random access procedure (random access procedure). In the random access procedure, the terminal device sends a preamble (preamble) to a network device on a PRACH resource determined based on a physical random access channel (physical random access channel, PRACH) occasion (PRACH occasion, RO), and attempts to detect, in a random access response (random access response, RAR) window, an RAR scrambled by using a random access radio network temporary identifier (random access RNTI, RA-RNTI)/message B radio network temporary identifier (message B RNTI, MSGB-RNTI) corresponding to the RO.

With different user requirements, current terminal devices are classified into conventional terminal devices and reduced capability (reduced capability, REDCAP) terminal devices. The REDCAP terminal device is a device that has low device complexity and that is used for an industrial wireless sensor, video surveillance, and a wearable device. On one hand, because a capability of the REDCAP terminal device is lower than a capability of the existing conventional terminal device, when the REDCAP terminal device accesses a network, the network may need to provide more resources for the REDCAP terminal device; and the network may reject access of the REDCAP terminal device due to a load or a policy. Therefore, the network needs to identify the REDCAP terminal before the REDCAP terminal accesses the network. In addition, because the capability of the REDCAP terminal device is reduced, the network needs to perform special processing when scheduling the resource for the REDCAP terminal device, for example, scheduling the resource for the REDCAP terminal device within a bandwidth range supported by the REDCAP terminal device. Therefore, the network also needs to identify the REDCAP terminal device before the REDCAP terminal device accesses the network.

In an existing method for identifying a type of a terminal device by a network, an RO of a REDCAP terminal device and an RO of a conventional terminal device need to be staggered in frequency domain to identify the type of the terminal device. In this manner, according to an existing RA-RNTI/MSGB-RNTI calculation rule, when the RO of the REDCAP terminal device and the RO of the conventional terminal device overlap in time domain, an RA-RNTI/MSGB-RNTI corresponding to the RO of the REDCAP terminal device may be the same as an RA-RNTI/MSGB-RNTI corresponding to the RO of the conventional terminal device.

However, when the RA-RNTI/MSGB-RNTI corresponding to the RO of the REDCAP terminal device is the same as the RA-RNTI/MSGB-RNTI corresponding to the RO of the conventional terminal device, both the REDCAP terminal device and the conventional terminal device may first decode an RAR that does not belong to the REDCAP terminal device or the conventional terminal device. Consequently, power waste is caused, and a time for decoding another RAR may conflict with a time for decoding the RAR of the REDCAP terminal device or the conventional terminal device, thereby increasing a failure probability of the random access procedure.

Similarly, when establishing, for example, a small-packet transmission service with a terminal device, a network device and the terminal device also stagger in frequency domain to identify the service. According to a principle similar to that described above, different types of services in the random access procedure also affect each other due to an RA-RNTI/MSGB-RNTI conflict.

Therefore, how to avoid an RNTI conflict between different types of terminal devices or different types of services in a random access procedure is an urgent problem to be resolved currently.

SUMMARY

Embodiments of this application provide a random access method, an apparatus, and a system, to resolve an RNTI conflict during random access of different types of terminal devices or different types of services.

To achieve the foregoing objectives, embodiments of this application use the following technical solutions.

According to a first aspect, a random access method is provided. A communication apparatus for performing the method may be a terminal device, or may be a module used in a terminal device, for example, a chip. The following uses an example in which an execution body is a terminal device for description. The terminal device sends a random access preamble to a network device on a first random access channel occasion RO, where the first RO corresponds to a first device type and/or a first service type. Then, the terminal device listens to a physical downlink control channel PDCCH scrambled by using a first radio network temporary identifier RNTI associated with the first RO. Calculation of the first RNTI is related to the first device type and/or the first service type. Based on the random access method provided in this embodiment of this application, RNTI calculation in this solution is related to a device type and/or a service type of the terminal device, in other words, different terminal device types or service types have different RNTI calculation rules. Therefore, an RNTI conflict caused by using a same RNTI calculation rule for different terminal device types or different service types in the conventional technology is avoided, thereby reducing mutual impact of the different types of terminal devices or the different types of services during random access, and improving a success rate of a random access procedure.

With reference to the first aspect, in a possible design, before the terminal device sends the random access preamble to the network device on the first RO, the random access method provided in this embodiment of this application further includes: The terminal device receives first indication information from the network device, where the first indication information indicates a quantity M of frequency division ROs corresponding to a terminal device of a second device type or a service of a second service type. Based on the method provided in this embodiment of this application, the terminal device may learn of the quantity M of frequency division ROs corresponding to the terminal device of the second device type or the service of the second service type.

According to a second aspect, a random access method is provided. A communication apparatus for performing the method may be a network device, or may be a module used in a network device, for example, a chip. The following uses an example in which an execution body is a network device for description. The network device receives a random access preamble from a terminal device on a first random access channel occasion RO, where the first RO corresponds to a first device type and/or a first service type. Then, the network device sends, to the terminal device, a physical downlink control channel PDCCH scrambled by using a first radio network temporary identifier RNTI associated with the first RO. Calculation of the first RNTI is related to the first device type and/or the first service type. Based on the random access method provided in this embodiment of this application, RNTI calculation in this solution is related to a device type and/or a service type of the terminal device, in other words, different terminal device types or service types have different RNTI calculation rules. Therefore, an RNTI conflict caused by using a same RNTI calculation rule for different terminal device types or different service types in the conventional technology is avoided, thereby reducing mutual impact of the different types of terminal devices or the different types of services during random access, and improving a success rate of a random access procedure.

With reference to the second aspect, in a possible design, before the network device receives, on the first RO, the random access preamble from the terminal device, the random access method provided in this embodiment of this application further includes: The network device sends first indication information to the terminal device, where the first indication information indicates a quantity M of frequency division ROs corresponding to a terminal device of a second device type or a service of a second service type. Based on the method provided in this embodiment of this application, the terminal device may learn of the quantity M of frequency division ROs corresponding to the terminal device of the second device type or the service of the second service type.

With reference to the first aspect or the second aspect, in a possible design, the terminal device of the first device type is a low-capability terminal device, and the service of the first service type is a small-packet transmission service. Based on the method provided in this embodiment of this application, an RNTI conflict between a low-capability terminal device and a terminal device of another device type can be avoided, or an RNTI conflict between a small-packet transmission service and a service of another service type can be avoided. For specific technical effect analysis, refer to the following method embodiments, and details are not described herein again.

With reference to the first aspect or the second aspect, in a possible design, a calculation rule of the first RNTI satisfies the following relationship: $RNTI=1+s\_id+14\times t\_id+14\times 80\times (f\_id+N)+14\times 80\times 8\times ul\_carrier\_id$, where N is an integer greater than 15. Alternatively, $RNTI=1+s\_id+14\times t\_id+14\times 80\times f\_id+14\times 80\times 8\times ul\_carrier\_id+14\times 80\times 8\times G$, where G is an integer greater than 1. Alternatively, $RNTI=1+s\_id+14\times t\_id+14\times 80\times f\_id+14\times 80\times 8\times ul\_carrier\_id+14\times 80\times 8\times 2\times UE\_type$, where a value of UE_type corresponding to the terminal device of the first device type is 1. Alternatively, $RNTI=1+s\_id+14\times t\_id+14\times 80\times f\_id+14\times 80\times 8\times ul\_carrier\_id+14\times 80\times 8\times 2\times service\_type$, where a value of service type corresponding to the service of the first service type is 1. f_id represents a frequency domain index of the first RO, and $0\le f\_id<8$. s_id represents an index of the first orthogonal frequency division multiplexing OFDM symbol of the first RO, and $0\le s\_id<14$. t_id represents an index of the first timeslot of the first RO, and $0\le t\_id<80$. ul_carrier_id represents an uplink UL carrier for transmitting the random access preamble. When the UL carrier is a normal uplink NUL carrier, ul_carrier_id is 0; and when the UL carrier is a supplementary uplink SUL carrier, ul_carrier_id is 1. Based on the method provided in this embodiment of this application, an RNTI conflict caused by using a same RNTI calculation rule for different terminal device types or different service types in the conventional technology can be avoided, thereby reducing mutual impact of the different types of terminal devices or the different types of services during random access, and improving a success rate of a random access procedure. For specific technical effect analysis, refer to the subsequent method embodiments, and details are not described herein again.

With reference to the first aspect or the second aspect, in a possible design, when $RNTI=1+s\_id+14\times t\_id+14\times 80\times (f\_id+N)+14\times 80\times 8\times ul\_carrier\_id$, N is an integer greater than 15 and less than 43. Alternatively, when $RNTI=1+s\_id+14\times t\_id+14\times 80\times f\_id+14\times 80\times 8\times ul\_carrier\_id+14\times 80\times 8\times G$, G is an integer greater than 1 and less than 6. Based on the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided. For specific technical effect analysis, refer to the subsequent method embodiments, and details are not described herein again.

With reference to the first aspect or the second aspect, in a possible design, a calculation rule of the first RNTI satisfies the following relationship: $RNTI=1+s\_id+14\times t\_id+14\times 80\times (f\_id+N)+14\times 80\times 8\times ul\_carrier\_id$, where N is an integer greater than 31. Alternatively, $RNTI=1+s\_id+14\times t\_id+14\times 80\times f\_id+14\times 80\times 8\times ul\_carrier\_id+14\times 80\times 8\times G$, where G is an integer greater than 3. Alternatively, $RNTI=1+s\_id+14\times t\_id+14\times 80\times (f\_id+N)+14\times 80\times 8\times ul\_carrier\_id+14\times 80\times 8\times 2$, where N is an integer greater than 15. Alternatively, $RNTI=1+s\_id+14\times t\_id+14\times 80\times f\_id+14\times 80\times 8\times ul\_carrier\_id+14\times 80\times 8\times 2+14\times 80\times 8\times G$, where G is an integer greater than 1. Alternatively, $RNTI=1+s\_id+14\times t\_id+14\times 80\times f\_id+14\times 80\times 8\times ul\_carrier\_id+14\times 80\times 8\times 2+14\times 80\times 2\times UE\_type$, where a value of UE_type corresponding to the terminal device of the first device type is 1. Alternatively, $RNTI=1+s\_id+14\times t\_id+14\times 80\times f\_id+14\times 80\times 8\times ul\_carrier\_id+14\times 80\times 8\times 2+14\times 80\times 8\times 2\times service\_type$, where a value of service type corresponding to the service of the first service type is 1. fid represents a frequency domain index of the first RO, and $0\le f\_id<8$. s_id represents an index of the first OFDM symbol of the first RO, and $0\le s\_id<14$. t_id represents an index of the first timeslot of the first RO, and $0\le t\_id<80$. ul_carrier_id represents a UL carrier for transmitting the random access preamble. When the UL carrier is an NUL carrier, ul_carrier_id is 0, or when the UL carrier is an SUL carrier, ul_carrier_id is 1. Based on the method provided in this embodiment of this application, an RNTI conflict caused by using a same RNTI calculation rule for different terminal device types or different service types in the conventional technology can be avoided, thereby reducing mutual impact between the different types of terminal devices or the different types of services during random access, and improving a success rate of a random access procedure. For specific technical effect analysis, refer to the subsequent method embodiments, and details are not described herein again.

With reference to the first aspect or the second aspect, in a possible design, when RNTI=1+s_id+14×t_id+14×80×(f_id+N)+14×80×8×ul_carrier_id, N is an integer greater than 31 and less than 43. Alternatively, when RNTI=1+s_id+14×t_id+14×80×f_id+14×80×8×ul_carrier_id+14×80×8×G, G is an integer greater than 3 and less than 6. Alternatively, when RNTI=1+s_id+14×t_id+14×80×(f_id+N)+14×80×8×ul_carrier_id+14×80×8×2, N is an integer greater than 15 and less than 27. Alternatively, when RNTI=1+s_id+14×t_id+14×80×f_id+14×80×8×ul_carrier_id+14×80×8×2+14×80×8×G, G is an integer greater than 1 and less than 4. Based on the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided. For specific technical effect analysis, refer to the subsequent method embodiments, and details are not described herein again.

With reference to the first aspect or the second aspect, in a possible design, a calculation rule of the first RNTI satisfies the following relationship: RNTI=1+s_id+14×t_id+14×80×(f_id+N)+14×80×8×ul_carrier_id, where N is an integer greater than 47. Alternatively, RNTI=1+s_id+14×t_id+14×80×f_id+14×80×8×ul_carrier_id+14×80×8×G, where G is an integer greater than 5. Alternatively, RNTI=1+s_id+14×t_id+14×80×(f_id+N)+14×80×8×ul_carrier_id+14×80×8×2, where N is an integer greater than 31. Alternatively, RNTI=1+s_id+14×t_id+14×80×f_id+14×80×8×ul_carrier_id+14×80×8×2+14×80×8×G, where G is an integer greater than 3. Alternatively, RNTI=1+s_id+14×t_id+14×80×f_id+14×80×8×ul_carrier_id+14×80×8×4+14×80×8×2×UE_typ e, where a value of UE_type corresponding to the terminal device of the first device type is 1. Alternatively, RNTI=1+s_id+14×t_id+14×80×f_id+14×80×8×ul_carrier_id+14×80×8×4+14×80×8×2×service_type, where a value of service type corresponding to the service of the first service type is 1. fid represents a frequency domain index of the first RO, and 0≤f_id<8. s_id represents an index of the first OFDM symbol of the first RO, and 0≤s_id<14. t_id represents an index of the first timeslot of the first RO, and 0≤t_id<80. ul_carrier_id represents a UL carrier for transmitting the random access preamble. When the UL carrier is an NUL carrier, ul_carrier_id is 0, or when the UL carrier is an SUL carrier, ul_carrier_id is 1. Based on the method provided in this embodiment of this application, an RNTI conflict caused by using a same RNTI calculation rule for different terminal device types or different service types in the conventional technology can be avoided, thereby reducing mutual impact between the different types of terminal devices or the different types of services during random access, and improving a success rate of a random access procedure. For specific technical effect analysis, refer to the subsequent method embodiments, and details are not described herein again.

With reference to the first aspect or the second aspect, in a possible design, when the first RNTI is an RNTI, the calculation rule of the first RNTI satisfies the following relationship: RNTI=1+s_id+14×t_id+14×80×(f_id+N)+14×80×8×ul_carrier_id, where N is an integer greater than 7. Alternatively, RNTI=1+s_id+14×t_id+14×80×f_id+14×80×8×ul_carrier_id+14×80×8×G, where G is an integer greater than 0. fid represents a frequency domain index of the first RO, M≤f_id<15, and M is the quantity of frequency division ROs corresponding to the terminal device of the second device type or the service of the second service type. s_id represents the index of the first OFDM symbol of the first RO, and 0≤s_id<14. t_id represents the index of the first timeslot of the first RO, and 0≤t_id<80. ul_carrier_id represents the UL carrier for transmitting the random access preamble. When the UL carrier is an NUL carrier, ul_carrier_id is 0, or when the UL carrier is an SUL carrier, ul_carrier_id is 1. Based on the method provided in this embodiment of this application, an RNTI conflict caused by using a same RNTI calculation rule for different terminal device types or different service types in the conventional technology can be avoided, thereby reducing mutual impact between the different types of terminal devices or the different types of services during random access, and improving a success rate of a random access procedure. For specific technical effect analysis, refer to the subsequent method embodiments, and details are not described herein again.

With reference to the first aspect or the second aspect, in a possible design, when RNTI=1+s_id+14×t_id+14×80×(f_id+N)+14×80×8×ul_carrier_id, N is an integer greater than 7 and less than 35. Alternatively, when RNTI=1+s_id+14×t_id+14×80×f_id+14×80×8×ul_carrier_id+14×80×8×G, G is an integer greater than 0 and less than 5. Based on the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided. For specific technical effect analysis, refer to the subsequent method embodiments, and details are not described herein again.

With reference to the first aspect or the second aspect, in a possible design, when the first RNTI is an RNTI, the calculation rule of the first RNTI satisfies the following relationship: RNTI=1+s_id+14×t_id+14×80×(f_id+N)+14×80×8×ul_carrier_id, where N is an integer greater than 23. Alternatively, RNTI=1+s_id+14×t_id+14×80×f_id+14×80×8×ul_carrier_id+14×80×8×G, where G is an integer greater than 2. Alternatively, RNTI=1+s_id+14×t_id+14×80×(f_id+N)+14×80×8×ul_carrier_id+14×80×8×2, where N is an integer greater than 7. Alternatively, RNTI=1+s_id+14×t_id+14×80×f_id+14×80×8×ul_carrier_id+14×80×8×2+14×80×8×G, where G is an integer greater than 0. fid represents a frequency domain index of the first RO, M≤f_id<15, and M is the quantity of frequency division ROs corresponding to the terminal device of the second device type or the service of the second service type. s_id represents the index of the first OFDM symbol of the first RO, and 0≤s_id<14. t_id represents the index of the first timeslot of the first RO, and 0≤t_id<80. ul_carrier_id represents the UL carrier for transmitting the random access preamble. When the UL carrier is an NUL carrier, ul_carrier_id is 0, or when the UL carrier is an SUL carrier, ul_carrier_id is 1. Based on the method provided in this embodiment of this application, an RNTI conflict caused by using a same RNTI calculation rule for different terminal device types or different service types in the conventional technology can be avoided, thereby reducing mutual impact between the different types of terminal devices or the different types of services during random access, and improving a success rate of a random access procedure. For specific technical effect analysis, refer to the subsequent method embodiments, and details are not described herein again.

With reference to the first aspect or the second aspect, in a possible design, when RNTI=1+s_id+14×t_id+14×80×(f_id+N)+14×80×8×ul_carrier_id, N is an integer greater than 23 and less than 35. Alternatively, when RNTI=1+s_id+14×t_id+14×80×f_id+14×80×8×ul_carrier_id+14×80×8×G, G is an integer greater than 2 and less than 5. Alternatively, when RA-RNTI=1+s_id+14×t_id+14×80×(f_id+N)+14×80×8×ul_carrier_id+14×80×8×2, N is an integer greater than 7 and less than 19. Alternatively, when RNTI=1+s_id+14×t_id+14×80×f_id+14×80×8×ul_carrier_id+14×80×8×2+14×80×8×G, G is an integer greater than 0 and less than 3. Based on the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided. For specific technical effect analysis, refer to the subsequent method embodiments, and details are not described herein again.

With reference to the first aspect or the second aspect, in a possible design, the calculation rule of the first RNTI satisfies the following relationship: RNTI=1+s_id+14×t_id+14×80×(f_id+N)+14×80×8×ul_carrier_id, where N is an integer greater than 39. Alternatively, RNTI=1+s_id+14×t_id+14×80×f_id+14×80×8×ul_carrier_id+14×80×8×G, where G is an integer greater than 4. Alternatively, RNTI=1+s_id+14×t_id+14×80×(f_id+N)+14×80×8×ul_carrier_id+14×80×8×2, where N is an integer greater than 23. Alternatively, RNTI=1+s_id+14×t_id+14×80×f_id+14×80×8×ul_carrier_id+14×80×8×2+14×80×8×G, where G is an integer greater than 2. f_id represents the frequency domain index of the first RO, M≤f_id≤15, and M is the quantity of frequency division ROs corresponding to the terminal device of the second device type or the service of the second service type. s_id represents the index of the first OFDM symbol of the first RO, and 0≤s_id<14. t_id represents the index of the first timeslot of the first RO, and 0≤t_id<80. ul_carrier_id represents the UL carrier for transmitting the random access preamble. When the UL carrier is an NUL carrier, ul_carrier_id is 0, or when the UL carrier is an SUL carrier, ul_carrier_id is 1. Based on the method provided in this embodiment of this application, an RNTI conflict caused by using a same RNTI calculation rule for different terminal device types or different service types in the conventional technology can be avoided, thereby reducing mutual impact between the different types of terminal devices or the different types of services during random access, and improving a success rate of a random access procedure. For specific technical effect analysis, refer to the subsequent method embodiments, and details are not described herein again.

With reference to the first aspect or the second aspect, in a possible design, a capability of a terminal device of the second device type is higher than a capability of a terminal device of the first device type, and a service of the second service type is a service other than a service of the first service type. Based on the method provided in this embodiment of this application, an RNTI conflict caused by using a same RNTI calculation rule for a terminal device of a second device type and a terminal device of a first device type in the conventional technology can be avoided. Alternatively, an RNTI conflict caused by using a same RNTI calculation rule for a service of a second service type and a service of a first service type in the conventional technology can be avoided. In this way, mutual impact of different types of terminal devices or different types of services during random access is reduced, and a success rate of a random access procedure is improved. For specific technical effect analysis, refer to the subsequent method embodiments, and details are not described herein again.

According to a third aspect, a random access method is provided. A communication apparatus for performing the method may be a terminal device, or may be a module used in a terminal device, for example, a chip. The following uses an example in which an execution body is a terminal device for description. The terminal device sends a random access preamble to a network device on a first random access channel occasion RO, where the first RO corresponds to a first device type and/or a first service type. Then, the terminal device listens to a physical downlink control channel PDCCH scrambled by using a first radio network temporary identifier RNTI associated with the first RO. A frequency domain start identifier A of the first RO is equal to M+X, where X is an integer greater than 7, or X is an integer greater than 23, and M is a quantity of frequency division ROs corresponding to a terminal device of a second device type or a service of a second service type. Based on the random access method provided in this embodiment of this application, because a frequency domain numbering rule of a first RO of a terminal device of a first device type or a service of a second service type is changed, frequency domain parameter ranges of ROs corresponding to terminal devices of different device types or services of different service types are different. Therefore, RNTIs that correspond to the terminal devices of different device types or the services of service types and that are determined based on frequency domain parameters of the ROs are also different, thereby avoiding an RNTI conflict between different terminal device types or different service types in the conventional technology. In this way, mutual impact of the different types of terminal devices or the different types of services during random access is reduced, and a success rate of a random access procedure is improved.

With reference to the third aspect, in a possible design, before the terminal device sends the random access preamble to the network device on the first RO, the random access method provided in this embodiment of this application further includes: The terminal device receives first indication information from the network device, where the first indication information indicates a terminal device of the quantity M of frequency division ROs corresponding to the terminal device of the second device type or the service of the second service type. Based on the method provided in this embodiment of this application, the terminal device may learn the quantity M of frequency division ROs corresponding to the terminal device of the second device type or the service of the second service type.

According to a fourth aspect, a random access method is provided. A communication apparatus for executing the method may be a network device, or may be a module used in a network device, for example, a chip. The following uses an example in which an execution body is a network device for description. The network device receives a random access preamble from a terminal device on a first random access channel occasion RO, where the first RO corresponds to a first device type and/or a first service type. Then, the network device sends, to the terminal device, a physical downlink control channel PDCCH scrambled by using a first radio network temporary identifier RNTI associated with the first RO. A frequency domain start identifier A of the first RO is equal to M+X, where X is an integer greater than 7, or X is an integer greater than 23, and M is a quantity of frequency division ROs corresponding to a terminal device of a second device type or a service of a second service type. Based on the method provided in this embodiment of this application, because a frequency domain numbering rule of the first RO of the terminal device of the first device type or the service of the second service type is changed, frequency domain parameter ranges of ROs corresponding to terminal devices of different device types or services of different service types are different. Therefore, RNTIs that correspond to the terminal devices of different device types or the services of different service types and that are determined based on frequency domain parameters of the ROs are also different, thereby avoiding an RNTI conflict between different terminal device types or service types in the conventional technology. In this way, mutual impact of the different types of terminal devices or the different types of services during random access is reduced, and a success rate of a random access procedure is improved.

With reference to the fourth aspect, in a possible design, before the network device receives, on the first RO, the random access preamble from the terminal device, the random access method provided in this embodiment of this application further includes: The network device sends first indication information to the terminal device, where the first indication information indicates the quantity M of frequency division ROs corresponding to the terminal device of the second device type or the service of the second service type. Based on the method provided in this embodiment of this application, the terminal device may learn the quantity M of frequency division ROs corresponding to the terminal device of the second device type or the service of the second service type.

With reference to the third aspect or the fourth aspect, in a possible design, the terminal device of the first device type is a low-capability terminal device, and the service of the first service type is a small-packet transmission service. A capability of a terminal device of the second device type is higher than a capability of a terminal device of the first device type, and a service of the second service type is a service other than a service of the first service type. Based on the method provided in this embodiment of this application, an RNTI conflict between a low-capability terminal device and a terminal device whose capability is higher than that of the low-capability device can be avoided, or an RNTI conflict between a small-packet transmission service and a service of another service type can be avoided. For specific technical effect analysis, refer to the subsequent method embodiment, and details are not described herein again.

With reference to the third aspect or the fourth aspect, in a possible design, X is an integer greater than 7 and less than 35, or X is an integer greater than 23 and less than 35. Based on the method provided in this embodiment of this application, an RNTI conflict of different terminal device types or different service types can be avoided, and a case in which an RNTI value exceeds a value range of an RNTI defined in the conventional technology can be avoided. For specific technical effect analysis, refer to the subsequent method embodiments, and details are not described herein again.

According to a fifth aspect, a random access method is provided. A communication apparatus for performing the method may be a terminal device, or may be a module used in a terminal device, for example, a chip. The following uses an example in which an execution body is a terminal device for description. The terminal device sends a random access preamble to a network device on a first random access channel occasion RO, where the first RO corresponds to a first device type and/or a first service type. Then, the terminal device listens to a physical downlink control channel PDCCH scrambled by using a first radio network temporary identifier RNTI associated with the first RO. The first RNTI is determined based on a second RNTI, the second RNTI is a value other than an RNTI associated with a second RO, and the second RO is an RO configured for a second device type and/or a second service type. Based on the method provided in this embodiment of this application, the first RNTI associated with the first RO of the terminal device of the first device type and/or the service of the first service type is determined based on an idle RNTI other than the RNTI associated with the second RO, in other words, there is a correspondence between the first RNTI used to scramble the PDCCH and the idle RNTI corresponding to a terminal device of the second device type or a service of the second service type. Therefore, an RNTI conflict caused by using a same RNTI calculation rule for different terminal device types or different service types in the conventional technology is avoided, thereby reducing mutual impact of different types of terminal devices or different types of services during random access, and improving a success rate of a random access procedure.

According to a sixth aspect, a random access method is provided. A communication apparatus for executing the method may be a network device, or may be a module used in a network device, for example, a chip. The following uses an example in which an execution body is a network device for description. The network device receives a random access preamble from a terminal device on a first random access channel occasion RO, where the first RO corresponds to a first device type and/or a first service type. The network device sends, to the terminal device, a physical downlink control channel PDCCH scrambled by using a first radio network temporary identifier RNTI associated with the first RO. The first RNTI is determined based on a second RNTI, the second RNTI is a value other than an RNTI associated with a second RO, and the second RO is an RO configured for a second device type and/or a second service type. Based on the method provided in this embodiment of this application, the first RNTI associated with the first RO of the terminal device of the first device type and/or the service of the first service type is determined based on an idle RNTI other than the RNTI associated with the second RO, in other words, there is a correspondence between the first RNTI used to scramble the PDCCH and an idle RNTI that is not used by a terminal device of the second device type or a service of the second service type. Therefore, an RNTI conflict caused by using a same RNTI calculation rule for different terminal device types or different service types in the conventional technology is avoided, thereby reducing mutual impact of different types of terminal devices or different types of services during random access, and improving a success rate of a random access procedure.

With reference to the fifth aspect or the sixth aspect, in a possible design, the terminal device of the first device type is a low-capability terminal device, and the service of the first service type is a small-packet transmission service. A capability of the terminal device of the second device type is higher than a capability of the terminal device of the first device type, and the service of the second service type is a service other than the service of the first service type. Based on the method provided in this embodiment of this application, an RNTI conflict between a low-capability terminal device and a terminal device whose capability is higher than that of the low-capability device can be avoided, or an RNTI conflict between a small-packet transmission service and a service of another service type can be avoided. For specific technical effect analysis, refer to the subsequent method embodiment, and details are not described herein again.

With reference to the fifth aspect or the sixth aspect, in a possible design, that the first RNTI is determined based on a second RNTI includes: The first RNTI is determined based on the second RNTI and a third RNTI, and the third RNTI is an RNTI determined based on the first RO and a calculation rule. Based on the method provided in this embodiment of this application, because the third RNTI determined based on the calculation rule and the first RO is further considered when the first RNTI is determined in this embodiment of this application, the correspondence between the first RNTI used to scramble the PDCCH and the idle RNTI corresponding to the terminal device of the second device type or the service of the second service type is more reasonable and easy to understand.

With reference to the fifth aspect or the sixth aspect, in a possible design, that the first RNTI is determined based on the second RNTI and a third RNTI includes: The first RNTI is a value of the second RNTI when an index of the second RNTI corresponds to the third RNTI. Based on the method provided in this embodiment of this application, only one third RNTI needs to be determined, and the corresponding first RNTI can be determined based on a value of the third RNTI and a value of the index of the second RNTI. Therefore, an operation amount of the terminal in a random access procedure is reduced.

With reference to the fifth aspect or the sixth aspect, in a possible design, that the first RNTI is determined based on the second RNTI and a third RNTI includes: The first RNTI is a value of the second RNTI when an index of the second RNTI corresponds to an index of the third RNTI. Based on the method provided in this embodiment of this application, the first RNTI may be determined based on a correspondence between the index of the second RNTI and the third RNTI, and values of the second RNTIs used to determine the first RNTI are as centralized as possible. Therefore, expanding of the first RNTI value range is avoided as much as possible.

With reference to the fifth aspect or the sixth aspect, in a possible design, the calculation rule of the third RNTI satisfies the following relationship: RNTI=1+s_id+14×t_id+ 14×80×f_id+14×80×8×ul_carrier_id. Alternatively, RNTI=1+s_id+14×t_id+14×80×f_id+14×80×8×ul_carrier_id+14×80×8×2. Alternatively, RNTI=1+s_id+14×t_id+ 14×80×(f_id+N)+14×80×8×ul_carrier_id, where N is an integer greater than 47. Alternatively, RNTI=1+s_id+14× t_id+14×80×f_id+14×80×8×ul_carrier_id+14×80×8×G, where G is an integer greater than 5. Alternatively, RNTI=1+ s_id+14×t_id+14×80×(f_id+N)+14×80×8×ul_carrier_id+ 14×80×8×2, where N is an integer greater than 31. Alternatively, RNTI=1+s_id+14×t_id+14×80×f_id+14×80×8× ul_carrier_id+14×80×8×2+14×80×8×G, where G is an integer greater than 3. Alternatively, RNTI=1+s_id+14× t_id+14×80×f_id+14×80×8×ul_carrier_id+14×80×8×4+14× 80×8×2×UE_type, where a value of UE_type corresponding to the terminal device of the first device type is 1. Alternatively, RNTI=1+s_id+14×t_id+14×80×f_id+14×80×8×ul_ carrier_id+14×80×8×4+14×80×8×2×service_type, where a value of service type corresponding to the service of the first service type is 1. f_id represents a frequency domain index of the first RO, and 0≤f_id<8. s_id represents an index of the first orthogonal frequency division multiplexing OFDM symbol of the first RO, and 0≤s_id<14. t_id represents an index of the first timeslot of the first RO, and 0≤t_id<80. ul_carrier_id represents an uplink UL carrier for transmitting the random access preamble. When the UL carrier is a normal uplink NUL carrier, ul_carrier_id is 0, and when the UL carrier is a supplementary uplink SUL carrier, ul_carrier_id is 1. Based on the method provided in this embodiment of this application, the third RNTI may be determined based on a parameter of the first RO, and the first RNTI is an RNTI associated with the first RO. Therefore, when the first RNTI is determined based on the third RNTI obtained through calculation, a relationship between the third RNTI and the first RNTI is clearer.

With reference to the fifth aspect or the sixth aspect, in a possible design, a set of RNTIs available for random access is RNTI_S1. A set of RNTIs associated with the second RO is RNTI-S2. A set of second RNTIs is RNTI-S3. That the first RNTI is determined based on the second RNTI, and that the second RNTI is a value other than an RNTI associated with the second RO includes: RNTI-S3 satisfies the following relationship: RNTI_S3=$C_{RNTI\_S1}$(RNTI_S2), where $C_{RNTI\_S1}$(RNTI_S2) represents a complementary set of RNTI-S2 in RNTI_S1. Based on the method provided in this embodiment of this application, the first RNTI may be determined from the RNTI values available for random access, where the first RNTI is an idle RNTI not used by the terminal device of the second device type or the service of the second service type. Therefore, a conflict between the first RNTI and an RNTI corresponding to the terminal device of the second device type or the service of the second service type can be avoided. In addition, the first RNTI is an RNTI available for random access.

With reference to the fifth aspect or the sixth aspect, in a possible design, that the first RNTI is the value of the second RNTI when the index of the second RNTI corresponds to the third RNTI includes: The first RNTI is a value of RNTI_S3 (k) when k=RNTI_S4(m). Alternatively, the first RNTI is a value of RNTI_S3(k) when k=(RNTI_S4(m)−−1). RNTI_S3(k) is the second RNTI, and RNTI_S3(k)∈RNTI_S3. k=1, . . . , N3, where k represents an index of the second RNTI in the set RNTI_S3. N3 is a quantity of second RNTIs included in the set RNTI_S3. RNTI_S4(m) is a third RNTI, and RNTI_S4(m)∈RNTI_S4. m=1, . . . N4, where m represents an index of the third RNTI in the set RNTI_S4. N4 is a quantity of third RNTIs included in the set RNTI_S4. Based on the method provided in this embodiment of this application, values of the second RNTI and values of the third RNTI and how to determine the first RNTI may be represented in a form of elements in a mathematical set, so that a process of determining the first RNTI is clearer and more intuitive.

With reference to the fifth aspect or the sixth aspect, in a possible design, that the first RNTI is the value of the second RNTI when the index of the second RNTI corresponds to the index of the third RNTI includes: The first RNTI is a value of RNTI_S3(k) when k=m. Alternatively, the first RNTI is a value of RNTI_S3(k) when k=(N3−m). RNTI_S3(k) is the second RNTI, and RNTI_S3(k)∈RNTI_S3. k=1, . . . , N3, where k represents an index of the second RNTI in the set RNTI_S3. N3 is a quantity of second RNTIs included in the set RNTI_S3; m=1, . . . N4, where m represents an index of the third RNTI in the set RNTI_S4. N4 is a quantity of third RNTIs included in the set RNTI_S4. The third RNTI is RNTI_S4 (m), and RNTI_S4(m)∈RNTI_S4. Based on the method provided in this embodiment of this application, values of the second RNTI and values of the third RNTI and how to determine the first RNTI may be represented in a form of elements in a mathematical set, so that a process of determining the first RNTI is clearer and more intuitive.

According to a seventh aspect, a communication apparatus is provided, configured to implement the foregoing method. The communication apparatus includes a corresponding module, unit, or means (means) for implementing the foregoing method. The module, unit, or means may be implemented by hardware, software, or hardware executing corresponding software. The hardware or software includes one or more modules or units corresponding to the foregoing functions.

With reference to the seventh aspect, in a possible implementation, the communication apparatus includes: a transceiver module and a processing module. The transceiver module is configured to send a random access preamble to a network device on a first random access channel occasion RO, where the first RO corresponds to a first device type and/or a first service type. The processing module is configured to listen to a physical downlink control channel PDCCH scrambled by using a first radio network temporary identifier RNTI associated with the first RO. Calculation of the first RNTI is related to the first device type and/or the first service type.

With reference to the seventh aspect, in a possible implementation, the processing module may be a processor, and the transceiver module may be a transceiver.

With reference to the seventh aspect, in a possible implementation, the transceiver module is further configured to receive first indication information from a network device, where the first indication information indicates a quantity M of frequency division ROs corresponding to a terminal device of a second device type or a service of a second service type.

According to an eighth aspect, a communication apparatus is provided, configured to implement the foregoing method. The communication apparatus includes a corresponding module, unit, or means (means) for implementing the foregoing method. The module, unit, or means may be implemented by hardware, software, or hardware executing corresponding software. The hardware or software includes one or more modules or units corresponding to the foregoing functions.

With reference to the eighth aspect, in a possible implementation, the communication apparatus includes: a receiving module and a sending module. The receiving module is configured to receive a random access preamble from a terminal device on a first random access channel occasion RO, where the first RO corresponds to a first device type and/or a first service type. The sending module is configured to send, to the terminal device, a physical downlink control channel PDCCH scrambled by using a first radio network temporary identifier RNTI associated with the first RO. Calculation of the first RNTI is related to the first device type and/or the first service type.

With reference to the eighth aspect, in a possible implementation, the receiving module or the sending module may be a transceiver.

With reference to the seventh aspect, in a possible implementation, the sending module is further configured to send first indication information to the network device, where the first indication information indicates the quantity M of frequency division ROs corresponding to the terminal device of the second device type or the service of the second service type.

With reference to the seventh aspect or the eighth aspect, in a possible implementation, the terminal device of the first device type is a low-capability terminal device, and the service of the first service type is a small-packet transmission service.

With reference to the seventh aspect or the eighth aspect, in a possible implementation, a calculation rule of the first RNTI satisfies the following relationship: $RNTI=1+s\_id+14\times t\_id+14\times 80\times(f\_id+N)+14\times 80\times 8\times ul\_carrier\_id$, where N is an integer greater than 15. Alternatively, $RNTI=1+s\_id+14\times t\_id+14\times 80\times f\_id+14\times 80\times 8\times ul\_carrier\_id+14\times 80\times 8\times G$, where G is an integer greater than 1. Alternatively, $RNTI=1+s\_id+14\times t\_id+14\times 80\times f\_id+14\times 80\times 8\times ul\_carrier\_id+14\times 80\times 8\times 2\times UE\_type$, where a value of UE_type corresponding to the terminal device of the first device type is 1. Alternatively, $RNTI=1+s\_id+14\times t\_id+14\times 80\times f\_id+14\times 80\times 8\times ul\_carrier\_id+14\times 80\times 8\times 2\times service\_type$, where a value of service type corresponding to a service of the first service type is 1. f_id represents a frequency domain index of the first RO, and $0\leq f\_id<8$. s_id represents an index of the first orthogonal frequency division multiplexing OFDM symbol of the first RO, and $0\leq s\_id<14$. t_id represents an index of the first timeslot of the first RO, and $0\leq t\_id<80$. ul_carrier_id represents an uplink UL carrier for transmitting the random access preamble. When the UL carrier is a normal uplink NUL carrier, ul_carrier_id is 0, and when the UL carrier is a supplementary uplink SUL carrier, ul_carrier_id is 1.

With reference to the seventh aspect or the eighth aspect, in a possible implementation, when $RNTI=1+s\_id+14\times t\_id+14\times 80\times(f\_id+N)+14\times 80\times 8\times ul\_carrier\_id$, N is an integer greater than 15 and less than 43. Alternatively, when $RNTI=1+s\_id+14\times t\_id+14\times 80\times f\_id+14\times 80\times 8\times ul\_carrier\_id+14\times 80\times 8\times G$, G is an integer greater than 1 and less than 6.

With reference to the seventh aspect or the eighth aspect, in a possible implementation, a calculation rule of the first RNTI satisfies the following relationship: $RNTI=1+s\_id+14\times t\_id+14\times 80\times(f\_id+N)+14\times 80\times 8\times ul\_carrier\_id$, where N is an integer greater than 31. Alternatively, $RNTI=1+s\_id+14\times t\_id+14\times 80\times f\_id+14\times 80\times 8\times ul\_carrier\_id+14\times 80\times 8\times G$, where G is an integer greater than 3. Alternatively, $RNTI=1+s\_id+14\times t\_id+14\times 80\times(f\_id+N)+14\times 80\times 8\times ul\_carrier\_id+14\times 80\times 8\times 2$, where N is an integer greater than 15. Alternatively, $RNTI=1+s\_id+14\times t\_id+14\times 80\times f\_id+14\times 80\times 8\times ul\_carrier\_id+14\times 80\times 8\times 2+14\times 80\times 8\times G$, where G is an integer greater than 1. Alternatively, $RNTI=1+s\_id+14\times t\_id+14\times 80\times f\_id+14\times 80\times 8\times ul\_carrier\_id+14\times 80\times 8\times 2+14\times 80\times 8\times 2\times UE\_typ\ e$, where a value of UE_type corresponding to the terminal device of the first device type is 1. Alternatively, $RA\text{-}RNTI=1+s\_id+14\times t\_id+14\times 80\times f\_id+14\times 80\times 8\times ul\_carrier\_id+14\times 80\times 8\times 2+14\times 80\times 8\times 2\times service\_type$, where a value of service type corresponding to the service of the first service type is 1. f_id represents a frequency domain index of the first RO, and $0\leq f\_id<8$. s_id represents an index of the first OFDM symbol of the first RO, and $0\leq s\_id<14$. t_id represents an index of the first timeslot of the first RO, and $0\leq t\_id<80$. ul_carrier_id represents a UL carrier for transmitting the random access preamble. When the UL carrier is an NUL carrier, ul_carrier_id is 0, or when the UL carrier is an SUL carrier, ul_carrier_id is 1.

With reference to the seventh aspect or the eighth aspect, in a possible implementation, when $RNTI=1+s\_id+14\times t\_id+14\times 80\times(f\_id+N)+14\times 80\times 8\times ul\_carrier\_id$, N is an integer greater than 31 and less than 43. Alternatively, when $RNTI=1+s\_id+14\times t\_id+14\times 80\times f\_id+14\times 80\times 8\times ul\_carrier\_id+14\times 80\times 8\times G$, G is an integer greater than 3 and less than 6. Alternatively, when $RNTI=1+s\_id+14\times t\_id+14\times 80\times$ (f_id+N)+14×80×8×ul_carrier_id+14×80×8×2, N is an integer greater than 15 and less than 27. Alternatively, when RNTI=1+s_id+14×t_id+14×80×f_id+14×80×8×ul_carrier_id+14×80×8×2+14×80×8×G, G is an integer greater than 1 and less than 4.

With reference to the seventh aspect or the eighth aspect, in a possible implementation, a calculation rule of the first RNTI satisfies the following relationship: RNTI=1+s_id+14×t_id+14×80×(f_id+N)+14×80×8×ul_carrier_id, where N is an integer greater than 47. Alternatively, RNTI=1+s_id+14×t_id+14×80×f_id+14×80×8×ul_carrier_id+14×80×8×G, where G is an integer greater than 5. Alternatively, RNTI=1+s_id+14×t_id+14×80×(f_id+N)+14×80×8×ul_carrier_id+14×80×8×2, where N is an integer greater than 31. Alternatively, RNTI=1+s_id+14×t_id+14×80×f_id+14×80×8×ul_carrier_id+14×80×8×2+14×80×8×G, where G is an integer greater than 3. Alternatively, RNTI=1+s_id+14×t_id+14×80×f_id+14×80×8×ul_carrier_id+14×80×8×4+14×80×8×2×UE_typ e, where a value of UE_type corresponding to the terminal device of the first device type is 1. Alternatively, RNTI=1+s_id+14×t_id+14×80×f_id+14×80×8×ul_carrier_id+14×80×8×4+14×80×8×2×service type, where a value of service type corresponding to the service of the first service type is 1. f_id represents a frequency domain index of the first RO, and 0≤f_id<8. s_id represents an index of the first OFDM symbol of the first RO, and 0≤s_id<14. t_id represents an index of the first timeslot of the first RO, and 0≤t_id<80. ul_carrier_id represents a UL carrier for transmitting the random access preamble. When the UL carrier is an NUL carrier, ul_carrier_id is 0, or when the UL carrier is an SUL carrier, ul_carrier_id is 1.

With reference to the seventh aspect or the eighth aspect, in a possible implementation, a calculation rule of the first RNTI satisfies the following relationship: RNTI=1+s_id+14×t_id+14×80×(f_id+N)+14×80×8×ul_carrier_id, where N is an integer greater than 7. Alternatively, RNTI=1+s_id+14×t_id+14×80×f_id+14×80×8×ul_carrier_id+14×80×8×G, where G is an integer greater than 0. f_id represents a frequency domain index of the first RO, M≤f_id≤15, and M is a quantity of frequency division ROs corresponding to the terminal device of the second device type or the service of the second service type. s_id represents an index of the first OFDM symbol of the first RO, and 0≤s_id<14. t_id represents an index of the first timeslot of the first RO, and 0≤t_id<80. ul_carrier_id represents a UL carrier for transmitting the random access preamble. When the UL carrier is an NUL carrier, ul_carrier_id is 0, or when the UL carrier is an SUL carrier, ul_carrier_id is 1.

With reference to the seventh aspect or the eighth aspect, in a possible implementation, when RNTI=1+s_id+14×t_id+14×80×(f_id+N)+14×80×8×ul_carrier_id, N is an integer greater than 7 and less than 35. Alternatively, when RNTI=1+s_id+14×t_id+14×80×f_id+14×80×8×ul_carrier_id+14×80×8×G, G is an integer greater than 0 and less than 5.

With reference to the seventh aspect or the eighth aspect, in a possible implementation, a calculation rule of the first RNTI satisfies the following relationship: RNTI=1+s_id+14×t_id+14×80×(f_id+N)+14×80×8×ul_carrier_id, where N is an integer greater than 23. Alternatively, RNTI=1+s_id+14×t_id+14×80×f_id+14×80×8×ul_carrier_id+14×80×8×G, where G is an integer greater than 2. Alternatively, RNTI=1+s_id+14×t_id+14×80×(f_id+N)+14×80×8×ul_carrier_id+14×80×8×2, where N is an integer greater than 7. Alternatively, RNTI=1+s_id+14×t_id+14×80×f_id+14×80×8×ul_carrier_id+14×80×8×2+14×80×8×G, where G is an integer greater than 0. f_id represents a frequency domain index of the first RO, M≤f_id≤15, and M is a quantity of frequency division ROs corresponding to the terminal device of the second device type or the service of the second service type. s_id represents an index of the first OFDM symbol of the first RO, and 0≤s_id<14. t_id represents an index of the first timeslot of the first RO, and 0≤t_id<80. ul_carrier_id represents a UL carrier for transmitting the random access preamble. When the UL carrier is an NUL carrier, ul_carrier_id is 0, or when the UL carrier is an SUL carrier, ul_carrier_id is 1.

With reference to the seventh aspect or the eighth aspect, in a possible implementation, when RNTI=1+s_id+14×t_id+14×80×(f_id+N)+14×80×8×ul_carrier_id, N is an integer greater than 23 and less than 35. Alternatively, when RNTI=1+s_id+14×t_id+14×80×f_id+14×80×8×ul_carrier_id+14×80×8×G, G is an integer greater than 2 and less than 5. Alternatively, when RNTI=1+s_id+14×t_id+14×80×(f_id+N)+14×80×8×ul_carrier_id+14×80×8×2, N is an integer greater than 7 and less than 19. Alternatively, when RNTI=1+s_id+14×t_id+14×80×f_id+14×80×8×ul_carrier_id+14×80×8×2+14×80×8×G, G is an integer greater than 0 and less than 3.

With reference to the seventh aspect or the eighth aspect, in a possible implementation, a calculation rule of the first RNTI satisfies the following relationship: RNTI=1+s_id+14×t_id+14×80×(f_id+N)+14×80×8×ul_carrier_id, where N is an integer greater than 39. Alternatively, RNTI=1+s_id+14×t_id+14×80×f_id+14×80×8×ul_carrier_id+14×80×8×G, where G is an integer greater than 4. Alternatively, RNTI=1+s_id+14×t_id+14×80×(f_id+N)+14×80×8×ul_carrier_id+14×80×8×2, where N is an integer greater than 23. Alternatively, RNTI=1+s_id+14×t_id+14×80×f_id+14×80×8×ul_carrier_id+14×80×8×2+14×80×8×G, where G is an integer greater than 2. f_id represents a frequency domain index of the first RO, M≤f_id≤15, and M is a quantity of frequency division ROs corresponding to the terminal device of the second device type or the service of the second service type. s_id represents an index of the first OFDM symbol of the first RO, and 0≤s_id<14. t_id represents an index of the first timeslot of the first RO, and 0≤t_id<80. ul_carrier_id represents a UL carrier for transmitting the random access preamble. When the UL carrier is an NUL carrier, ul_carrier_id is 0, or when the UL carrier is an SUL carrier, ul_carrier_id is 1.

With reference to the seventh aspect or the eighth aspect, in a possible implementation, a capability of the terminal device of the second device type is higher than a capability of the terminal device of the first device type, and the service of the second service type is a service other than the service of the first service type.

For technical effects brought by any possible implementation of the seventh aspect or the eighth aspect, refer to technical effects brought by different implementations of the first aspect or the second aspect. Details are not described herein again.

According to a ninth aspect, a communication apparatus is provided, configured to implement the foregoing method. The communication apparatus includes a corresponding module, unit, or means (means) for implementing the foregoing method. The module, unit, or means may be implemented by hardware, software, or hardware executing corresponding software. The hardware or software includes one or more modules or units corresponding to the foregoing functions.

With reference to the ninth aspect, in a possible implementation, the communication apparatus includes: a transceiver module and a processing module. The transceiver module is configured to send a random access preamble to a network device on a first random access channel occasion RO, where the first RO corresponds to a first device type and/or a first service type. The processing module is configured to listen to a physical downlink control channel PDCCH scrambled by using a first radio network temporary identifier RNTI associated with the first RO. A frequency domain start identifier A of the first RO is equal to M+X, and X is an integer greater than or equal to 7, or X is an integer greater than 23. M is a quantity of frequency division ROs corresponding to a terminal device of a second device type or a service of a second service type.

With reference to the ninth aspect, in a possible implementation, the processing module may be a processor, and the transceiver module may be a transceiver.

With reference to the ninth aspect, in a possible implementation, the transceiver module is further configured to receive first indication information from the network device, where the first indication information indicates the quantity M of frequency division ROs corresponding to the terminal device of the second device type or the service of the second service type.

According to a tenth aspect, a communication apparatus is provided, configured to implement the foregoing method. The communication apparatus includes a corresponding module, unit, or means (means) for implementing the foregoing method. The module, unit, or means may be implemented by hardware, software, or hardware executing corresponding software. The hardware or software includes one or more modules or units corresponding to the foregoing functions.

With reference to the tenth aspect, in a possible implementation, the communication apparatus includes: a receiving module and a sending module. The receiving module is configured to receive a random access preamble from a terminal device on a first random access channel occasion RO, where the first RO corresponds to a first device type and/or a first service type. The sending module is configured to send, to the terminal device, a physical downlink control channel PDCCH scrambled by using a first radio network temporary identifier RNTI associated with the first RO. A frequency domain start identifier A of the first RO is equal to M+X, and X is an integer greater than 7, or X is an integer greater than 23. M is a quantity of frequency division ROs corresponding to a terminal device of a second device type or a service of a second service type.

With reference to the tenth aspect, in a possible implementation, the receiving module or the sending module may be a transceiver.

With reference to the tenth aspect, in a possible implementation, the sending module is further configured to send first indication information to the terminal device, where the first indication information indicates the quantity M of frequency division ROs corresponding to the terminal device of the second device type or the service of the second service type.

With reference to the ninth aspect or the tenth aspect, in a possible implementation, the terminal device of the first device type is a low-capability terminal device, and the service of the first service type is a small-packet transmission service. A capability of the terminal device of the second device type is higher than a capability of the terminal device of the first device type, and the service of the second service type is a service other than the service of the first service type.

With reference to the ninth aspect or the tenth aspect, in a possible implementation, X is an integer greater than 7 and less than 35, or X is an integer greater than 23 and less than 35.

For technical effects brought by any possible implementation of the ninth aspect or the tenth aspect, refer to technical effects brought by different implementations of the third aspect or the fourth aspect. Details are not described herein again.

According to an eleventh aspect, a communication apparatus is provided, configured to implement the foregoing method. The communication apparatus includes a corresponding module, unit, or means (means) for implementing the foregoing method. The module, unit, or means may be implemented by hardware, software, or hardware executing corresponding software. The hardware or software includes one or more modules or units corresponding to the foregoing functions.

With reference to the eleventh aspect, in a possible implementation, the communication apparatus includes: a transceiver module and a processing module. The transceiver module is configured to send a random access preamble to a network device on a first random access channel occasion RO, where the first RO corresponds to a first device type and/or a first service type. The processing module is configured to listen to physical downlink control information PDCCH scrambled by using a first radio network temporary identifier RNTI associated with the first RO. The first RNTI is determined based on a second RNTI, the second RNTI is a value other than an RNTI associated with a second RO, and the second RO is an RO configured for a second device type and/or a second service type.

With reference to the eleventh aspect, in a possible implementation, the processing module may be a processor, and the transceiver module may be a transceiver.

According to a twelfth aspect, a communication apparatus is provided, configured to implement the foregoing method. The communication apparatus includes a corresponding module, unit, or means (means) for implementing the foregoing method. The module, unit, or means may be implemented by hardware, software, or hardware executing corresponding software. The hardware or software includes one or more modules or units corresponding to the foregoing functions.

With reference to the twelfth aspect, in a possible implementation, the communication apparatus includes: a receiving module and a sending module. The receiving module is configured to receive a random access preamble from a terminal device on a first random access channel occasion RO, where the first RO corresponds to a first device type and/or a first service type. The sending module is configured to send, to a terminal device, a physical downlink control channel PDCCH scrambled by using a first radio network temporary identifier RNTI associated with the first RO. The first RNTI is determined based on a second RNTI, the second RNTI is a value other than an RNTI associated with a second RO, and the second RO is an RO configured for a second device type and/or a second service type.

With reference to the twelfth aspect, in a possible implementation, the receiving module or the sending module may be a transceiver.

With reference to the eleventh aspect or the twelfth aspect, in a possible implementation, the terminal device of the first device type is a low-capability terminal device, and the service of the first service type is a small-packet transmission service. A capability of the terminal device of the second device type is higher than a capability of the terminal device of the first device type, and the service of the second service type is a service other than the service of the first service type.

With reference to the eleventh aspect or the twelfth aspect, in a possible implementation, that the first RNTI is determined based on a second RNTI includes: The first RNTI is determined based on the second RNTI and a third RNTI, and the third RNTI is an RNTI determined based on a calculation rule and the first RO.

With reference to the eleventh aspect or the twelfth aspect, in a possible implementation, that the first RNTI is determined based on the second RNTI and a third RNTI includes: The first RNTI is a value of the second RNTI when an index of the second RNTI corresponds to the third RNTI.

With reference to the eleventh aspect or the twelfth aspect, in a possible implementation, that the first RNTI is determined based on the second RNTI and a third RNTI includes: The first RNTI is a value of the second RNTI when an index of the second RNTI corresponds to an index of the third RNTI.

With reference to the eleventh aspect or the twelfth aspect, in a possible implementation, the calculation rule of the third RNTI satisfies the following relationship: RNTI=1+s_id+ 14×t_id+14×80×f_id+14×80×8×ul_carrier_id. Alternatively, RNTI=1+s_id+14×t_id+14×80×f_id+14×80×8×ul_carrier_id+14×80×8×2. f_id represents a frequency domain index of the first RO, and 0≤f_id<8. s_id represents an index of the first orthogonal frequency division multiplexing OFDM symbol of the first RO, and 0≤s_id<14. t_id represents an index of the first timeslot of the first RO, and 0≤t_id<80. ul_carrier_id represents an uplink UL carrier for transmitting the random access preamble. When the UL carrier is a normal uplink NUL carrier, ul_carrier_id is 0, and when the UL carrier is a supplementary uplink SUL carrier, ul_carrier_id is 1.

With reference to the eleventh aspect or the twelfth aspect, in a possible design, a set of RNTIs available for random access is RNTI_S1. A set of RNTIs associated with the second RO is RNTI-S2. A set of second RNTIs is RNTI-S3. That the first RNTI is determined based on the second RNTI, and that the second RNTI is a value other than an RNTI associated with the second RO includes: RNTI-S3 satisfies the following relationship: RNTI_S3=$C_{RNTI\_S1}$(RNTI_S2). $C_{RNTI\_S1}$(RNTI_S2) represents a complementary set of RNTI-S2 in RNTI_S1.

With reference to the eleventh aspect or the twelfth aspect, in a possible design, that the first RNTI is the value of the second RNTI when the index of the second RNTI corresponds to the third RNTI includes: The first RNTI is a value of RNTI_S3(k) when k=RNTI_S4(m). Alternatively, the first RNTI is a value of RNTI_S3(k) when k=(RNTI_S4 (m)−1). RNTI_S3(k) is the second RNTI, and RNTI_S3(k) ∈RNTI_S3. k=1, . . . , N3, where k represents an index of the second RNTI in the set RNTI_S3. N3 is a quantity of second RNTIs included in the set RNTI_S3. RNTI_S4(m) is the third RNTI, and RNTI_S4(m)∈RNTI_S4. m=1, . . . N4, where m represents an index of the third RNTI in the set RNTI_S4. N4 is a quantity of third RNTIs included in the set RNTI_S4.

With reference to the eleventh aspect or the twelfth aspect, in a possible design, that the first RNTI is the value of the second RNTI when the index of the second RNTI corresponds to the index of the third RNTI includes: The first RNTI is a value of RNTI_S3(k) when k=m. Alternatively, the first RNTI is a value of RNTI_S3(k) when k=(N3−m). RNTI_S3(k) is the second RNTI, and RNTI_S3(k)∈RNTI_S3. k=1, . . . , N3, where k represents an index of the second RNTI in the set RNTI_S3. N3 is a quantity of second RNTIs included in the set RNTI_S3. m=1, . . . N4, where m represents an index of the third RNTI in the set RNTI_S4. N4 is a quantity of third RNTIs included in the set RNTI_S4. The third RNTI is RNTI_S4 (m), and RNTI_S4(m)∈RNTI_S4.

For technical effects brought by any possible implementation of the eleventh aspect or the twelfth aspect, refer to technical effects brought by different implementations of the fifth aspect or the sixth aspect. Details are not described herein again.

According to a thirteenth aspect, a communication apparatus is provided. The apparatus includes: a processor. The processor is configured to: be coupled to a memory, and after reading computer instructions stored in the memory, perform the method according to any one of the foregoing aspects according to the instructions.

With reference to the thirteenth aspect, in a possible implementation, the communication apparatus further includes a memory. The memory is configured to store computer instructions.

With reference to the thirteenth aspect, in a possible implementation, the communication apparatus further includes a communication interface. The communication interface is used by the communication apparatus to communicate with another device. For example, the communication interface may be a transceiver, an input/output interface, an interface circuit, an output circuit, an input circuit, a pin, or a related circuit.

With reference to the thirteenth aspect, in a possible implementation, the communication apparatus may be a chip or a chip system. When the communication apparatus is a chip system, the communication apparatus may include a chip, or may include the chip and another discrete device.

With reference to the thirteenth aspect, in a possible implementation, when the communication apparatus is a chip or a chip system, the communication interface may be an input/output interface, an interface circuit, an output circuit, an input circuit, a pin, a related circuit, or the like on the chip or the chip system. The processor may also be embodied as a processing circuit or a logic circuit.

According to a fourteenth aspect, a computer-readable storage medium is provided. The computer-readable storage medium stores instructions. When the instructions are run on a computer, the computer is enabled to perform the method according to any one of the foregoing aspects.

According to a fifteenth aspect, a computer program product including instructions is provided. When the computer program product runs on a computer, the computer is enabled to perform the method according to any one of the foregoing aspects.

For technical effects brought by any possible implementation of the thirteenth aspect to the fifteenth aspect, refer to technical effects brought by different implementations in any one of the foregoing aspects. Details are not described herein again.

According to a sixteenth aspect, a communication system is provided, including a terminal device that performs the method according to the first aspect and a network device that performs the method according to the second aspect. Alternatively, the communication system includes a terminal device that performs the method according to the third aspect, and a network device that performs the method according to the fourth aspect. Alternatively, the communication system includes a terminal device that performs the method according to the fifth aspect, and a network device that performs the method according to the sixth aspect.

DESCRIPTION OF EMBODIMENTS

To facilitate understanding of the technical solutions in embodiments of this application, the following briefly describes related technologies in this application.

1. Random Access (Random Access, RA) Procedure

In the conventional technology, after a cell search process, a terminal device has obtained downlink synchronization with a cell. Therefore, the terminal device can receive downlink data. However, the terminal device can perform uplink transmission only when the terminal device obtains uplink synchronization with the cell. Currently, the terminal device establishes a connection to a cell and obtains uplink synchronization by using a random access procedure. Random access may be classified into contention-based random access (contention-based random access, CBRA) and contention-free random access (contention-free random access, CFRA). A contention-based random access procedure means a procedure in which a network device does not allocate a dedicated preamble (preamble) and/or a PRACH resource to the terminal device, but the terminal device randomly selects a preamble from a specified range and initiates random access. A contention-free random access procedure means the terminal device initiates random access on a specified PRACH resource based on an indication of the network device by using a specified preamble.

According to different steps of exchanging information, random access may be classified into 4-step random access (4-step random access channel, 4-step RACH) and 2-step random access (2-step random access channel, 2-step RACH). 2-step random access combines information exchange steps in 4-step random access, which reduces steps and time required for random access compared with 4-step random access.

Figure 1A:
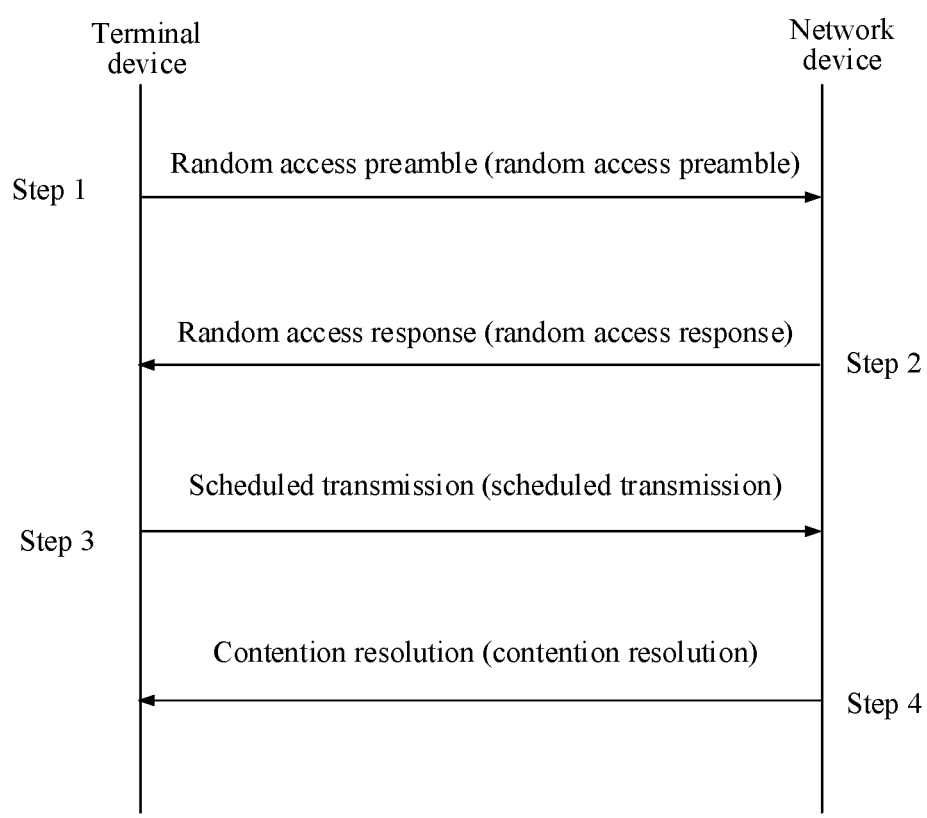
FIG. 1a is a schematic diagram of a contention-based 4-step random access form according to an embodiment.

FIG. 1a shows a contention-based 4-step random access form (CBRA with 4-step RA type), including the following four steps:

Step 1: A terminal device sends a random access preamble (random access preamble) to a network device.

Step 2: The network device sends a random access response (random access response, RAR) to the terminal device.

Step 3: The terminal device sends scheduled transmission (scheduled transmission) to the network device.

Step 4: The network device sends a contention resolution (contention resolution) message to the terminal device.

The information sent in the foregoing four steps is also referred to as a message 1 (message 1, Msg1), a message 2 (message 2, Msg2), a message 3 (message 3, Msg3), and amessage 4 (message 4, Msg4).

Figure 1B:
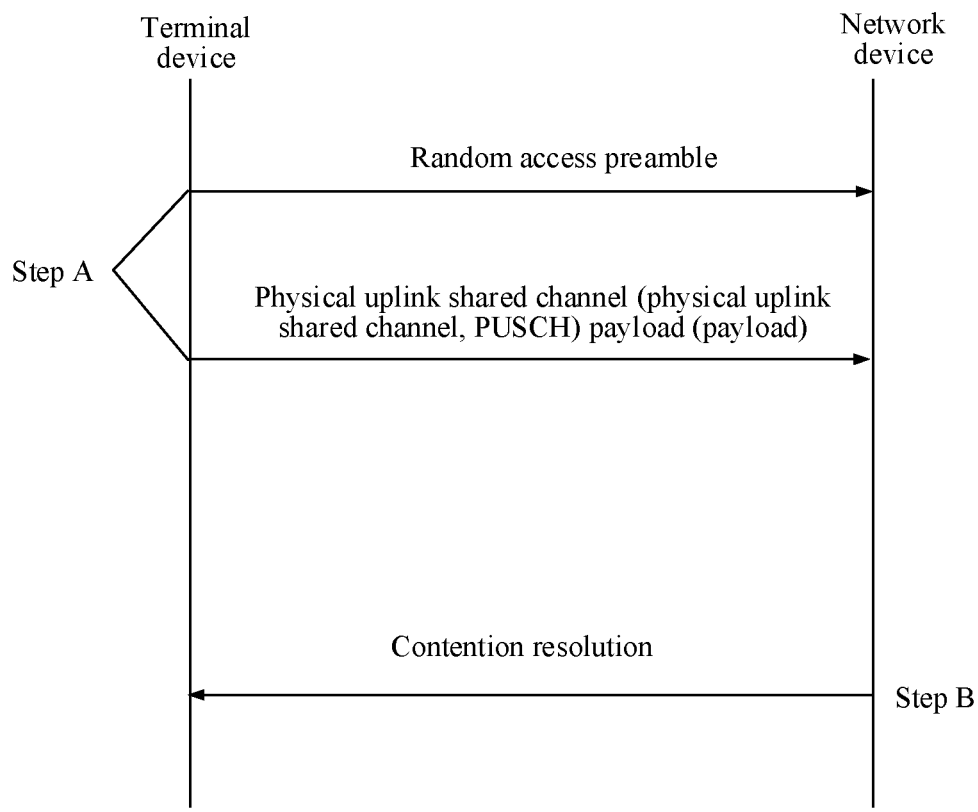
FIG. 1b is a schematic diagram of a contention-based 2-step random access form according to an embodiment.

FIG. 1b shows a contention-based 2-step random access form (CBRA with 2-step RA type), including the following two steps:

Step A: A terminal device sends a random access preamble and a physical uplink shared channel (physical uplink shared channel, PUSCH) payload (payload) to a network device.

Step B: The network device sends a contention resolution message to the terminal device, where the contention resolution message includes an RAR.

The information sent in the foregoing two steps is also referred to as a message A (message A, MsgA) and a message B (message B, MsgB). The MsgA provides functions of the Msg1 and the Msg3, and the MsgB provides functions of the Msg2 and the Msg4.

Figure 1C:
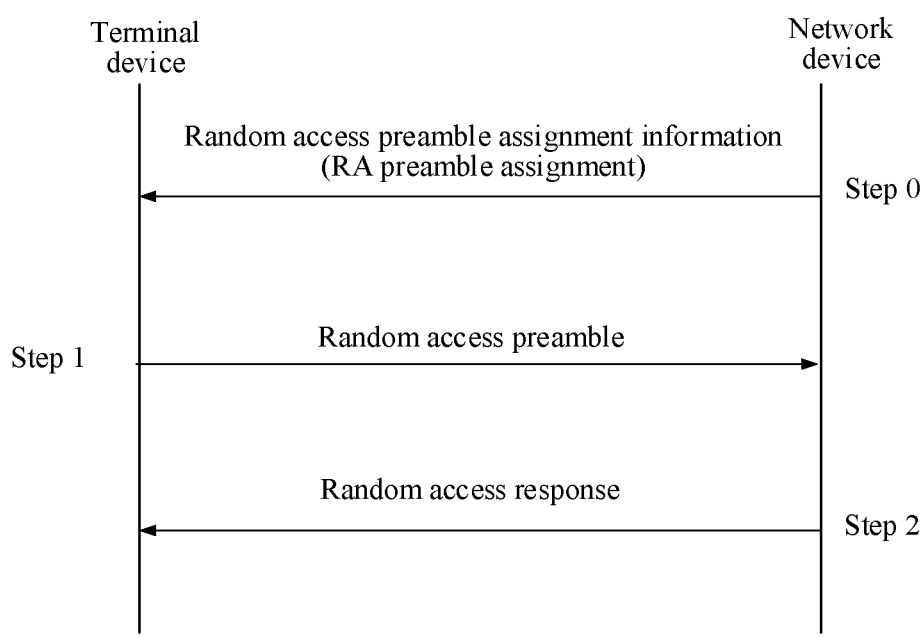
FIG. 1c is a schematic diagram of a contention-free 4-step random access form according to an embodiment.

FIG. 1c shows a contention-free 4-step random access form (CFRA with 4-step RA type), including the following three steps:

Step 0: A network device sends random access preamble assignment information (RA preamble assignment) to a terminal device.

Step 1: The terminal device sends a random access preamble to the network device.

Step 2: The network device sends a random access response to the terminal device.

Figure 1D:
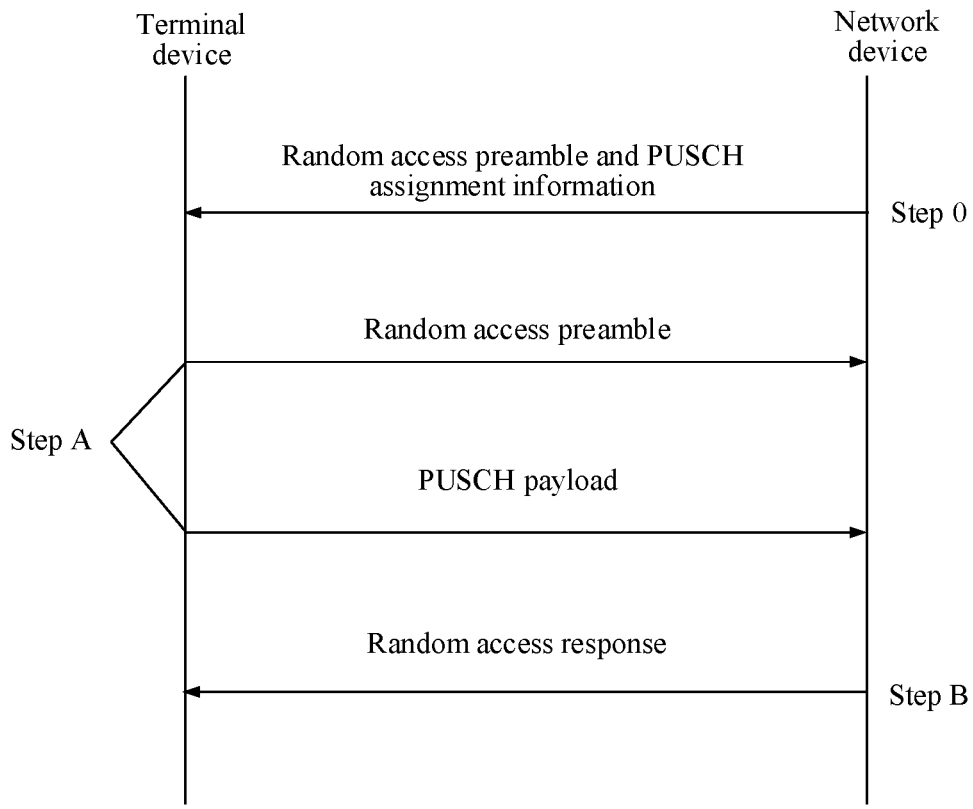
FIG. 1d is a schematic diagram of a contention-free 2-step random access form according to an embodiment.

FIG. 1d shows a contention-free 2-step random access form (CFRA with 2-step RA type), including the following three steps:

Step 0: A network device sends a random access preamble and PUSCH assignment information to a terminal device.

Step A: The terminal device sends a random access preamble and a PUSCH payload to the network device.

Step B: The network device sends a random access response to the terminal device.

For specific implementations of the foregoing four types of random access, refer to the conventional technology. Details are not described herein again. It can be learned that in the foregoing four types of random access forms, the terminal device sends a random access preamble to the network device on a PRACH resource, and receives an RAR from the network device after sending the preamble.

2. PRACH Resource

In this embodiment of this application, a time-frequency resource of a PRACH resource (referred to as a PRACH resource for short) carrying a preamble may be configured by using a system information block 1 (system information block 1, SIB1). Details are as follows. The network device sends the SIB1 to the terminal device to indicate an available PRACH resource set for the terminal device. The available PRACH resource set is determined by the terminal device based on parameters in the SIB1, including PRACH-configurationindex (PRACH-configurationindex), Msg1-FDM (Msg1-FDM), Msg1-frequencystart (Msg1-frequencystart), MsgA-PRACH-configurationIndex-r16 (MsgA-PRACH-configurationIndex-r16), MsgA-RO-FDM-r16 (MsgA-RO-FDM-r16), and MsgA-PRACH-RO-frequencystart (MsgA-RO-frequencystart). A specific determining process is described below. If the random access form is contention-based random access, the network device does not indicate a specific PRACH resource used to send the preamble, and the terminal device selects a PRACH resource from the available PRACH resource set to send the preamble. If the random access form is contention-free random access, the network device indicates, in the SIB1, the specific PRACH resource used to send the preamble, and the terminal device sends the preamble on the PRACH resource.

In this embodiment of this application, for 4-step random access, a PRACH time domain resource is configured by using the parameter PRACH-configurationindex; and for 2-step random access, the PRACH time domain resource is configured by using the parameter MsgA-PRACH-ConfigurationIndex-r16. The following describes specific steps of determining the PRACH time domain resource by using 4-step random access as an example.

The time domain resource of the PRACH resource carrying the preamble may be configured by using PRACH-configurationindex (a value ranges from 0 to 255) in the SIB1. A frequency range 1 (frequency range, FR1) and a symmetric spectrum are used as an example. A random access configuration (random access configuration) may be shown in Table 1.

TABLE 1

| PRACH configuration index | Preamble format | $n_{SFN}$ mod x = y | | Subframe number | Start symbol | Number of PRACH timeslots within a subframe | Number of random access occasions within a PRACH timeslot | PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | ... | ... | ... | ... | ... | ... | ... | ... |
| 247 | C2 | 1 | 0 | 1, 6 | 0 | 1 | 2 | 6 |
| 248 | C2 | 1 | 0 | 4, 9 | 0 | 1 | 2 | 6 |
| 249 | C2 | 1 | 0 | 1 | 0 | 2 | 2 | 6 |
| 250 | C2 | 1 | 0 | 7 | 0 | 2 | 2 | 6 |
| 251 | C2 | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

The PRACH configuration index in Table 1 is configured in RACH-ConfigGeneric, and a value is an integer from 0 to 255. The following uses PRACH configuration index=255 as an example, and provides related descriptions of a random access configuration corresponding to the PRACH configuration index as follows.

A preamble format (preamble format) is C2. Because frequency is FR1, it may be determined that a current sub-carrier spacing (sub-carrier spacing, SCS) is 15 kHz or 30 kHz.

$n_{SFN}$ mod 1=0 means that the terminal device may send a preamble in each system frame (system frame, SF).

That a subframe number (subframe number) is {1, 3, 5, 7, 9} means that the terminal device may send a preamble in a subframe {1, 3, 5, 7, 9}.

That a starting symbol (starting symbol) is 0 means that an index of an RO starting symbol is 0, in other words, $l_0=0$.

That a number of PRACH slots within a subframe (number of PRACH slots within a subframe) is 2 means that when the SCS is 15 kHz, an index $n_{slot}^{RA}$ of the PRACH timeslot in the subframe is equal to {0}, and there is one PRACH timeslot in the subframe. When the SCS is 30 kHz, an index $n_{slot}^{RA}$ of the PRACH timeslot in the subframe is equal to {0, 1}, and there are two PRACH timeslots in the subframe.

That a number of random access occasions within one timeslot (number of time-domain in PRACH occasions within a PRACH slot) (denoted as $N_s^{RA,slot}$) is 2 means that there are two ROs in one PRACH timeslot, and an RO index, namely, $n_t^{RA}$, in the PRACH timeslot is equal to {0, 1}.

That PRACH duration (PRACH duration) (denoted as $N_{dur}^{RA}$) is 6 means that duration of the PRACH is six symbols, in other words, $N_{dur}^{RA}=6$.

In the conventional technology, a starting symbol of each RO satisfies the following formula (0):

$$l=l_0+n_t^{RA}N_{dur}^{RA}+14n_{slot}^{RA} \quad \text{Formula (0)}$$

Figure 2A:
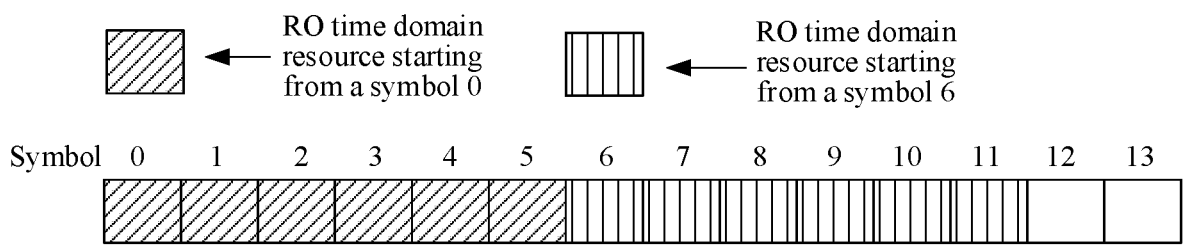
FIG. 2a is a schematic diagram of distribution of a PRACH time domain resource according to an embodiment.

Therefore, the foregoing quantities obtained by looking up the table are substituted into the formula (0), and the following may be obtained:

When SCS=15 kHz, $l=l_0+n_t^{RA}N_{dur}R^{RA}+14n_{slot}^{RA}=0+\{0, 1\}*6+14*0=\{0, 6\}$. To be specific, in the subframe {1, 3, 5, 7, 9}, each subframe has two ROs in total, and the ROs start from a symbol {0, 6} respectively. A time domain length of each RO is six symbols. Therefore, the PRACH time domain resource occupies 12 symbols in total in 14 symbols. For a schematic diagram of distribution of the PRACH time domain resource, refer to FIG. 2a.

Figure 2B:
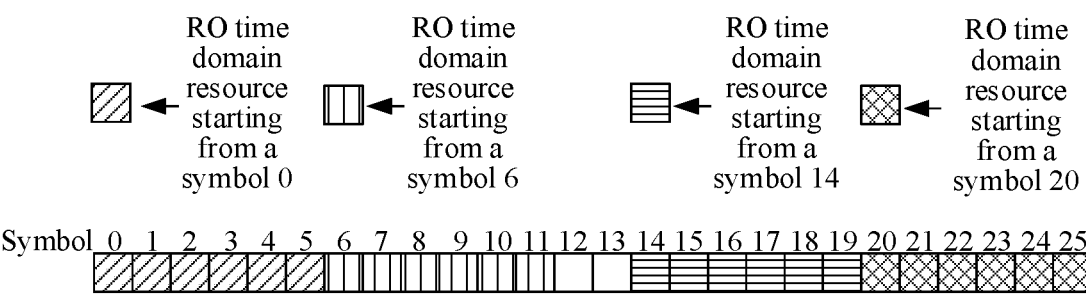
FIG. 2b is a schematic diagram of distribution of another PRACH time domain resource according to an embodiment.

When SCS=30 kHz, $l=l_0+n_t^{RA}N_{dur}^{RA}+14n_{slot}^{RA}=0+\{0, 1\}*6+14*\{0, 1\}=\{0, 6, 14, 20\}$. To be specific, in the subframe {1, 3, 5, 7, 9}, each subframe has four ROs in total, and the ROs start from a symbol {0, 6, 14, 20} respectively. A time domain length of each RO is six symbols. Therefore, the PRACH time domain resource occupies 24 symbols in total in 28 symbols. For a schematic diagram of distribution of the PRACH time domain resource, refer to FIG. 2b.

It can be learned from the foregoing results that, a PRACH time domain resource indicated by some existing PRACH configuration indexes basically occupies all time domain resources. As a result, the PRACH time domain resource indicated by the existing PRACH configuration indexes and a PRACH time domain resource indicated by other PRACH configuration indexes definitely overlap, or there is a high probability of overlapping. Therefore, it is reasonable to use different frequency domain resources to distinguish ROs of different device types or service types.

In addition, for 4-step random access, a PRACH frequency domain resource is configured by using the parameters Msg1-FDM and Msg1-frequency start. For 2-step random access, the PRACH frequency-domain resources are configured by using the parameters MsgA-RO-FDM-r16 and MsgA-RO-Frequency Start. The following describes specific steps of determining a PRACH frequency domain resource by using 4-step random access as an example.

Figure 3:
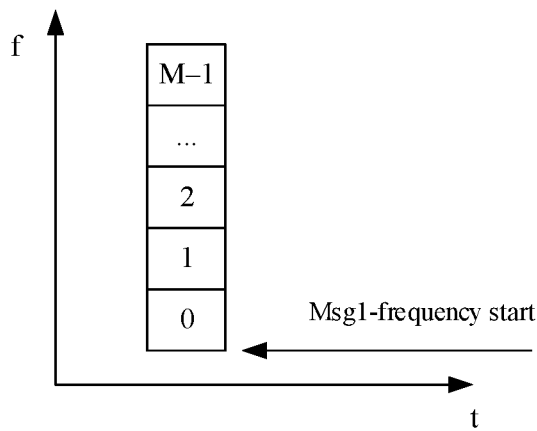
FIG. 3 is a schematic diagram of a PRACH frequency domain resource configuration according to an embodiment.

Refer to FIG. 3. Msg1-frequency start (Msg1-frequency start) indicates an offset value of a lowest RO in frequency domain relative to a physical resource block 0 (physical resource block, PRB 0), and the PRB 0 means a PRB3 whose index is 0 in a bandwidth part (bandwidth part, BWP). Msg1-FDM (Msg1-FDM) indicates a quantity of frequency division ROs in a given time domain, and an optional value of M is {1, 2, 4, 8}, in other words, there may be 1, 2, 4, or 8 frequency division ROs. A frequency domain resource of a single RO is determined based on the following Table 2:

TABLE 2

| $L_{RA}$ | $\Delta f^{RA}$ corresponding to a PRACH | $\Delta f$ corresponding to a PUSCH | $N_{RB}^{RA}$ | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| ... | ... | ... | ... | ... |
| 571 | 30 | 30 | 48 | 2 |
| 571 | 30 | 60 | 24 | 2 |
| 1151 | 15 | 15 | 96 | 1 |
| 1151 | 15 | 30 | 48 | 1 |
| 1151 | 15 | 60 | 24 | 1 |

$L_{RA}$ represents a length of a preamble sent on this RO.

$\Delta f^{RA}$ corresponding to a PRACH ($\Delta f^{RA}$ for PRACH) represents a sub-carrier spacing of the PRACH.

$\Delta f$ corresponding to a PUSCH ($\Delta f$ for PUSCH) represents a sub-carrier spacing of the PUSCH.

$N_{RB}^{RA}$ represents an allocation expressed in number of resource blocks for PUSCH (allocation expressed in number of resource blocks for PUSCH).

$\bar{k}$ represents a parameter used for generating an OFDM baseband signal.

The PRACH time domain resource may be determined by using the parameters in Table 1, and the PRACH frequency domain resource may be determined by using the frequency domain configuration parameter. In this way, the PRACH time-frequency resource (PRACH resource for short) may be uniquely determined. Further, the terminal device may send a preamble on the determined PRACH resource. The network device may receive the preamble from the terminal device on a corresponding PRACH resource. Further, the network device may determine, based on a location of the PRACH resource for receiving the preamble, an RO corresponding to the preamble, to further determine an RA-RNTI or an MGSB-RNTI associated with the RO.

3. RAR Window

As described in the foregoing random access procedure, after sending the random access preamble to the network device on the PRACH resource, the terminal device receives an RAR from the network device. Considering that downlink control information (down link control information, DCI) carried on a physical downlink control channel (physical downlink control channel, PDCCH) is used to schedule a physical downlink shared channel (physical downlink shared channel, PDSCH), and the RAR is carried by using a PDSCH, the network device identifies, by using an RA-RNTI or a CRC (cyclic redundancy check, cyclic redundancy check) of DCI that is carried by the PDCCH and that is scrambled by using an MSGB-RNTI, an RAR sent by the network device as the permeable sent by the corresponding terminal device on which RO. The RA-RNTI is used to scramble a CRC of DCI carried by the PDCCH when the terminal device accesses the network in the 4-step random access manner, and the MSGB-RNTI is used to scramble a CRC of DCI carried by the PDCCH when the terminal device performs access in the 2-step random access manner.

It should be noted that in this embodiment of this application, for ease of subsequent description, "scrambling the CRC of the DCI carried by the PDCCH" may be simplified as "scrambling the PDCCH". In other words, "scrambling the PDCCH" in the subsequent embodiments may be understood as "scrambling the CRC of the DCI carried by the PDCCH", which is described herein, and details are not described below.

Figure 4A:
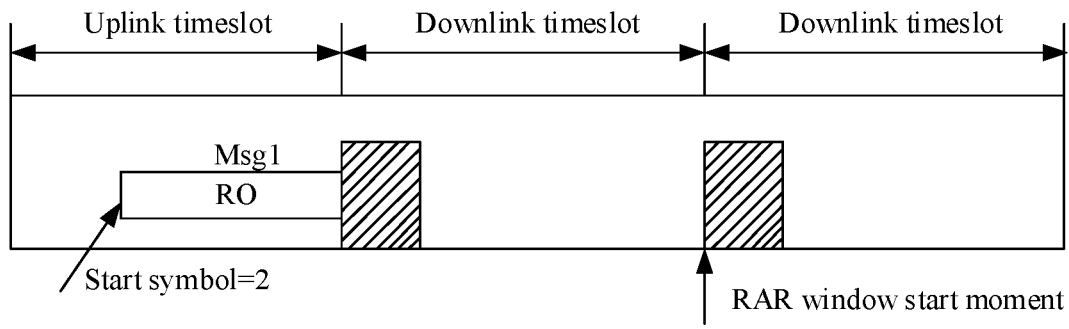
FIG. 4a is a schematic diagram of a configuration of an RAR window according to an embodiment.
Figure 4A:
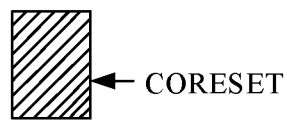
Figure 4B:
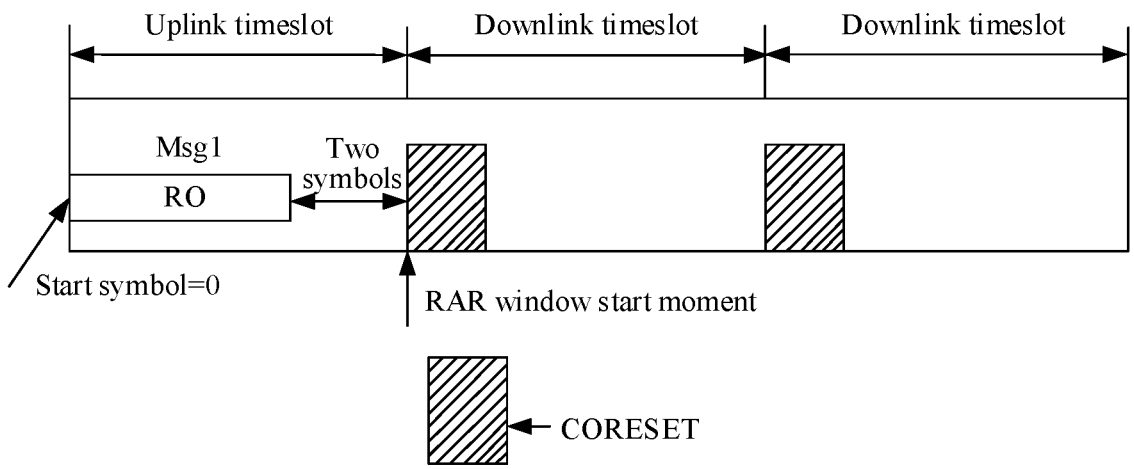
FIG. 4b is a schematic diagram of a configuration of another RAR window according to an embodiment.

Specifically, after sending the preamble, the terminal device attempts to detect, in an RAR window, a PDCCH scrambled by using a corresponding RA-RNTI/MSGB-RNTI. The RAR window is configured by a parameter ra-ResponseWindow delivered by the network device. The RAR window starts from the first symbol of an earliest control resource set (control resource set, CORESET) in type-1-PDCCH common search space (Type1-PDCCH common search space, Type1-PDCCH CSS) corresponding to the Msg2, and starts from at least one symbol after the last symbol of the RO. That is, a start moment of the RAR window needs to be after at least one symbol after the last symbol of the RO. For example, a schematic diagram of configuration of the RAR window may be as shown in FIG. 4a or FIG. 4b. As shown in FIG. 4a, a Type1-PDCCH CSS set in which the PDCCH after the RO is located includes two CORESETs. There is no interval of at least one symbol between the first symbol of the first CORESET and the RO, that is, a condition that the start moment of the RAR window is after the at least one symbol after the last symbol of the RO is not met. Therefore, the RAR window cannot start from the first symbol of the first CORESET, but extends to the first symbol of the second CORESET. As shown in FIG. 4b, the Type1-PDCCH CSS set in which the PDCCH after the RO is located includes two CORESETs. The first symbol of the first CORESET starts after two symbols after the last symbol of the RO, that is, a condition that the start moment of the RAR window is after the at least one symbol after the last symbol of the RO is met. Therefore, the RAR window starts from the first symbol of the first CORESET.

Because the terminal complies with the foregoing rule when receiving the RAR, a plurality of terminals may detect the RAR in a same RAR window.

4. RA-RNTI/MSGB-RNTI

It can be learned from the foregoing description that the RA-RNTI is used to scramble the PDCCH when the terminal device performs access in the 4-step random access manner, and the MSGB-RNTI is used to scramble the PDCCH when the terminal device performs access in the 2-step random access manner. In subsequent embodiments of this application, when the network device supports only 4-step random access, the terminal device can perform access only in the 4-step random access manner. When the network device supports 2-step random access, the terminal device may choose to perform access in the 4-step random access manner or the 2-step random access manner based on an access manner selected by the terminal device. In this case, when the network device supports only 4-step random access, only the RA-RNTI needs to be determined. When the network device supports 2-step random access, the RA-RNTI or the MSGB-RNTI may be determined.

In the conventional technology, a calculation rule of the RA-RNTI satisfies the following formula (1):

$$\text{RA-RNTI}=1+s\_id+14{\times}t\_id+14{\times}80{\times}f\_id+14{\times}80{\times}8{\times}\text{ul\_carrier\_id} \quad \text{Formula (1)}$$

In the conventional technology, a calculation rule of the MSGB-RNTI satisfies the following formula (2):

$$\text{MSGB-RNTI}=1+s\_id+14{\times}t\_id+14{\times}80{\times}f\_id+14{\times}80{\times}8{\times}\text{ul\_carrier\_id}+14{\times}80{\times}8{\times}2 \quad \text{Formula (2)}$$

$s\_id$ is an index (index) of the first orthogonal frequency division multiplexing (orthogonal frequency division multiplexing, OFDM) symbol (symbol) of the RO ($0{\leq}s\_id<14$); $t\_id$ is an index of the first slot (slot) of the RO in a system frame ($0{\leq}t\_id<80$); $f\_id$ is an index of the RO in frequency domain ($0{\leq}f\_id<8$); and ul_carrier_id is an uplink (uplink, UL) carrier for transmitting the preamble. When the UL carrier is a normal uplink (normal uplink, NUL) carrier, ul_carrier_id is 0, and when the UL carrier is a supplementary uplink (supplementary uplink, SUL) carrier, ul_carrier_id is 1.

It can be learned from the foregoing calculation formula that $s\_id$ and $t\_id$ are used to indicate a time domain location of the RO, and $f\_id$ indicates a frequency domain location of the RO. Therefore, after determining the RO used to send the preamble, the terminal device may determine, according to the foregoing calculation formula, the RA-RNTI/MSGB-RNTI associated with the RO. When receiving the preamble on the RO resource, the network device may determine, based on the time frequency location of the RO, the RA-RNTI/MSGB-RNTI associated with the RO.

According to the value range of the parameter, it can be learned that in the conventional technology, a value range of the RA-RNTI determined according to the foregoing formula (1) is [1, 17920] in decimal format. A value range of the MSGB-RNTI determined according to the foregoing formula (2) is [17921, 35840] in decimal format. The value range of the RA-RNTI and the value range of the MSGB-RNTI do not overlap.

In addition, in the conventional technology, an extensible maximum value of the RA-RNTI and the MSGB-RNTI is FFF2 in hexadecimal format, a corresponding binary value includes 16 bits, and a corresponding decimal value is 65522.

5. RAR

Figure 5:
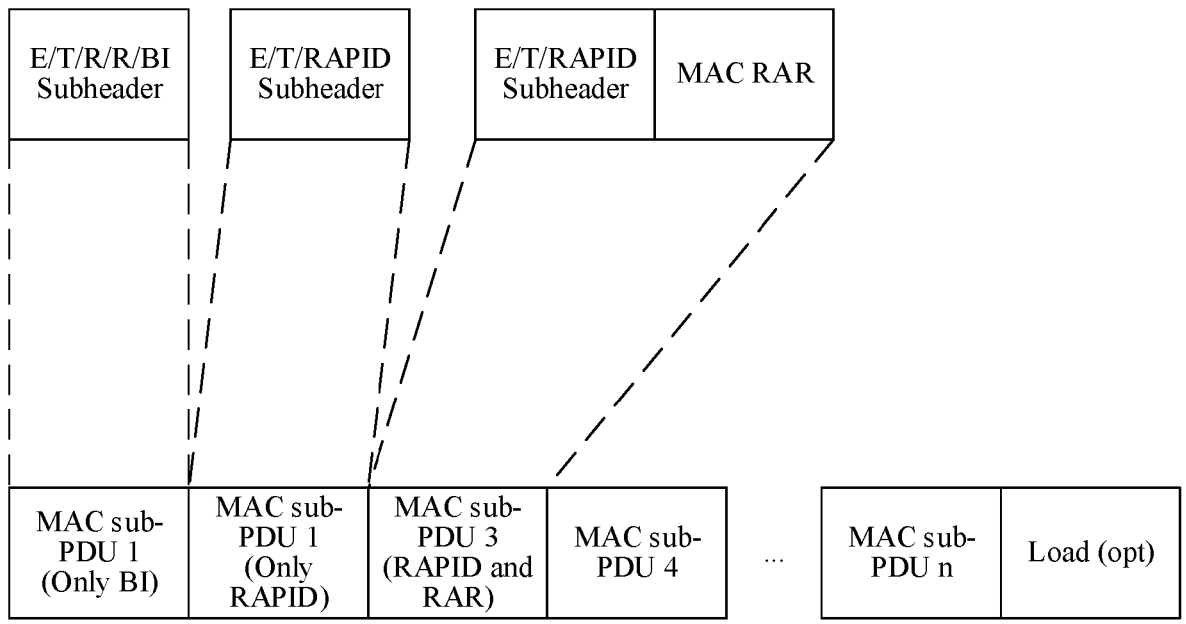
FIG. 5 is a schematic diagram of a structure of a MAC PDU (media access control protocol data unit) of an RAR according to an embodiment.

As shown in FIG. 5, the MAC PDU of the RAR includes a padding (padding) and one or more MAC sub-PDUs (sub-PDUs), where any one of the MAC sub-PDUs includes the following cases:

Only a MAC subheader of a backoff indicator (backoff indicator, BI) is included, such as a MAC sub-PDU 1.

Only a MAC subheader of a random access preamble identifier (random access preamble identifier, RAPID) is included, such as a MAC sub-PDU 2.

Only a MAC subheader including an RAPID and a MAC RAR are included, such as a MAC sub-PDU 3.

It can be learned from the foregoing description that the network device scrambles, by using an RA-RNTI/MSGB-RNTI, the PDCCH corresponding to the RAR, to identify the RAR sent by the network device as the preamble sent by the corresponding terminal device on which RO. The RA-RNTI/MSGB-RNTI used to scramble the PDCCH is determined by the network device after receiving the preamble from the terminal device based on a time-frequency location of the associated RO on which the preamble is sent. In other words, there is a correspondence between the RO and the RA-RNTI/MSGB-RNTI. In other words, if the terminal device sends the preamble to the network device on different ROs, the network device scrambles, by using different RA-RNTIs/MSGB-RNTIs, a corresponding PDCCH that includes an RAR MAC PDU and that is sent to the terminal device. The RAR MAC PDU includes one or more RAPIDs corresponding to the preamble sent by the terminal device. If different terminal devices send different preambles to the network device on a same RO, the network device scrambles, by using a same RA-RNTI/MSGB-RNTI, a PDCCH that includes an RAR MAC PDU and that is sent to the terminal device. The RAR MAC PDU includes different RAPIDs corresponding to the preambles sent by the different terminal devices.

If the terminal device obtains, through listening, in the RAR window, a PDCCH scrambled by using an RA-RNTI/MSGB-RNTI corresponding to the terminal device, and after decoding and obtaining the RAR MAC PDU, the terminal device learns through reading that the RAPID included in the RAR MAC PDU corresponds to the preamble sent by the terminal device, it is considered that random access succeeds. In this case, the terminal device may read content in a MAC RAR padding corresponding to the RAPID and stop listening to the PDCCH. If the terminal device does not obtain the corresponding RAPID, and the RAR window times out, the terminal device considers that the random access procedure fails.

It can be learned that, the terminal device that sends the preamble by using different ROs needs to detect RAR MAC PDUs scrambled by using different RA-RNTIs/MSGB-RNTIs, to read RAPIDs that are included in the RAR MAC PDUs and that correspond to the sent preamble.

6. REDCAP Device

The REDCAP terminal device means a device that has low device complexity and is used for an industrial wireless sensor, video surveillance, and a wearable device. Compared with conventional terminal devices, these terminal devices may have the following characteristics:

A quantity of transmit/receive antennas is reduced;
a bandwidth of the terminal device is reduced;
half-duplex frequency division duplex (frequency division duplex, FDD) is used;
terminal device processing time is loosed; and
a processing capability of the terminal device is reduced.

Because a capability of the REDCAP terminal device is lower than a capability of an existing conventional terminal device, when the REDCAP terminal device accesses a network, the network may need to provide more resources for the REDCAP terminal device. The network may reject access of the REDCAP terminal device due to a load or a policy. Therefore, the network needs to identify the REDCAP terminal before the REDCAP terminal accesses the network. In addition, because the capability of the REDCAP terminal device is reduced, the network needs to perform special processing when scheduling a resource for the REDCAP terminal device, for example, scheduling a resource for the REDCAP terminal device within a bandwidth range supported by the REDCAP terminal device. Therefore, the network still needs to identify the REDCAP terminal device before the REDCAP terminal device accesses the network.

In the conventional technology, the network device identifies the REDCAP terminal device in the following two solutions.

Solution 1: configuring an independent SIB1 for the REDCAP device.

In solution 1, the network device configures, for the REDCAP terminal device, an SIB1 message that is independent of the conventional terminal device. The independent SIB1 of the REDCAP terminal device is denoted as an SIB1' in the following. In this solution, the conventional terminal device only needs to read the conventional SIB1 to obtain some parameters required in the random access procedure, and the REDCAP terminal device only needs to read the SIB1' separately configured for the REDCAP terminal device to obtain some parameters required in the random access procedure.

Figure 6:
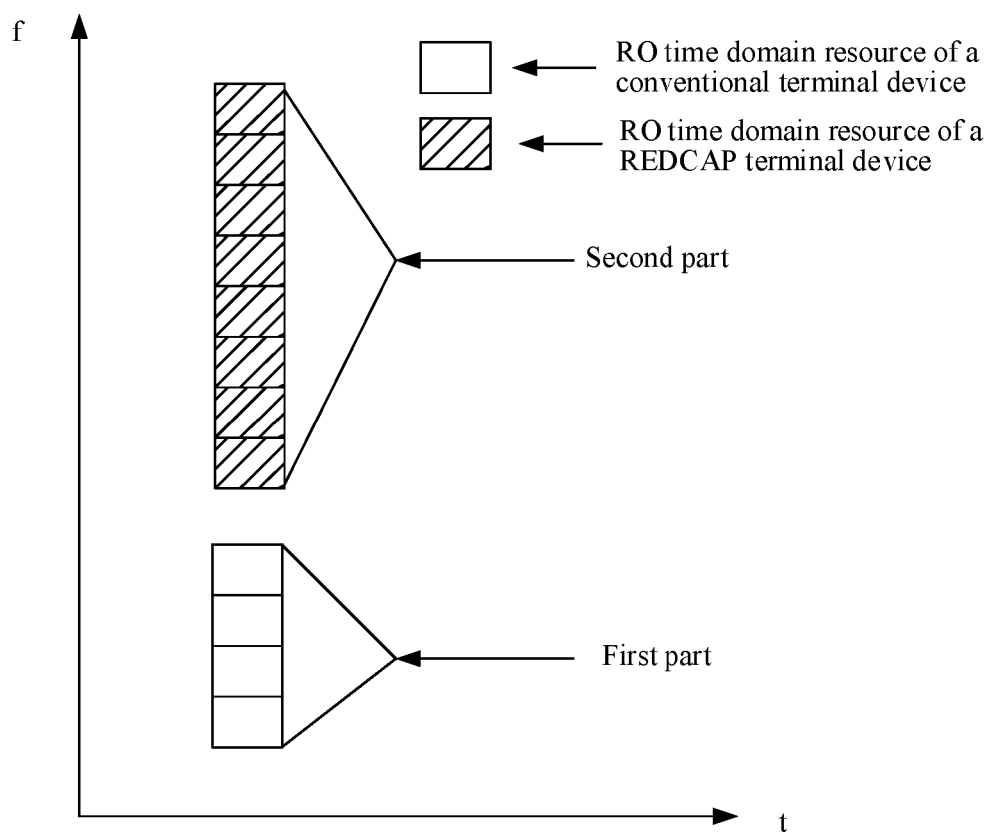
FIG. 6 is a schematic diagram of configuring an independent RO frequency domain resource for a REDCAP terminal device according to an embodiment.

The network device may configure an independent PRACH parameter (which may include the PRACH frequency domain configuration parameter described above) for the REDCAP terminal device in the SIB1'. In this way, an independent PRACH frequency domain resource may be configured for the REDCAP terminal device. Therefore, the network device may identify, by using the frequency domain resource of the RO on which the preamble sent by the terminal device is located, that the terminal device is the REDCAP terminal device or the conventional terminal device. For example, as shown in FIG. 6, the conventional terminal device sends the preamble on an RO time-frequency resource indicated by a first part. The first part of the RO time-frequency resource is configured by using the SIB1, the REDCAP terminal device sends the preamble on the RO time-frequency resource indicated by a second part, and the second part of the RO time-frequency resource is configured by using the SIB1'. It can be learned that both the first part of RO and the second part of RO are in a given time domain, but are staggered in frequency domain. In other words, the RO frequency domain resource of the REDCAP terminal device is independent of the RO frequency domain resource of the conventional terminal device. Therefore, the network device may identify a type of the terminal device by identifying the first part of RO and the second part of RO that are staggered in frequency domain.

Solution 2: The REDCAP terminal device shares an SIB1 with the conventional terminal device.

Figure 7:
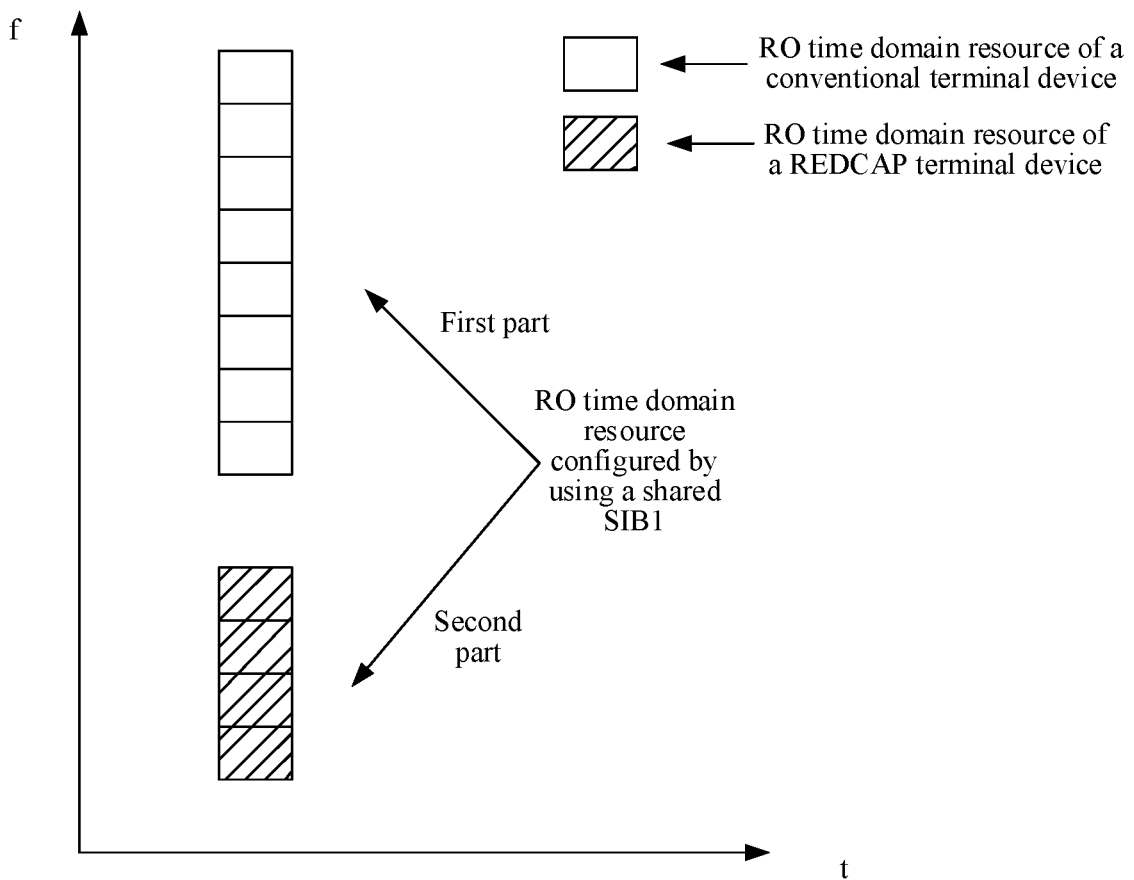
FIG. 7 is another schematic diagram of configuring an independent RO frequency domain resource for a REDCAP terminal device according to an embodiment.

In the solution 2, the conventional terminal device and the REDCAP terminal device share an SIB1, and the network device separately configures a PRACH parameter for the REDCAP terminal device and the conventional terminal device in the shared SIB1. In this solution, both the conventional terminal device and the REDCAP terminal device read the SIB1. A difference lies in that the REDCAP terminal device can read all or some content of the SIB1, but some conventional terminal devices cannot read the PRACH parameter configured by the network device for the REDCAP terminal device. Therefore, in this solution, the network device may configure an independent RO frequency domain resource for the REDCAP terminal device in the shared SIB1, so that the network device can identify, by using a frequency domain resource of the RO on which the preamble sent by the terminal device is located, that the terminal device is the REDCAP terminal device or the conventional terminal device. For example, as shown in FIG. 7, in a given time domain, the conventional terminal device sends the preamble on an RO time-frequency resource indicated by a first part. The first part of the RO time-frequency resource is configured by using a PRACH parameter of the conventional terminal device in the shared SIB1, and the REDCAP terminal device sends the preamble on the RO time-frequency resource indicated by a second part. The second part of the RO time-frequency resource is configured by using a PRACH parameter of the REDCAP terminal device in the shared SIB1. It can be learned that both the first part of the RO and the second part of the RO are in a given time domain, but are staggered in frequency domain. That is, the RO frequency domain resource of the REDCAP terminal device is independent of the RO frequency domain resource of the conventional terminal device. Therefore, the network device may identify the type of the terminal device by identifying the first part of the RO and the second part of the RO that are staggered in frequency domain.

It can be learned from the foregoing description that, in the foregoing two solutions in the conventional technology, the network device may identify the REDCAP terminal device by configuring an independent RO frequency domain resource for the REDCAP terminal device. However, both solutions have a problem: According to the existing formula for calculating the RA-RNTI/MSGB-RNTI, when the RO of the REDCAP terminal device and the RO of the conventional terminal device are at a same time domain location, but are staggered in frequency domain, so that the network device identifies the terminal device type, an RA-RNTI/MSGB-RNTI corresponding to the RO of the REDCAP terminal device may be the same as an RA-RNTI/MSGB-RNTI corresponding to the RO of the conventional terminal device. It can be learned from the foregoing description that, when the RA-RNTI/MSGB-RNTI corresponding to the RO of the REDCAP terminal device is the same as the RA-RNTI/MSGB-RNTI corresponding to the RO of the conventional terminal device, both the REDCAP terminal device and the conventional terminal device may first decode to obtain an RAR that does not belong to the REDCAP terminal device or the conventional terminal device. As a result, power is wasted, and time for decoding another RAR may conflict with time for decoding the RAR of the REDCAP terminal device or the conventional terminal device, thereby increasing a failure probability of the random access procedure.

Similarly, when establishing, for example, a small-packet transmission service with the terminal device, the network device also staggers in frequency domain to identify the service. Based on a principle similar to that described above, different types of services in the random access procedure also affect each other due to an RA-RNTI/MSGB-RNTI conflict.

Therefore, how to avoid an RNTI conflict and mutual influence between different types of terminal devices or different types of services in a random access procedure is an urgent problem to be resolved currently.

Further, as PRACH resources are divided by various terminal types and/or service types, values of RA-RNTIs/MSGB-RNTIs are increasing, and value ranges are also gradually expanded. Consequently, the existing maximum RA-RNTI/MSGB-RNTI value (FFF2) is likely to be exceeded. Therefore, it is necessary to provide a solution that can avoid an RNTI conflict between different types of terminal devices or different types of services in the random access procedure when a value of the RA-RNTI/MSGB-RNTI exceeds the existing maximum value.

To resolve the foregoing problem, this application provides a random access method, an apparatus, and a system, to resolve a problem that an RNTI conflict exists between different terminal device types or different service types in a random access procedure.

The following describes technical solutions in embodiments of this application with reference to accompanying drawings in embodiments of this application. Unless otherwise specified, "/" in descriptions of this application represents an "or" relationship between associated objects. For example, A/B may represent A or B. In this application, "and/or" is merely an association relationship for describing associated objects, and indicates that three relationships may exist. For example, A and/or B may indicate the following cases: Only A exists, both A and B exist, and only B exists, where A and B may be singular or plural. In addition, in the description of this application, unless otherwise specified, "a plurality of" means two or more. "At least one of the following items (pieces)" or a similar expression thereof refers to any combination of these items, including any combination of a singular item (piece) or plural items (pieces). For example, at least one of a, b, or c may represent: a, b, c, a-b, a-c, b-c, or a-b-c, where a, b, and c may be one or more. In addition, to clearly describe the technical solutions in embodiments of this application, in embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference. In addition, in this embodiment of this application, words such as "exemplary" or "for example" are used to represent an example, an illustration, or a description. Any embodiment or design solution described as "exemplary" or "for example" in embodiments of this application should not be interpreted as being more preferred or advantageous than another embodiment or design solution. Specifically, the use of the words "exemplary" or "for example" is intended to present the related concept in a concrete manner for ease of understanding.

In addition, the network architecture and the service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

The random access method provided in embodiments of this application may be applicable to various communication systems. For example, the random access method provided in this embodiment of this application may be applied to a long term evolution (long term evolution, LTE) system, a 5th-generation (5th-generation, 5G) system, or another future-oriented similar new system. This is not specifically limited in this embodiment of this application. In addition, the term "system" and "network" may be substituted for each other.

Figure 8:
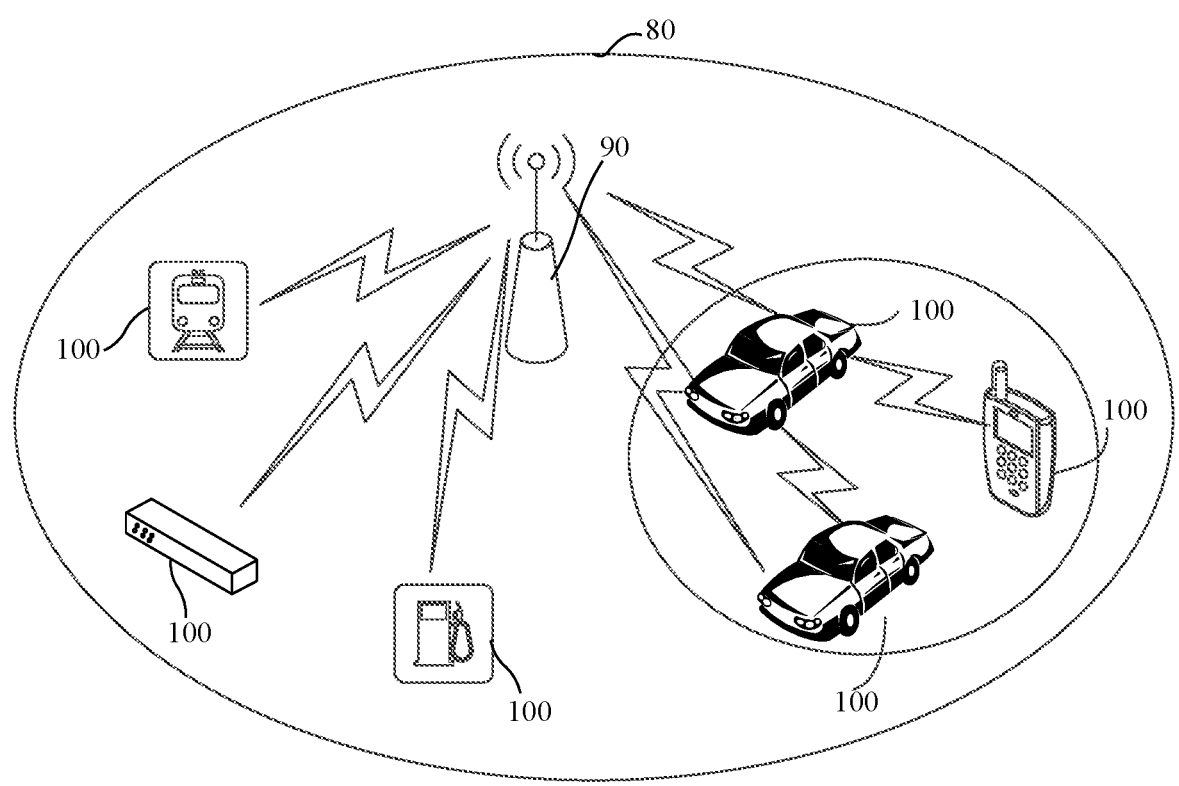
FIG. 8 is a schematic diagram of an architecture of a communication system according to an embodiment of this application.

FIG. 8 shows a communication system 80 according to an embodiment of this application. The communication system 80 includes a network device 90 and one or more terminal devices 100 connected to the network device 90. The terminal device 100 is connected to the network device 90 in a wireless manner. Optionally, different terminal devices 100 may communicate with each other. The terminal device 100 may be located at a fixed location, or may be removable.

It should be noted that FIG. 8 is merely a schematic diagram. Although not shown, the communication system 80 may further include another network device. For example, the communication system 80 may further include one or more of a core network device, a wireless relay device, and a wireless backhaul transmission device. This is not specifically limited herein. The network device may be connected to the core network device in a wireless or wired manner. The core network device and the network device 90 may be different independent physical devices, or functions of the core network device and logical functions of the network device 90 may be integrated into a same physical device, or a part of functions of the core network device and a part of functions of the network device 90 may be integrated into one physical device. This is not specifically limited in this embodiment of this application.

Interaction shown in FIG. 8 between the network device 90 and any terminal device 100 is used as an example. In a possible implementation, the terminal device 100 is configured to send a random access preamble to the network device on a first RO, where the first RO corresponds to a first device type and/or a first service type. The network device 90 is configured to: receive, on the first RO, the random access preamble from the terminal device, and send, to the terminal device 100, a PDCCH scrambled by using a first RNTI associated with the first RO. Calculation of the first RNTI is related to the first device type and/or the first service type. The terminal device 100 is further configured to listen to a PDCCH scrambled by the first RNTI and associated with the first RO. Specific implementation of this solution is described in detail in a subsequent method embodiment, and details are not described herein again. In this solution, RNTI calculation is related to a device type and/or a service type of the terminal device, in other words, different terminal device types or service types have different RNTI calculation rules. Therefore, an RNTI conflict caused by using a same RNTI calculation rule for different terminal device types or different service types in the conventional technology is avoided, thereby reducing mutual impact of the different types of terminal devices or the different types of services during random access, and improving a success rate of a random access procedure.

Interaction shown in FIG. 8 between the network device 90 and any terminal device 100 is used as an example. In a possible implementation, the terminal device 100 is configured to send a random access preamble to the network device on a first RO, where the first RO corresponds to a first device type and/or a first service type. The network device 90 is configured to: receive, on the first RO, the random access preamble from the terminal device, and send, to the terminal device 100, a PDCCH scrambled by using a first RNTI associated with the first RO. A frequency domain start identifier A of the first RO is equal to M+X, where X is an integer greater than 7, or X is an integer greater than 23, and M is a quantity of frequency division ROs corresponding to a terminal device of a second device type or a service of a second service type. Specific implementation of this solution is described in detail in a subsequent method embodiment, and details are not described herein again. Because a frequency domain numbering rule of the first RO of a terminal device of the first device type or a service of a second service type is changed in this solution, frequency domain parameter ranges of ROs corresponding to terminal devices of different device types or services of different service types are different. Therefore, RNTIs corresponding to different device types of terminal devices or service types of services that are determined based on frequency domain parameters of the ROs are also different, thereby avoiding an RNTI conflict between different terminal device types or service types in the conventional technology. In this way, mutual impact of the different types of terminal devices or the different types of services during random access is reduced, and a success rate of a random access procedure is improved.

Interaction shown in FIG. 8 between the network device 90 and any terminal device 100 is used as an example. In another possible implementation, the terminal device 100 is configured to send a random access preamble to the network device on a first RO, where the first RO corresponds to a first device type and/or a first service type. The network device 90 is configured to: receive, on the first RO, the random access preamble from the terminal device, and send, to the terminal device 100, a PDCCH scrambled by using a first RNTI associated with the first RO, where the first RNTI is determined based on a second RNTI. The second RNTI is a value other than an RNTI associated with a second RO, and the second RO is an RO configured for a second device type and/or a second service type. The terminal device 100 is further configured to listen to the PDCCH scrambled by using the first RNTI associated with the first RO. Specific implementation of this solution is described in detail in a subsequent method embodiment, and details are not described herein again. In this solution, the first RNTI associated with the first RO of a terminal device of the first device type and/or a service of the first service type is determined based on an idle RNTI other than the RNTI associated with the second RO, in other words, there is a correspondence between the first RNTI used to scramble the PDCCH and the idle RNTI corresponding to the terminal device of the second device type or the service of the second service type. Therefore, an RNTI conflict caused by using a same RNTI calculation rule for different terminal device types or different service types in the conventional technology is avoided, there by reducing mutual impact of the different types of terminal devices or the different types of services during random access, and improving a success rate of a random access procedure.

Optionally, the network device 90 in this embodiment of this application is a device for connecting the terminal device 100 to a wireless network, and may be a base station (base station), an evolved NodeB (evolved NodeB, eNodeB), a transmission reception point (transmission reception point, TRP), a next generation NodeB (next generation NodeB, gNB) in a 5G mobile communication system, a base station in a future mobile communication system, an access node in a wireless-fidelity (wireless-fidelity, Wi-Fi) system, or the like; or may be a module or a unit that implements some functions of a base station, for example, may be a central unit (central unit, CU), or may be a distributed unit (distributed unit, DU). A specific technology and a specific device form used by the network device are not limited in this embodiment of this application. In this application, unless otherwise specified, the network device is a radio access network device.

Optionally, the terminal device 100 in this embodiment of this application may be a device configured to implement a wireless communication function, for example, a terminal or a chip that can be used in a terminal. The terminal may also be referred to as user equipment (user equipment, UE), a mobile station, a mobile terminal, or the like. The terminal may be a mobile phone, a tablet computer, a computer with a wireless sending and receiving function, a virtual reality terminal device, an augmented reality terminal device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, and the like. A specific technology and a specific device form used by the terminal device are not limited in this embodiment of this application.

Optionally, the network device 90 and the terminal device 100 in this embodiment of this application may be deployed on land, including indoors or outdoors devices, a handheld device, or a vehicle-mounted device. The network device 90 and the terminal device 100 can alternatively be deployed on a water surface. The network device 90 and the terminal device 100 can alternatively be deployed in an airplane, a balloon, and a satellite in the air. Application scenarios of the network device 90 and the terminal device 100 are not limited in this embodiment of this application.

Optionally, the network device 90 and the terminal device 100 in this embodiment of this application may communicate with each other by using a licensed spectrum, may communicate with each other by using an unlicensed spectrum, or may communicate with each other by using both a licensed spectrum and an unlicensed spectrum. The network device 90 and the terminal device 100 may communicate with each other by using a spectrum below 6 gigahertz (gigahertz, GHz), may communicate with each other by using a spectrum above 6 GHz, or may communicate with each other by using both a spectrum below 6 GHz and a spectrum above 6 GHz. The spectrum resource used between the network device 90 and the terminal device 100 is not limited in this embodiment of this application.

Optionally, the network device 90 and the terminal device 100 in this embodiment of this application may also be referred to as communication apparatuses, and each may be a general-purpose device or a dedicated device. This is not specifically limited in this embodiment of this application.

Figure 9:
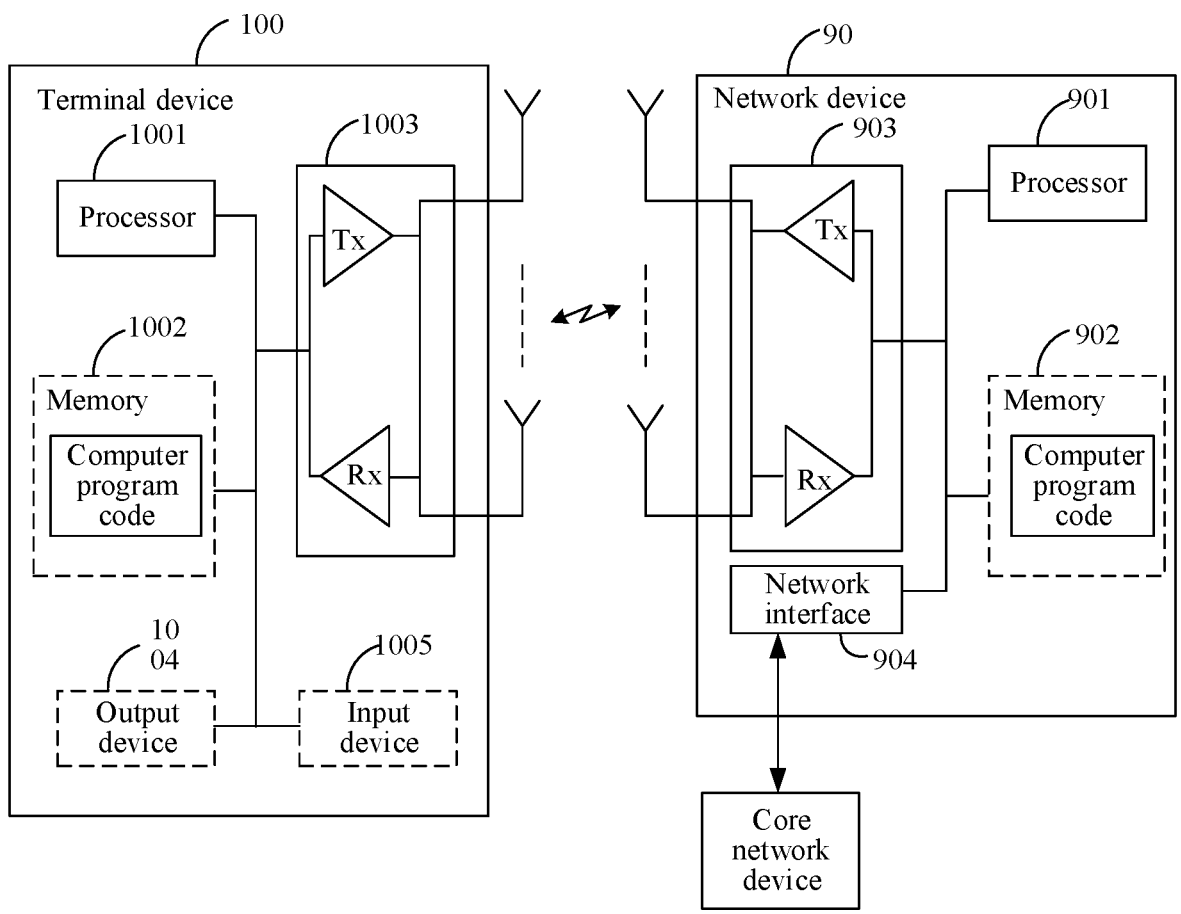
FIG. 9 is a schematic diagram of structures of a network device and a terminal device according to an embodiment of this application.

Optionally, FIG. 9 is a schematic diagram of structures of a network device 90 and a terminal device 100 according to an embodiment of this application.

The terminal device 100 includes at least one processor 1001 and at least one transceiver 1003. Optionally, the terminal device 100 may further include at least one memory 1002, at least one output device 1004, or at least one input device 1005.

The processor 1001, the memory 1002, and the transceiver 1003 are connected through a communication line. The communication line may include a path for transmitting information between the foregoing components.

The processor 1001 may be a general-purpose central processing unit (central processing unit, CPU), another general-purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The general purpose processor may be a microprocessor or any conventional processor. During specific implementation, in an embodiment, the processor 1001 may include a plurality of CPUs, and the processor 1001 may be a single-core processor or a multi-core processor. The processor herein may be one or more devices, circuits, or processing cores configured to process data.

The memory 1002 may be an apparatus with a storage function. For example, the memory 1002 may be a read-only memory (read-only memory, ROM) or another type of static storage device that can store static information and instructions, a random access memory (random access memory, RAM), or another type of dynamic storage device that can store information and instructions, or may be a programmable ROM (programmable ROM, PROM), an erasable PROM (erasable PROM, EPROM), an electrically erasable programmable read-only memory (electrically erasable programmable read-only memory, EEPROM), a compact disc read-only memory (compact disc read-only memory, CD-ROM) or other optical disk storage, optical disk storage (including a compact disc, a laser disc, an optical disc, a digital versatile disc, a Blu-ray disc, and the like), a magnetic disk storage medium or another magnetic storage device, or any other medium that can be configured to carry or store desired program code in a form of an instruction or a data structure and that can be accessed by a computer, but is not limited thereto. The memory 1002 may exist independently, and is connected to the processor 1001 through a communication line. Alternatively, the memory 1002 and the processor 1001 may be integrated together.

The memory 1002 is configured to store computer-executable instructions for executing the solution of this application, and the processor 1001 controls execution of the computer-executable instructions. Specifically, the processor 1001 is configured to execute the computer-executable instructions stored in the memory 1002, to implement the random access method in embodiments of this application.

Alternatively, optionally, in this embodiment of this application, the processor 1001 may perform a processing-related function in the random access method provided in the following embodiment of this application, and the transceiver 1003 is responsible for communicating with another device or a communication network. This is not specifically limited in this embodiment of this application.

Optionally, the computer-executable instructions in this embodiment of this application may also be referred to as application program code or computer program code. This is not specifically limited in this embodiment of this application.

The transceiver 1003 may use any apparatus such as a transceiver, and is configured to communicate with another device or a communication network, for example, an Ethernet, a radio access network (radio access network, RAN), or a wireless local area network (wireless local area networks, WLAN). The transceiver 1003 includes a transmitter (transmitter, Tx) and a receiver (receiver, Rx).

The output device 1004 communicates with the processor 1001, and may display information in a plurality of manners. For example, the output device 1004 may be a liquid crystal display (liquid crystal display, LCD), a light emitting diode (light emitting diode, LED) display device, a cathode ray tube (cathode ray tube, CRT) display device, a projector (projector), or the like.

The input device 1005 communicates with the processor 1001, and may receive user input in a plurality of manners. For example, the input device 1005 may be a mouse, a keyboard, a touchscreen device, or a sensor device.

The network device 90 includes at least one processor 901, at least one transceiver 903, and at least one network interface 904. Optionally, the network device 90 may further include at least one memory 902. The processor 901, the memory 902, the transceiver 903, and the network interface 904 are connected through a communication line. The network interface 904 is configured to connect to a core network device through a link (for example, an S1 interface), or connect to a network interface of another network device through a wired or wireless link (for example, an X2 interface) (not shown in FIG. 9). This is not specifically limited in this embodiment of this application. In addition, for related descriptions of the processor 901, the memory 902, and the transceiver 903, refer to descriptions of the processor 1001, the memory 1002, and the transceiver 1003 in the terminal device 100. Details are not described herein again.

Figure 10:
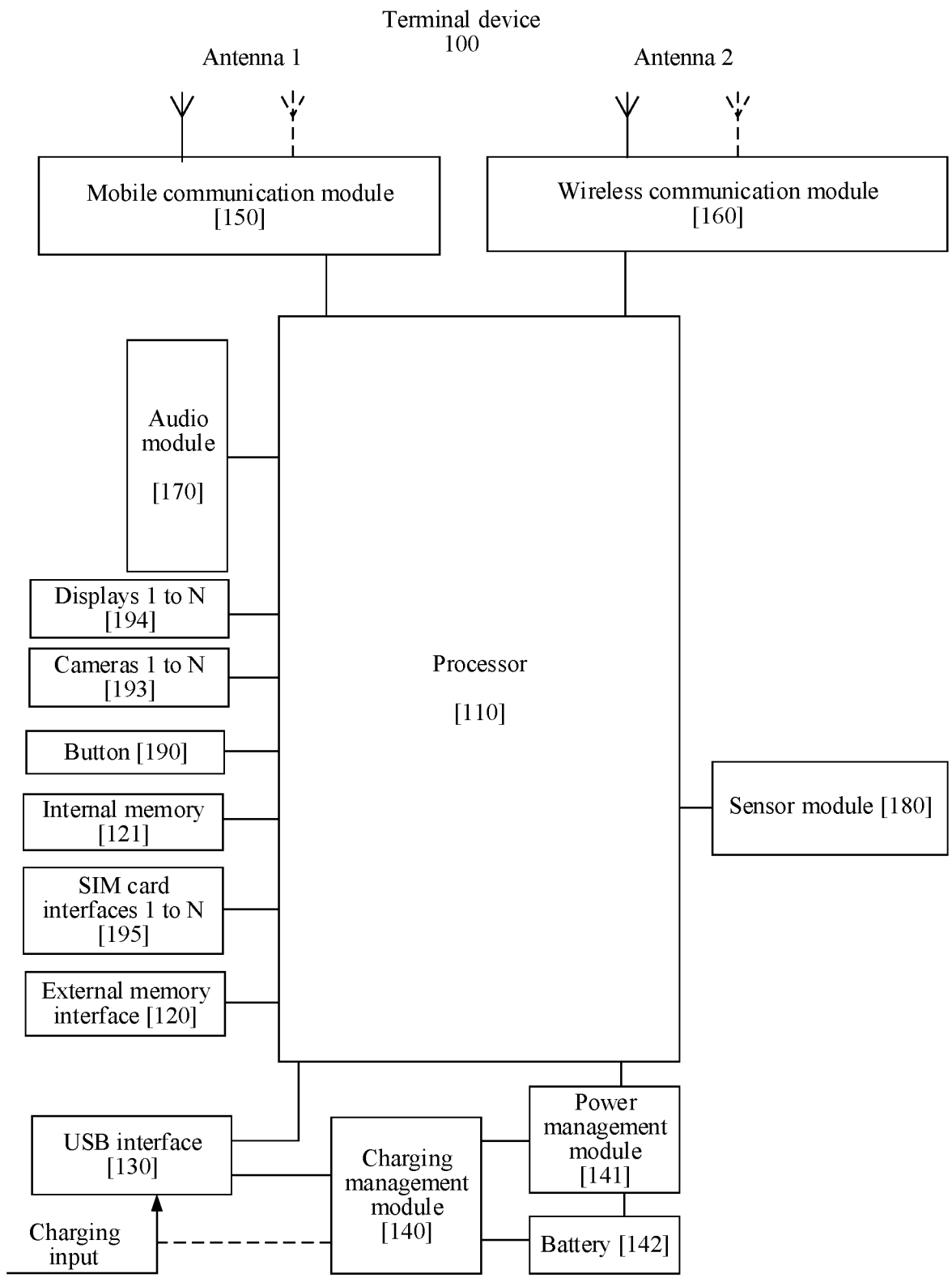
FIG. 10 is a schematic diagram of another structure of a terminal device according to an embodiment of this application.

With reference to the schematic diagram of the structure of the terminal device 100 shown in FIG. 9, for example, FIG. 10 is a specific structure form of the terminal device 100 according to an embodiment of this application.

In some embodiments, a function of the processor 1001 in FIG. 9 may be implemented by a processor 110 in FIG. 10.

In some embodiments, functions of the transceiver 1003 in FIG. 9 may be implemented through an antenna 1, an antenna 2, a mobile communication module 150, a wireless communication module 160, and the like in FIG. 10. The mobile communication module 150 may provide a solution that is applied to the terminal device 100 and that includes a wireless communication technology such as LTE, NR, or future mobile communication. The wireless communication module 160 may provide a solution that is applied to the terminal device 100 and that includes a wireless communication technology such as WLAN (for example, a Wi-Fi network), Bluetooth (Bluetooth, BT), a global navigation satellite system (global navigation satellite system, GNSS), frequency modulation (frequency modulation, FM), near field communication (near field communication, NFC), infrared, and the like. In some embodiments, the antenna 1 and the mobile communication module 150 in the terminal device 100 are coupled, and the antenna 2 and the wireless communication module 160 in the terminal device 100 are coupled, so that the terminal device 100 can communicate with a network and another device by using a wireless communication technology.

In some embodiments, a function of the memory 1002 in FIG. 9 may be implemented by using an internal memory 121 in FIG. 10, an external memory connected to an external memory interface 120, or the like.

In some embodiments, a function of the output device 1004 in FIG. 9 may be implemented by using a display 194 in FIG. 10.

In some embodiments, a function of the input device 1005 in FIG. 9 may be implemented by using a mouse, a keyboard, a touchscreen device, or a sensor module 180 in FIG. 10.

In some embodiments, as shown in FIG. 10, the terminal device 100 may further include one or more of an audio module 170, a camera 193, a button 190, a SIM card interface 195, a USB interface 130, a charging management module 140, a power management module 141, and a battery 142.

It may be understood that the structure shown in FIG. 10 does not constitute a specific limitation on the terminal device 100. For example, in some other embodiments of this application, the terminal device 100 may include more or fewer components than those shown in the figure, or some components may be combined, or some components may be split, or different component arrangement may be used. The illustrated components may be implemented in hardware, software, or a combination of software and hardware.

With reference to FIG. 1*a* to FIG. 10, the following describes the random access method provided in embodiments of this application in detail by using an example in which the network device 90 shown in FIG. 8 interacts with any terminal device 100.

It should be noted that in the following embodiments of this application, a name of a message between network elements, a name of a parameter in a message, or the like is merely an example. In specific implementation, another name may be used. This is not specifically limited in this embodiment of this application.

Figure 11:
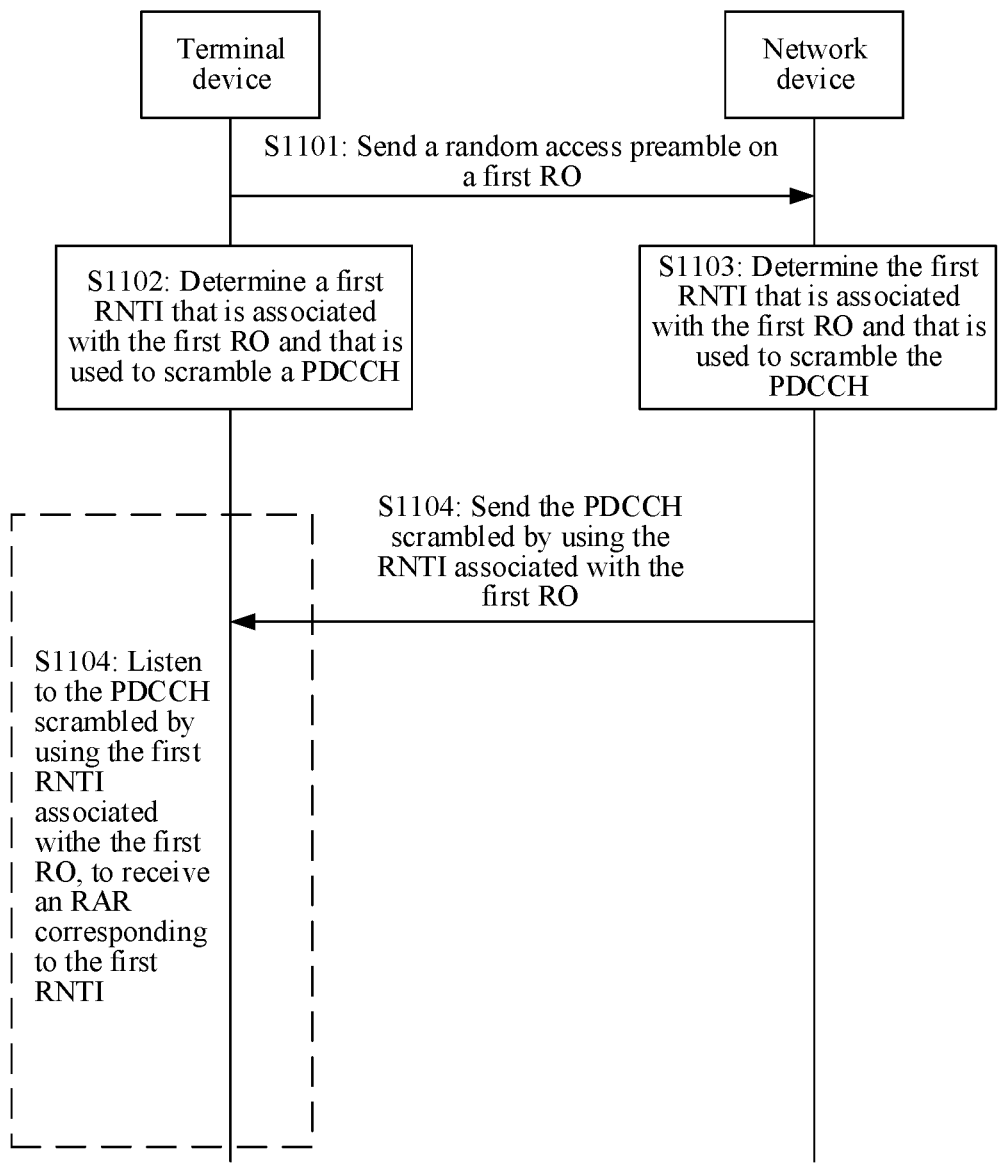
FIG. 11 is a schematic flowchart of a random access method according to an embodiment of this application.

FIG. 11 shows a random access method according to an embodiment of this application. The random access method includes the following steps S1101 to S1104.

S1101: A terminal device sends a random access preamble to a network device on a first RO. Correspondingly, the network device receives the random access preamble from the terminal device on the first RO.

S1102: The terminal device determines a first RNTI that is associated with the first RO and that is used to scramble a PDCCH.

S1103: The network device determines the first RNTI that is associated with the first RO and that is used to scramble the PDCCH.

S1104: The network device sends, to the terminal device, a PDCCH scrambled by using the first RNTI associated with the first RO. Correspondingly, the terminal device listens to the PDCCH scrambled by using the first RNTI associated with the first RO, to receive a corresponding RAR.

It should be noted that there is no necessary execution sequence between step S1101 and step S1102. Step S1101 may be performed first, and then step S1102 is performed. Alternatively, step S1102 may be performed first, and then step S1101 is performed. Alternatively, step S1101 and step S1102 may be simultaneously performed. This is not specifically limited in this embodiment of this application.

Similarly, there is no necessary execution sequence between step S1101 and step S1103. Step S1101 may be performed first, and then step S1103 is performed. Alternatively, step S1103 may be performed first, and then step S1101 is performed. Alternatively, step S1101 and step S1103 may be simultaneously performed. This is not specifically limited in this embodiment of this application.

The following describes steps S1101 to S1104 in detail.

For step S1101, in this embodiment of this application, each cell may have 64 available preamble sequences. In a contention-based random access procedure, the terminal device may randomly select a preamble for access. In a contention-free random access procedure, the terminal device may perform access by using a preamble specified by the network device. For specific implementation, refer to the conventional technology, and details are not described herein again.

It can be learned from the foregoing description of how to determine a PRACH resource in the conventional technology that, before step S1101, the network device sends a SIB1 message to the terminal device, and the terminal device may determine, based on a parameter in the SIB1 message, the first RO corresponding to the preamble. For specific implementation, refer to the foregoing description of the PRACH resource, and details are not described herein again.

In this embodiment of this application, the first RO corresponds to a first device type and/or a first service type. For example, a terminal device of the first device type in this embodiment of this application may be a low-capability terminal device, such as the foregoing REDCAP terminal device. For example, a service of the first service type in this embodiment of this application may be a small-packet transmission service.

It should be noted that the first device type in this embodiment of this application is used to distinguish from a second device type. For example, a capability of a terminal device of the second device type is higher than a capability of the terminal device of the first device type. For example, the terminal device of the second device type in this embodiment of this application may be, for example, the foregoing conventional terminal device.

It should be noted that the first service type in this embodiment of this application is used to distinguish from a second service type. A service of the second service type is another service other than a service of the first service type. For example, the service of the second service type in this embodiment of this application may be, for example, another service other than a small-packet transmission service.

For step S1102 and step S1103, in a possible implementation, calculation of the first RNTI is related to the first device type and/or the first service type. In other words, calculation rules of RNTIs corresponding to terminal devices of different device types or services of different service types may be different, so that a conflict between RNTIs corresponding to terminal devices of different device types or services of different service types can be avoided. The following describes two scenarios in detail.

Scenario 1: A frequency domain start index A of the first RO is equal to 0.

For example, the terminal device of the first device type is a REDCAP terminal device, and the terminal device of the second device type is a conventional terminal device. This scenario includes a case in which the network device separately configures independent SIB1s for the REDCAP terminal device and the conventional terminal device. The REDCAP terminal device can only read the SIB1 separately configured for the REDCAP terminal device. Alternatively, the scenario includes a case in which the REDCAP terminal device shares a SIB1 with the conventional terminal device. In the scenario 1, an RO frequency domain index of the REDCAP terminal device starts from 0, in other words, the frequency domain start index A of the first RO is equal to 0.

Figure 12:
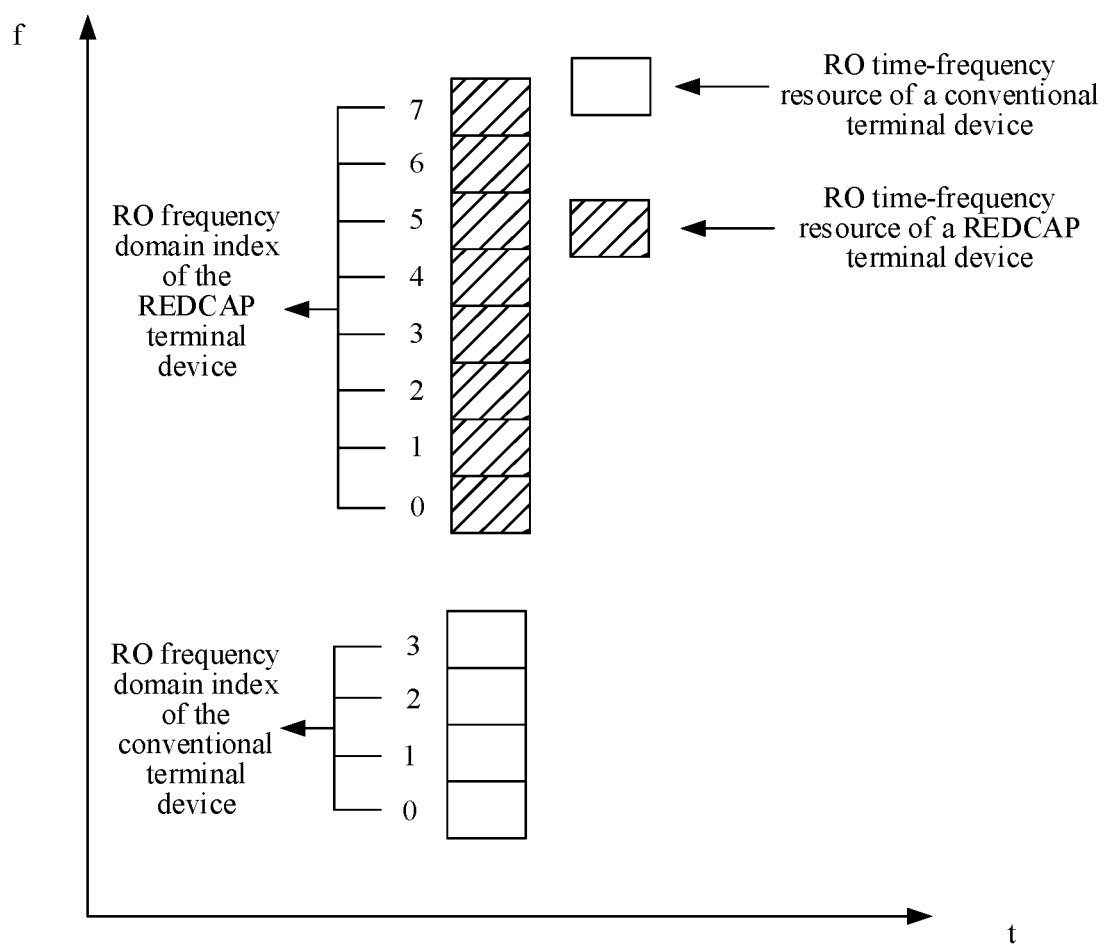
FIG. 12 is a schematic diagram in which an RO frequency domain start index of a REDCAP terminal device is 0 according to an embodiment of this application.

In this scenario, in the conventional technology, an RNTI associated with an RO of the REDCAP terminal device and an RNTI associated with an RO of the conventional terminal device may overlap. For example, refer to FIG. 12. When time domain locations of ROs that have a same frequency domain index are the same, parameters s_id, t_id, and f_id in the foregoing formula (1) and formula (2) are the same; and when ul_carrier_id is also the same, an RA-RNTI associated with the RO of the REDCAP terminal device that is obtained through calculation according to the formula (1) is also the same as an RA-RNTI associated with the RO of the conventional terminal device. Alternatively, an MSGB-RNTI associated with the RO of the REDCAP terminal device that is obtained through calculation according to the formula (2) is also the same as an MSGB-RNTI associated with the RO of the conventional terminal device.

In this embodiment of this application, when the network device supports only 4-step random access, a calculation rule of an RA-RNTI corresponding to the terminal device of the second device type or the service of the second service type satisfies the foregoing formula (1), and details are not described herein again.

A calculation rule of an RA-RNTI corresponding to the terminal device of the first device type or the service of the first service type may satisfy the following formula (3):

$$\text{RA-RNTI}=1+s\_id+14\times t\_id+14\times 80\times (f\_id+N)+14\times 80\times 8\times ul\_carrier\_id \quad \text{Formula (3)}$$

N is an integer greater than 15, for example, N=16.

Alternatively, the calculation rule of the RA-RNTI corresponding to the terminal device of the first device type or the service of the first service type may satisfy the following formula (4):

$$\text{RA-RNTI}=1+s\_id+14\times t\_id+14\times 80\times f\_id+14\times 80\times 8\times ul\_carrier\_id+14\times 80\times 8\times G \quad \text{Formula (4)}$$

G is an integer greater than 1, for example, G=2.

Alternatively, the calculation rule of the RA-RNTI corresponding to the terminal device of the first device type may satisfy the following formula (5):

$$\text{RA-RNTI}=1+s\_id+14\times t\_id+14\times 80\times f\_id+14\times 80\times 8\times ul\_carrier\_id+14\times 80\times 8\times 2\times \text{UE\_type} \quad \text{Formula (5)}$$

A value of UE_type corresponding to the terminal device of the first device type is 1.

Alternatively, the calculation rule of the RA-RNTI corresponding to the service of the first service type may satisfy the following formula (6):

$$\text{RA-RNTI}=1+s\_id+14\times t\_id+14\times 80\times f\_id+14\times 80\times 8\times ul\_carrier\_id+14\times 80\times 8\times 2\times \text{service\_type} \quad \text{Formula (6)}$$

A value of service type corresponding to the service of the first service type is 1.

In addition, the calculation rule of the RA-RNTI corresponding to the terminal device of the second device type may further satisfy the foregoing formula (5), where a value of UE_type corresponding to the terminal device of the second device type is 0. The calculation rule of the RA-RNTI corresponding to the service of the second service type may further satisfy the foregoing formula (6), where a value of service type corresponding to the service of the second service type is 0.

It should be noted that UE_type in the foregoing formula (5) is a pronoun of a device type, and service type in the foregoing formula (6) is a pronoun of a service type. Both of the parameters may be replaced with any other noun without affecting the solution in this embodiment of this application.

In the foregoing formula (3) to formula (6), f_id represents a frequency domain index of the first RO, and $0 \le f\_id < 8$; s_id represents an index of the first OFDM symbol of the first RO, and $0 \le s\_id < 14$; t_id represents an index of the first timeslot of the first RO, and $0 \le t\_id < 80$; and ul_carrier_id represents a UL carrier for transmitting the random access preamble. When the UL carrier is an NUL carrier, ul_carrier_id is 0, or when the UL carrier is an SUL carrier, ul_carrier_id is 1.

According to the foregoing parameter ranges, it may be learned that value ranges of the RA-RNTI that corresponds to the terminal device of the first device type and that is determined according to the formula (3), the formula (4), the formula (5), and the formula (6) and the RA-RNTI that corresponds to the service of the first service type and that is determined according to the formula (3), the formula (4), the formula (5), and the formula (6) are respectively [17921, +∞), [17921, +∞), [17921, 35840], and [17921, 35840] in decimal format. Because a value range of the RA-RNTI that corresponds to the terminal device of the second device type or the service of the second service type and that is determined according to the foregoing formula (1), formula (5), and formula (6) is [1, 17920], it can be learned that when the network device supports only 4-step random access, values of the RA-RNTIs corresponding to the terminal device of the first device type and the terminal device of the second device type do not overlap, or values of the RA-RNTIs corresponding to the service of the first service type and the service of the second service type do not overlap. Therefore, in this embodiment of this application, a conflict between the RA-RNTI corresponding to the terminal device of the first device type and the RA-RNTI corresponding to the terminal device of the second device type can be avoided. Alternatively, a conflict between the RA-RNTI corresponding to the service of the first service type and the RA-RNTI corresponding to the service of the second service type can be avoided.

Further, considering that the value range of the RA-RNTI need to exceed an existing maximum value of the RA-RNTI/MSGB-RNT (65522 in decimal format), in the foregoing formula (3), N is an integer greater than 15 and less than 43. In the foregoing formula (4), G is an integer greater than 1 and less than 6.

According to the foregoing parameter ranges, it may be learned that value ranges of the RA-RNTI that corresponds to the terminal device of the first device type and that is determined according to the formula (3) and the formula (4) or the RA-RNTI that corresponds to the service of the first service type and that is determined according to the formula (3) and the formula (4) is respectively [17921, 64960] or [17921, 62720] in decimal format. Because the value range of the RA-RNTI corresponding to the terminal device of the second device type or the service of the second service type determined according to the foregoing formula (1), formula (5), and formula (6) is [1, 17920], it may be learned that when the network device supports only 4-step random access, the values of the RA-RNTIs corresponding to the terminal device of the first device type and the terminal device of the second device type do not overlap, or the values of the RA-RNTIs corresponding to the service of the first service type and the service of the second service type do not overlap. In addition, the value range of the RA-RNTI corresponding to the terminal device of the first device type or the service of the first service type is less than the existing maximum value of the RA-RNTI/MSGB-RNTI (65522 in decimal format). Therefore, in this embodiment of this application, a conflict between the RA-RNTI corresponding to the terminal device of the first device type and the RA-RNTI corresponding to the terminal device of the second device type can be avoided. Alternatively, a conflict between the RA-RNTI corresponding to the service of the first service type and the RA-RNTI corresponding to the service of the second service type can be avoided. In conclusion, in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided.

In this embodiment of this application, when the network device supports 2-step random access, the calculation rule of the RA-RNTI corresponding to the terminal device of the second device type or the service of the second service type satisfies the foregoing formula (1), and details are not described herein again.

The calculation rule of the MSGB-RNTI corresponding to the terminal device of the second device type or the service of the second service type satisfies the foregoing formula (2), and details are not described herein again.

The calculation rule of the RA-RNTI corresponding to the terminal device of the first device type or the service of the first service type may satisfy the following formula (7):

$$\text{RA-RNTI}=1+s\_id+14\times t\_id+14\times 80\times (f\_id+N)+14\times 80\times 8\times ul\_carrier\_id \quad \text{Formula (7)}$$

N is an integer greater than 31, for example, N=32.

Alternatively, the calculation rule of the RA-RNTI corresponding to the terminal device of the first device type or the service of the first service type may satisfy the following formula (8):

$$\text{RA-RNTI}=1+s\_id+14\times t\_id+14\times 80\times f\_id+14\times 80\times 8\times ul\_carrier\_id+14\times 80\times 8\times G \quad \text{Formula (8)}$$

G is an integer greater than 3, for example, G=4.

Alternatively, the calculation rule of the RA-RNTI corresponding to the terminal device of the first device type or the service of the first service type may satisfy the following formula (9):

$$\text{RA-RNTI}=1+s\_id+14\times t\_id+14\times 80\times (f\_id+N)+14\times 80\times 8\times ul\_carrier\_id+14\times 80\times 8\times 2 \quad \text{Formula (9)}$$

N is an integer greater than 15, for example, N=16.

Alternatively, the calculation rule of the RA-RNTI corresponding to the terminal device of the first device type or the service of the first service type may satisfy the following formula (10):

$$\text{RA-RNTI}=1+s\_id+14\times t\_id+14\times 80\times f\_id+14\times 80\times 8\times ul\_carrier\_id+14\times 80\times 8\times 2+14\times 80\times 8\times G \quad \text{Formula (10)}$$

G is an integer greater than 1, for example, G=2.

Alternatively, the calculation rule of the RA-RNTI corresponding to the terminal device of the first device type may satisfy the following formula (11):

$$\text{RA-RNTI}=1+s\_id+14\times t\_id+14\times 80\times f\_id+14\times 80\times 8\times ul\_carrier\_id+14\times 80\times 8\times 2+14\times 80\times 8\times 2\times UE\_type \quad \text{Formula (11)}$$

A value of UE_type of the terminal device of the first device type is 1.

Alternatively, the calculation rule of the RA-RNTI corresponding to the service of the first service type may satisfy the following formula (12):

$$\text{RA-RNTI}=1+s\_id+14\times t\_id+14\times 80\times f\_id+14\times 80\times 8\times ul\_carrier\_id+14\times 80\times 8\times 2+14\times 80\times 8\times 2\times service\_type \quad \text{Formula (12)}$$

A value of service_type corresponding to the service of the first service type is 1.

It should be noted that ULE_type in the foregoing formula (11) is a pronoun of a device type, and the service_type in the foregoing formula (12) is a pronoun of a service type. Both of the two parameters may be replaced with any other noun without affecting the solution in this embodiment of this application.

In the foregoing formula (7) to formula (12), f_id represents the frequency domain index of the first RO, and $0 \le f\_id < 8$; s_id represents the index of the first OFDM symbol of the first RO, and $0 \le s\_id < 14$; t_id represents the index of the first timeslot of the first RO, and $0 \le t\_id < 80$; and ul_carrier_id represents the UL carrier for transmitting the random access preamble. When the UL carrier is an NUL carrier, ul_carrier_id is 0, or when the UL carrier is an SUL carrier, ul_carrier_id is 1.

According to the foregoing parameter ranges, value ranges of the RA-RNTIs that correspond to the terminal device of the first device type or the service of the first service type and that are determined according to the formula (7), the formula (8), the formula (9), the formula (10), the formula (11), and the formula (12) are respectively [35841, +∞), [35841, +∞), [35841, +∞), [35841, +∞), [35841, 53760], and [35841, 53760]. The value range of the RA-RNTI that corresponds to the terminal device of the second device type or the service of the second service type and that is determined according to the foregoing formula (1) is [1, 17920], and the value range of the MSGB-RNTI that corresponds to the terminal device of the second device type or the service of the second service type and that is determined according to the foregoing formula (2) is [17921, 35840]. Therefore, it can be learned that when the network device supports 2-step random access, the value of the RA-RNTI corresponding to the terminal device of the first device type does not overlap the value of the RA-RNTI corresponding to the terminal device of the second device type or the value of the MSGB-RNTI corresponding to the terminal device of the second device type. Alternatively, when the network device supports 2-step random access, the value of the RA-RNTI corresponding to the service of the first service type does not overlap the value of the RA-RNTI corresponding to the service of the second service type or the value of the MSGB-RNTI corresponding to the service of the second service type. Therefore, based on the foregoing solution, a conflict between the RA-RNTI corresponding to the terminal device of the first device type and the RNTI (including the RA-RNTI and the MSGB-RNTI) corresponding to the terminal device of the second device type can be avoided. Alternatively, a conflict between the RA-RNTI corresponding to the service of the first service type and the RNTI (including the RA-RNTI and the MSGB-RNTI) corresponding to the service of the second service type can be avoided.

Further, considering that the value range of the RA-RNTI should not exceed the existing maximum value of the RA-RNTI/MSGB-RNTI (65522 in decimal format), in the foregoing formula (7), N is an integer greater than 31 and less than 43, in the foregoing formula (8), G is an integer greater than 3 and less than 6, in the foregoing formula (9), N is an integer greater than 15 and less than 27, and in the foregoing formula (10), G is an integer greater than 1 and less than 4.

Based on the foregoing parameter ranges, it may be learned that value ranges of the RA-RNTIs that correspond to the terminal device of the first device type or the service of the first service type and that are determined according to the formula (7), the formula (8), the formula (9), and the formula (10) are respectively [35841, 64960], [35841, 62720], [35841, 64960], and [35841, 62720]. The value range of the RA-RNTI that corresponds to the terminal device of the second device type or the service of the second service type and that is determined according to the foregoing formula (1) is [1, 17920], and the value range of the MSGB-RNTI that corresponds to the terminal device of the second device type or the service of the second service type and that is determined according to the foregoing formula (2) is [17921, 35840]. Therefore, it can be learned that when the network device supports 2-step random access, the value of the RA-RNTI corresponding to the terminal device of the first device type does not overlap the value of the RA-RNTI corresponding to the terminal device of the second device type or the value of the MSGB-RNTI corresponding to the terminal device of the second device type. Alternatively, when the network device supports 2-step random access, the value of the RA-RNTI corresponding to the service of the first service type does not overlap the value of the RA-RNTI corresponding to the service of the second service type or the value of the MSGB-RNTI corresponding to the service of the second service type. In addition, the value range of the RA-RNTI corresponding to the terminal device of the first device type or the service of the first service type is less than the existing maximum value of the RA-RNTI/MSGB-RNTI. That is, based on the foregoing solution, a conflict between the RA-RNTI corresponding to the terminal device of the first device type and the RNTI (including the RA-RNTI and the MSGB-RNTI) corresponding to the terminal device of the second device type can be avoided. Alternatively, a conflict between the RA-RNTI corresponding to the service of the first service type and the RNTI (including the RA-RNTI and the MSGB-RNTI) corresponding to the service of the second service type can be avoided. Therefore, according to the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided.

Scenario 2: A frequency domain start index A of the first RO is equal to M, and M is a quantity of frequency division ROs corresponding to the terminal device of the second device type or the service of the second service type. That is, a frequency domain start index of the frequency division RO corresponding to the terminal device of the second device type or the service of the second service type is 0. The index of the frequency division RO corresponding to the terminal device of the first device type or the service of the first service type is continuously numbered based on a number of the frequency division RO corresponding to the terminal device of the second device type or the service of the second service type.

Figure 13:
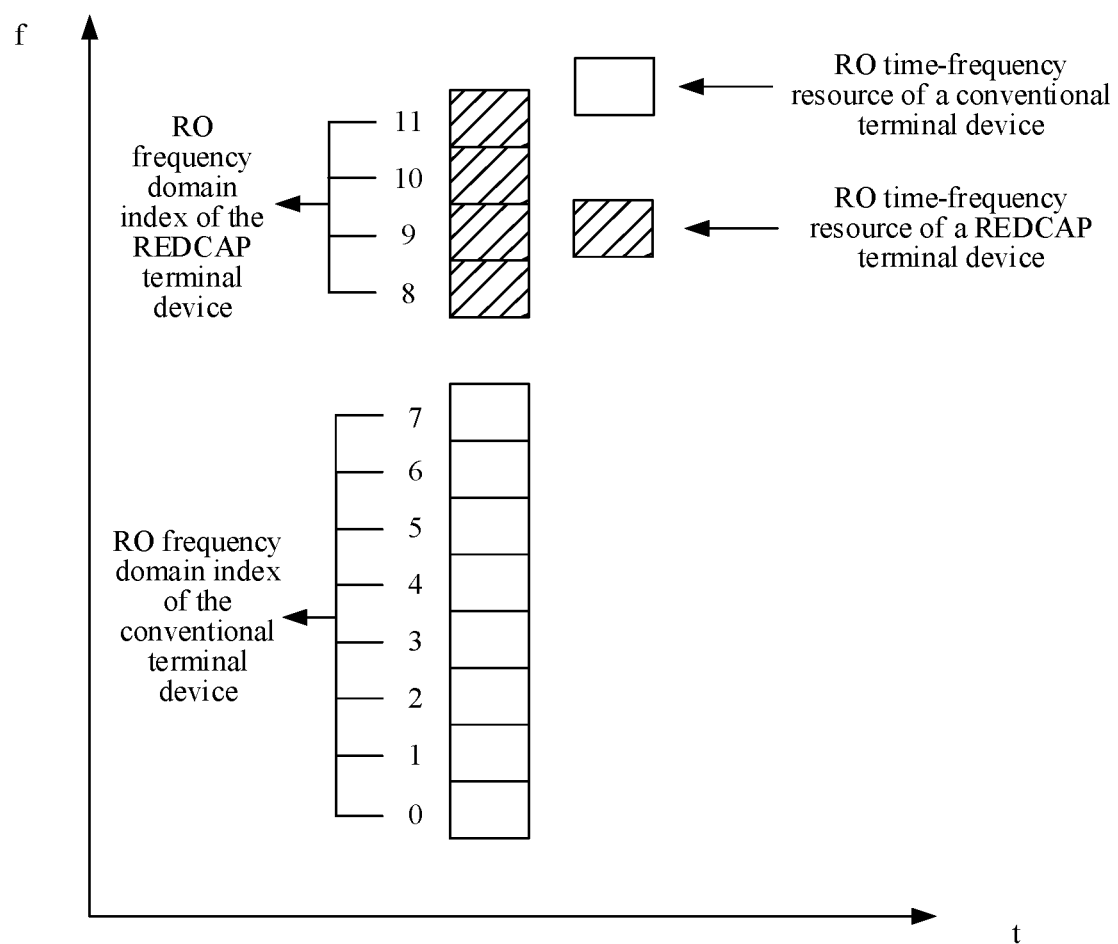
FIG. 13 is a schematic diagram in which an RO frequency domain start index of a REDCAP terminal device is M according to an embodiment of this application.

That the terminal device of the first device type is a REDCAP terminal device, and the terminal device of the second device type is a conventional terminal device is used as an example. The scenario includes a case in which the network device separately configures an independent SIB1 for the REDCAP terminal device and the conventional terminal device, and a case in which the REDCAP terminal device and the conventional terminal device share a SIB1. In the foregoing cases, the REDCAP terminal device needs to obtain a quantity of frequency division ROs configured by the network device for the conventional terminal device. For example, refer to FIG. 13. When the quantity M of the frequency division ROs of the conventional terminal device is 8, the frequency domain start index A of the REDCAP terminal device is equal to M and is 8. In this scenario, the quantity M of frequency division ROs corresponding to the terminal device of the second device type or the service of the second service type may be {1, 2, 4, 8}. A calculation rule of the RA-RNTI corresponding to the terminal device of the second device type or the service of the second service type satisfies the foregoing formula (1), and a calculation rule of the MSGB-RNTI corresponding to the terminal device of the second device type or the service of the second service type satisfies the foregoing formula (2). Details are not described herein again.

In this scenario, because a frequency domain start identifier A of the first RO is equal to M, a frequency domain start identifier A of the frequency division RO corresponding to the terminal device of the first device type or the service of the first service type may be {1, 2, 4, 8}. When the calculation rule of the RA-RNTI corresponding to the terminal device of the first device type satisfies the foregoing formula (1), or the calculation rule of the MSGB-RNTI corresponding to the terminal device of the first device type satisfies the foregoing formula (2), although a frequency division number of the RO of the terminal device of the first device type is different from a frequency division number of the RO of the terminal device of the second device type, that is, f_id in the formula (1) or formula (2) is different, when a total quantity of the frequency division ROs of the terminal device of the first device type and the terminal device of the second device type exceeds 8, the RNTI (including the RA-RNTI or the MSGB-RNTI) associated with the RO of the terminal device of the first device type and the RNTI associated with the RO of the terminal device of the second device type may overlap. Alternatively, when the calculation rule of the RA-RNTI corresponding to the service of the first service type satisfies the foregoing formula (1), or the calculation rule of the MSGB-RNTI corresponding to the service of the first service type satisfies the foregoing formula (2), although a frequency division number of the RO corresponding to the service of the first service type is different from a frequency division number of the RO corresponding to the service of the second service type, that is, f_id in the formula (1) or formula (2) is different, when a total quantity of the frequency division ROs of the service of the first service type and the service of the second service type exceeds 8, the RNTI (including the RA-RNTI or the MSGB-RNTI) associated with the RO of the service of the first service type and the RNTI associated with the RO of the service of the first service type may overlap. For example, the RA-RNTI associated with the RO of the terminal device of the first device type and the RA-RNTI associated with the RO of the terminal device of the second device type are used as an example. A comparison list may be shown in Table 3, and based on different values of f_id, the terminal device of the second device type is in a one-to-one correspondence with the terminal device of the first device type. For example, a terminal device 1a of the second device type corresponds to a terminal device 1b of the first device type, and a terminal device 2a of the second device type corresponds to a terminal device 2b of the first device type. It can be learned from RA-RNTs that are respectively corresponding to the terminal device of the second device type and the terminal device of the first device type and that are provided in Table 3 that RA-RNTI values of the terminal device of the second device type and the terminal device of the first device type that are in a one-to-one correspondence are equal.

TABLE 3

| Terminal device 1a of a second device type | f_id = 0, ul_carrier_id = 1 | RA-RNTI = 1 + s_id + 14 × t_id + 14 × 80 × 0 + 14 × 80 × 8 × 1 |
|---|---|---|
| Terminal device 1b of a first device type | f_id = 8, ul_carrier_id = 0 | RA-RNTI = 1 + s_id + 14 × t_id + 14 × 80 × 8 + 14 × 80 × 8 × 0 |
| Terminal device 2a of a second device type | f_id = 1, ul_carrier_id = 1 | RA-RNTI = 1 + s_id + 14 × t_id + 14 × 80 × 1 + 14 × 80 × 8 × 1 |
| Terminal device 2b of a first device type | f_id = 9, ul_carrier_id = 0 | RA-RNTI = 1 + s_id + 14 × t_id + 14 × 80 × 9 + 14 × 80 × 8 × 0 |
| Terminal device 3a of a second device type | f_id = 2, ul_carrier_id = 1 | RA-RNTI = 1 + s_id + 14 × t_id + 14 × 80 × 2 + 14 × 80 × 8 × 1 |
| Terminal device 3b of a first device type | f_id = 10, ul_carrier_id = 0 | RA-RNTI = 1 + s_id + 14 × t_id + 14 × 80 × 10 + 14 × 80 × 8 × 0 |
| ... | | |
| Terminal device 8a of a second device type | f_id = 7, ul_carrier_id = 1 | RA-RNTI = 1 + s_id + 14 × t_id + 14 × 80 × 7 + 14 × 80 × 8 × 1 |
| Terminal device 8b of a first device type | f_id = 15, ul_carrier_id = 0 | RA-RNTI = 1 + s_id + 14 × t_id + 14 × 80 × 15 + 14 × 80 × 8 × 0 |

It can be learned from Table 3 that when the RO frequency division number of the terminal device of the first device type is the RO frequency division number of the terminal device of the second device type plus 8, ul_carrier_id of the terminal device of the first device type is equal to 0, and ul_carrier_id of the terminal device of the second device type is equal to 1, according to the existing formula (1) for calculating an RA-RNTI value, RA-RNTIs obtained through calculation are the same. In addition, because the existing formula (2) for calculating an MSGB-RNTI value is to add a fixed value 14×80×8×2 on the basis of the formula (1), based on similar reasons, MSGB-RNTIs obtained through calculation are also the same.

In this embodiment of this application, when the network device supports only 4-step random access, the calculation rule of the RA-RNTI corresponding to the terminal device of the second device type or the service of the second service type satisfies the foregoing formula (1), and details are not described herein again.

The calculation rule of the RA-RNTI corresponding to the terminal device of the first device type or the service of the first service type may satisfy the following formula (13):

$$\text{RA-RNTI} = 1 + s\_id + 14 \times t\_id + 14 \times 80 \times (f\_id + N) + 14 \times 80 \times 8 \times ul\_carrier\_id \quad \text{Formula (13)}$$

N is an integer greater than 7, for example, N=8.

Alternatively, the calculation rule of the RA-RNTI corresponding to the terminal device of the first device type or the service of the first service type may satisfy the following formula (14):

$$\text{RA-RNTI} = 1 + s\_id + 14 \times t\_id + 14 \times 80 \times f\_id + 14 \times 80 \times 8 \times ul\_carrier\_id + 14 \times 80 \times 8 \times G \quad \text{Formula (14)}$$

G is an integer greater than 0, for example, G=1.

In the foregoing formula (13) and formula (14), f_id represents a frequency domain index of the first RO, $M \leq f\_id < 15$, and M is the quantity of frequency division ROs corresponding to the terminal device of the second device type or the service of the second service type. s_id represents an index of the first OFDM symbol of the first RO, and $0 \leq s\_id < 14$; t_id represents an index of the first timeslot of the first RO, and $0 \leq t\_id < 80$; and ul_carrier_id represents a UL carrier for transmitting the random access preamble. When the UL carrier is an NUL carrier, ul_carrier_id is 0, or when the UL carrier is an SUL carrier, ul_carrier_id is 1.

According to the foregoing parameter ranges, it can be seen that the foregoing formula (13) or formula (14) is to add 14×80×N or 14×80×8×G on the basis of the formula (1), and minimum values of N and G are 8 and 1 respectively. That is, the formula (13) and the formula (14) are to add a minimum fixed value of 8960 on the basis of the formula (1), and 8960 is equal to the value of 14×80×8×1 in Table 3. That is, impact of different values of ul_carrier_id in Table 3 on the RA-RNTI is eliminated. Therefore, in the case listed in Table 3, the RA-RNTI value of the terminal device of the first device type and the RA-RNTI value of the terminal device of the second device type are no longer affected by the value of 14×80×8×ul_carrier_id, and no conflict occurs. However, in the scenario 2, the RO frequency division number of the terminal device of the first device type is performed based on the RO frequency division number of the terminal device of the second device type. Therefore, f_id of the terminal device of the first device type cannot be the same as f_id of the terminal device of the second device type. Therefore, the RA-RNTI values separately determined by the terminal device of the first device type and the terminal device of the second device type cannot be the same. In other words, there is no conflict between the RA-RNTIs corresponding to the terminal device of the first device type and the terminal device of the second device type. For similar reasons, there is no conflict between the RA-RNTI corresponding to the service of the first service type and the RA-RNTI corresponding to the service of the second service type. Details are not described herein again.

Further, considering that the value range of the RA-RNTI should not exceed the existing maximum value of the RA-RNTI/MSGB-RNTI (65522 in decimal format), in the foregoing formula (13), N is an integer greater than 7 and less than 35, and in the foregoing formula (14), G is an integer greater than 0 and less than 5.

According to the foregoing parameter ranges, it may be learned that maximum values of the RA-RNTIs that correspond to the terminal device of the first device type or the service of the first service type and that are determined according to the formula (13) and the formula (14) are respectively 64960 and 62720. It can be learned that the maximum value of the RA-RNTI corresponding to the terminal device of the first device type or the service of the first service type is less than the existing maximum value of the RA-RNTI/MSGB-RNTI. In addition, in the foregoing formula (13) or formula (14), when minimum values of N and G are respectively 8 and 1, there is no conflict between the RA-RNTIs corresponding to the terminal device of the first device type and the terminal device of the second device type. In this solution, there is no conflict between the RA-RNTI corresponding to the terminal device of the first device type and the terminal device of the second device type, or there is no conflict between the RA-RNTI corresponding to the service of the first service type and the service of the second service type. Therefore, according to the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided.

In this embodiment of this application, when the network device supports 2-step random access, the calculation rule of the RA-RNTI corresponding to the terminal device of the second device type or the service of the second service type satisfies the foregoing formula (1), and details are not described herein again.

The calculation rule of the MSGB-RNTI corresponding to the terminal device of the second device type or the service of the second service type satisfies the foregoing formula (2), and details are not described herein again.

The calculation rule of the RA-RNTI corresponding to the terminal device of the first device type or the service of the first service type may satisfy the following formula (15):

$$\text{RA-RNTI}=1+s\_id+14 \times t\_id+14 \times 80 \times (f\_id+N)+14 \times 80 \times 8 \times ul\_carrier\_id \quad \text{Formula (15)}$$

N is an integer greater than 23, for example, N=24.

Alternatively, the calculation rule of the RA-RNTI corresponding to the terminal device of the first device type or the service of the first service type may satisfy the following formula (16):

$$\text{RA-RNTI}=1+s\_id+14 \times t\_id+14 \times 80 \times f\_id+14 \times 80 \times 8 \times ul\_carrier\_id+14 \times 80 \times 8 \times G \quad \text{Formula (16)}$$

G is an integer greater than 2, for example, G=3.

Alternatively, the calculation rule of the RA-RNTI corresponding to the terminal device of the first device type or the service of the first service type may satisfy the following formula (17):

$$\text{RA-RNTI}=1+s\_id+14 \times t\_id+14 \times 80 \times (f\_id+N)+14 \times 80 \times 8 \times ul\_carrier\_id+14 \times 80 \times 8 \times 2 \quad \text{Formula (17)}$$

N is an integer greater than 7, for example, N=8.

Alternatively, the calculation rule of the RA-RNTI corresponding to the terminal device of the first device type or the service of the first service type may satisfy the following formula (18):

$$\text{RA-RNTI}=1+s\_id+14 \times t\_id+14 \times 80 \times f\_id+14 \times 80 \times 8 \times ul\_carrier\_id+14 \times 80 \times 8 \times 2+14 \times 80 \times 8 \times G \quad \text{Formula (18)}$$

G is an integer greater than 0, for example, G=1.

In the foregoing formula (15) to formula (18), f_id represents the frequency domain index of the first RO, $M \leq f\_id < 15$, and M is the quantity of frequency division ROs corresponding to the terminal device of the second device type or the service of the second service type. s_id represents the index of the first OFDM symbol of the first RO, and $0 \leq s\_id < 14$; t_id represents the index of the first timeslot of the first RO, and $0 \leq t\_id < 80$; and ul_carrier_id represents the UL carrier for transmitting the random access preamble. When the UL carrier is a carrier, ul_carrier_id is 0, or when the UL carrier is an SUL carrier, ul_carrier_id is 1.

According to the foregoing parameter ranges, it can be seen that the foregoing formula (15) and formula (16) are to add 14×80×N or 14×80×8×G on the basis of the formula (1), and minimum values of N and G are 24 and 3 respectively. That is, the formula (13) and the formula (14) are to add a minimum fixed value 26880 on the basis of the formula (1). The formula (17) and the formula (18) are to add 14×80×N or 14×80×8×G respectively on the basis of the formula (2), and minimum values of N and G are respectively 8 and 1. That is, the foregoing formula (17) or formula (18) is to add a minimum fixed value 8960 on the basis of the formula (2). Formula (2) is to add 14×80×8×2 on the basis of the formula (1), that is, a fixed value 17920. Further, 26880=17920+8960. Therefore, the foregoing formula (15), formula (16), formula (17), and formula (18) are to add a minimum fixed value 8960+17920 on the basis of the formula (1). Based on the foregoing description, when the network device supports only 4-step random access, in this embodiment of this application, a conflict between the RA-RNTIs corresponding to the terminal device of the first device type and the terminal device of the second device type can be avoided, or a conflict between the RA-RNTI corresponding to the service of the first service type and the RA-RNTI corresponding to the service of the second service type can be avoided. In a similar reason, when the network device supports 2-step random access, adding the minimum fixed value 8960 to the RA-RNTI when calculating the RA-RNTI of the terminal device of the first device type or the service of the first service type can avoid a conflict between the RA-RNTI corresponding to the terminal device of the second device type or the RA-RNTI corresponding to the service of the second service type. Further, adding 17920 when calculating the RA-RNTI by the terminal device of the first device type or the service of the first service type can avoid a conflict with the MSGB-RNTI corresponding to the terminal device of the second device type or the service of the second service type. In conclusion, based on the foregoing solution, a conflict between the RA-RNTI corresponding to the terminal device of the first device type and the RNTI (including the RA-RNTI and the MSGB-RNTI) corresponding to the terminal device of the second device type can be avoided. Alternatively, a conflict between the RA-RNTI corresponding to the service of the first service type and the RNTI (including the RA-RNTI and the MSGB-RNTI) corresponding to the service of the second service type can be avoided.

Further, considering that the value range of the RNTI should not exceed the existing maximum value (65522 in decimal format) of the RNTI, in the foregoing formula (15), N is an integer greater than 23 and less than 35, in the foregoing formula (16), G is an integer greater than 2 and less than 5, in the foregoing formula (17), N is an integer greater than 7 and less than 19, and in the foregoing formula (18), G is an integer greater than 0 and less than 3.

According to the foregoing parameter ranges it may be learned that maximum values of RA-RNTIs that correspond to the terminal device of the first device type or the service of the first service type and that are determined according to the formula (15), the formula (16), the formula (17), and the formula (18) are respectively 64960, 62720, 64960, and 62720. It can be learned that the maximum value of the RA-RNTI corresponding to the terminal device of the first device type or the service of the first service type is less than the existing maximum value of the RA-RNTI/MSGB-RNTI. In addition, based on the foregoing description, in the foregoing formula (15), formula (16), formula (17), or formula (18), when N and G respectively take the minimum value, a reason for conflict between the RA-RNTI corresponding to the terminal device of the first device type and the RNTI (including the RA-RNTI and the MSGB-RNTI) corresponding to the terminal device of the second device type can be avoided. In this solution, a conflict between the RA-RNTI corresponding to the terminal device of the first device type and the RNTI (including the RA-RNTI and the MSGB-RNTI) corresponding to the terminal device of the second device type can be avoided. Alternatively, a conflict between the RA-RNTI corresponding to the terminal device of the first device type and the RNTI (including the RA-RNTI and the MSGB-RNTI) corresponding to the terminal device of the second device type can be avoided. Therefore, according to the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided.

The foregoing scenario 1 and scenario 2 are examples and provide an RA-RNTI determining manner, where a maximum value of the RA-RNTI is less than a maximum value FFF2 (corresponding to 16 bits in binary format and corresponding to 65522 in decimal format) that is available for the RA-RNTI/MSGB-RNTI and that is provided in the conventional technology. However, as described above, as PRACH resources are divided by various terminal types and/or service types, a value range of the RA-RNTI/MSGB-RNTI is likely to exceed the existing maximum value (FFF2). With reference to the foregoing scenario 1 and scenario 2, the following further provides a manner of determining an RA-RNTI and an MSGB-RNTI when a maximum value of the RNTI is extended, for example, when the RNTI is extended to 20 bits.

Scenario 1: The frequency domain start identifier A of the first RO is equal to 0.

In this embodiment of this application, the calculation rule of the RA-RNTI corresponding to the terminal device of the second device type or the service of the second service type satisfies the foregoing formula (1). Details are not described herein again.

The calculation rule of the MSGB-RNTI corresponding to the terminal device of the second device type or the service of the second service type satisfies the foregoing formula (2), and details are not described herein again.

The calculation rule of the RNTI (including the RA-RNTI or the MSGB-RNTI) corresponding to the terminal device of the first device type or the service of the first service type may satisfy the following formula (19):

$$\text{RNTI}=1+s\_id+14\times t\_id+14\times 80\times (f\_id+N)+14\times 80\times 8\times ul\_carrier\_id \quad \text{Formula (19)}$$

N is an integer greater than 47, for example, N=48.

Alternatively, the calculation rule of the RNTI corresponding to the terminal device of the first device type or the service of the first service type may satisfy the following formula (20):

$$\text{RNTI}=1+s\_id+14\times t\_id+14\times 80\times f\_id+14\times 80\times 8\times ul\_carrier\_id+14\times 80\times 8\times G \quad \text{Formula (20)}$$

G is an integer greater than 5, for example, G=6.

Alternatively, the calculation rule of the RNTI corresponding to the terminal device of the first device type or the service of the first service type may satisfy the following formula (21):

$$\text{RNTI}=1+s\_id+14\times t\_id+14\times 80\times (f\_id+N)+14\times 80\times 8\times ul\_carrier\_id+14\times 80\times 8\times 2 \quad \text{Formula (21)}$$

N is an integer greater than 31, for example, N=32.

Alternatively, the calculation rule of the RNTI corresponding to the terminal device of the first device type or the service of the first service type may satisfy the following formula (22):

$$\text{RNTI}=1+s\_id+14\times t\_id+14\times 80\times f\_id+14\times 80\times 8\times ul\_carrier\_id+14\times 80\times 8\times 2+14\times 80\times 8\times G \quad \text{Formula (22)}$$

G is an integer greater than 3, for example, G=4.

Alternatively, the calculation rule of the RNTI corresponding to the terminal device of the first device type may satisfy the following formula (23):

$$\text{RNTI}=1+s\_id+14\times t\_id+14\times 80\times f\_id+14\times 80\times 8\times ul\_carrier\_id+14\times 80\times 8\times 4+14\times 80\times 8\times 2\times \text{UE\_type} \quad \text{Formula (23)}$$

A value of UE_type of the terminal device of the first device type is 1.

Alternatively, the calculation rule of the RNTI corresponding to the service of the first service type may satisfy the following formula (24):

$$\text{RNTI}=1+s\_id+14\times t\_id+14\times 80\times f\_id+14\times 80\times 8\times ul\_carrier\_id+14\times 80\times 8\times 4+14\times 80\times 8\times 2\times \text{service\_type} \quad \text{Formula (24)}$$

A value of service type of the service of the first service type is 1.

It should be noted that UE_type in the foregoing formula (23) is a pronoun of a device type, and service_type in the foregoing formula (24) is a pronoun of a service type. Both of the two parameters may be replaced with any other noun without affecting the solutions in embodiments of this application.

In the foregoing formula (19) to formula (24), f_id represents the frequency domain index of the first RO, and $0 \leq f\_id < 8$; s_id represents the index of the first OFDM symbol of the first RO, and $0 \leq s\_id < 14$; t_id represents the index of the first timeslot of the first RO, and $0 \leq t\_id < 80$; and ul_carrier_id represents the index of the UL carrier for transmitting the random access preamble. When the UL carrier is an NUL carrier, ul_carrier_id is 0, or when the UL carrier is an SUL carrier, ul_carrier_id is 1.

According to the foregoing parameter ranges, it can be learned that RNTI value ranges of the formula (19), the formula (20), the formula (21), the formula (22), the formula (23), and the formula (24) are all [53761, +∞). The value range of the RA-RNTI determined according to the foregoing formula (1) is [1, 17920], and the value range of the MSGB-RNTI determined according to the foregoing formula (2) is [17921, 35840]. Therefore, in this embodiment of this application, the RNTI value corresponding to the terminal device of the first terminal device type does not overlap the RA-RNTI value and the MSGB-RNTI value corresponding to the terminal device of the second terminal device type. In conclusion, based on the foregoing solution, when the maximum value of the RA-RNTI/MSGB-RNTI is extended, a conflict between the RNTI corresponding to the terminal device of the first device type and the RNTI (including the RA-RNTI and the MSGB-RNTI) corresponding to the terminal device of the second device type can be avoided. Alternatively, a conflict between the RNTI corresponding to the service of the first service type and the RNTI (including the RA-RNTI and the MSGB-RNTI) corresponding to the service of the second service type can be avoided.

Scenario 2: The frequency domain start identifier A of the first RO is equal to M, and M is the quantity of frequency division ROs corresponding to the terminal device of the second device type or the service of the second service type.

The calculation rule of the RA-RNTI corresponding to the terminal device of the second device type or the service of the second service type satisfies the foregoing formula (1), and details are not described herein again.

The calculation rule of the MSGB-RNTI corresponding to the terminal device of the second device type or the service of the second service type satisfies the foregoing formula (2), and details are not described herein again.

The calculation rule of the RNTI corresponding to the terminal device of the first device type or the service of the first service type may satisfy the following formula (25):

$$\text{RNTI}=1+s\_id+14 \times t\_id+14 \times 80 \times (f\_id+N)+14 \times 80 \times 8 \times \text{ul\_carrier\_id} \quad \text{Formula (25)}$$

N is an integer greater than 39, for example, N=40.

Alternatively, the calculation rule of the RNTI corresponding to the terminal device of the first device type or the service of the first service type may satisfy the following formula (26):

$$\text{RNTI}=1+s\_id+14 \times t\_id+14 \times 80 \times f\_id+14 \times 80 \times 8 \times \text{ul\_carrier\_id}+14 \times 80 \times 8 \times G \quad \text{Formula (26)}$$

G is an integer greater than 4, for example, G=5.

Alternatively, the calculation rule of the RNTI corresponding to the terminal device of the first device type or the service of the first service type may satisfy the following formula (27):

$$\text{RNTI}=1+s\_id+14 \times t\_id+14 \times 80 \times (f\_id+N)+14 \times 80 \times 8 \times \text{ul\_carrier\_id}+14 \times 80 \times 8 \times 2 \quad \text{Formula (27)}$$

N is an integer greater than 23, for example, N=24.

Alternatively, the calculation rule of the RNTI corresponding to the terminal device of the first device type or the service of the first service type may satisfy the following formula (28):

$$\text{RNTI}=1+s\_id+14 \times t\_id+14 \times 80 \times f\_id+14 \times 80 \times 8 \times \text{ul\_carrier\_id}+14 \times 80 \times 8 \times 2+14 \times 80 \times 8 \times G \quad \text{Formula (28)}$$

G is an integer greater than 2, for example, G=3.

In the foregoing the formula (25) to formula (28), f_id represents the frequency domain index of the first RO, $M \leq f\_id \leq 15$, and M is the quantity of frequency division ROs corresponding to the terminal device of the second device type or the service of the second service type; s_id represents the index of the first OFDM symbol of the first RO, and $0 \leq s\_id < 14$; t_id represents the index of the first timeslot of the first RO, and $0 \leq t\_id < 80$; and ul_carrier_id represents the index of the UL carrier for transmitting the random access preamble. When the UL carrier is an NUL carrier, ul_carrier_id is 0, or when the UL carrier is an SUL carrier, ul_carrier_id is 1.

According to the foregoing parameter ranges, it can be learned that the foregoing formula (25), formula (26), formula (27), and formula (28) are to add a fixed value 17920 in this scenario on the basis of the formula (15), the formula (16), the formula (17), and the formula (18). Therefore, based on the scenario described above, a conflict between the RA-RNTIs corresponding to the formula (15), the formula (16), the formula (17), and the formula (18) and the RNTI (including the RA-RNTI and the MSGB-RNTI) corresponding to the terminal device of the second device type can be avoided. For similar reason, in this solution, a conflict between the RNTI corresponding to the terminal device of the first device type and the RNTI (including the RA-RNTI and the MSGB-RNTI) corresponding to the terminal device of the second device type can be avoided. Alternatively, a conflict between the RNTI corresponding to the service of the first service type and the RNTI (including the RA-RNTI and the MSGB-RNTI) corresponding to the service of the second service type can be avoided.

For step S902 and step S903, in another possible implementation, the calculation rule of the RNTI (including the RA-RNTI or the MSGB-RNTI) may not be changed. Instead, the frequency domain start index A of the frequency division RO of the terminal device of the first device type or the service of the first service type is adjusted, so that A=M+X, where M is the quantity of frequency division ROs corresponding to the terminal device of the second device type or the service of the second service type. Therefore, when the RO frequency domain index of the terminal device of the first device type is the RO frequency domain index of the terminal device of the second device type plus 8, ul_carrier_id of the terminal device of the first device type is equal to 0, and ul_carrier_id of the terminal device of the second device type is equal to 1 (for example, several cases listed in Table 3), a conflict between the RA-RNTI/MSG-RNTI corresponding to the terminal device of the first device type and the terminal device of the second device type can be avoided, or a conflict between the service of the first service type and the RA-RNTI/MSGB-RNTI corresponding to the service of the second service type can be avoided. The following describes in detail two random access forms.

Figure 14:
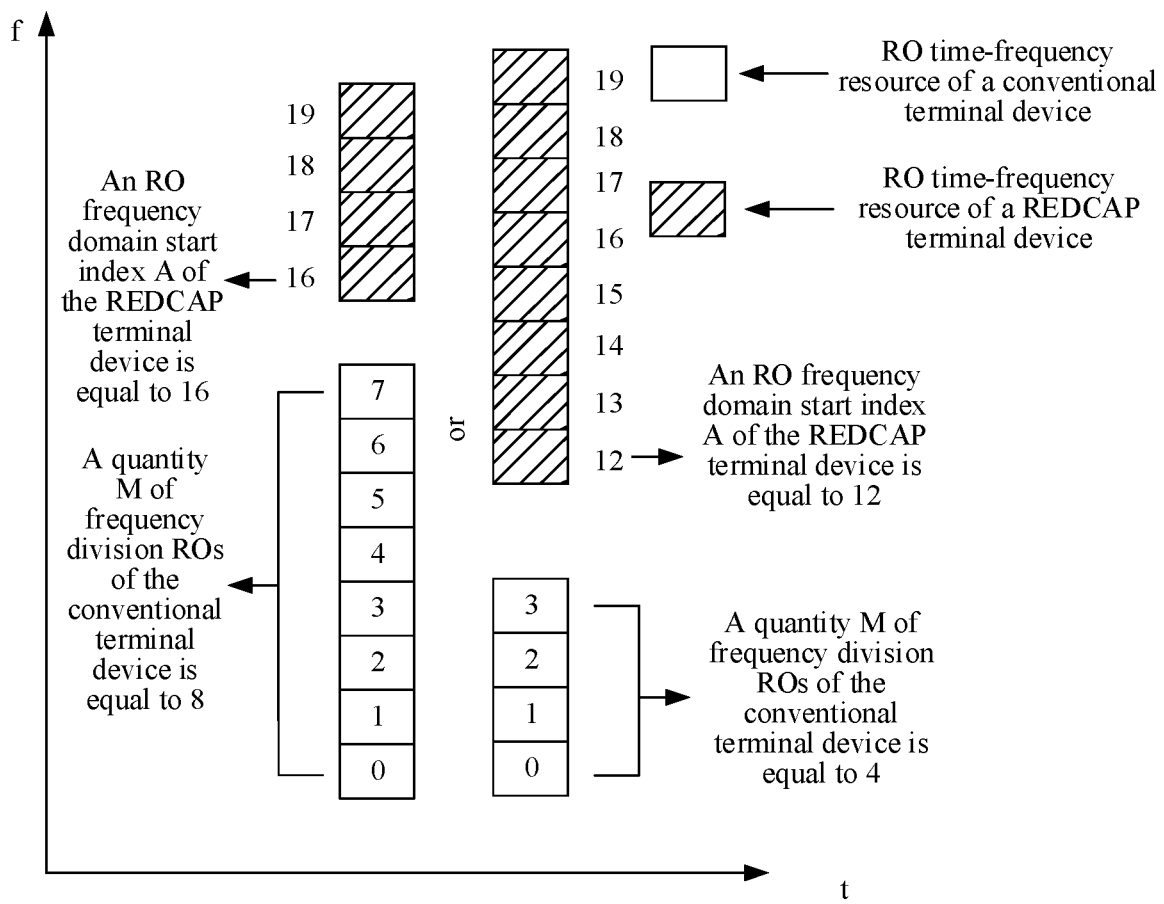
FIG. 14 is a schematic diagram of modifying a numbering rule of an RO frequency domain start index of a REDCAP terminal device according to an embodiment of this application.

In a possible implementation, when the network device supports only 4-step random access, X may be an integer greater than 7. For example, the terminal device of the first device type is a REDCAP terminal device, and the terminal device of the second device type is a conventional terminal device. Refer to FIG. 14, for example, when X=8 and M=8, A=16. Alternatively, for example, when X=8 and M=4, A=12.

The calculation rule of the RA-RNTI corresponding to the terminal device of the second device type or the service of the second service type satisfies the foregoing formula (1), and details are not described herein again.

The calculation rule of the RA-RNTI corresponding to the terminal device of the first device type or the service of the first service type satisfies the foregoing formula (1), and details are not described herein again.

It should be noted that in this embodiment of this application, when the RA-RNTI corresponding to the terminal device of the second device type or the service of the second service type is calculated, in the foregoing formula (1), $0 \leq f\_id < 8$. When the RA-RNTI of the terminal device of the first device type or the service of the first service type is calculated, in the foregoing formula (1), $M+X \leq f\_id \leq M+X+7$.

It can be learned from the foregoing parameter ranges that a minimum RO frequency domain index of the terminal device of the first device type or the service of the first service type is a maximum RO frequency domain index of the terminal device of the second device type or the service of the first service type plus 9. In other words, the RO frequency domain index of the terminal device of the first device type or the service of the first service type cannot be the RO frequency domain index of the terminal device of the second device type or the service of the second service type plus 8. Therefore, in this embodiment of this application, for example, in a case listed in Table 3, a conflict between the RA-RNTI corresponding to the terminal device of the first device type and the RA-RNTI corresponding to the terminal device of the second device type can be avoided. Alternatively, a conflict between the RA-RNTI corresponding to the service of the first service type and the RA-RNTI corresponding to the service of the second service type can be avoided.

Further, when the network device supports only 4-step random access, X may be an integer greater than 7 and less than 35.

It can be learned from the foregoing parameter ranges that the minimum RO frequency domain index of the terminal device of the first device type or the service of the first service type is M, that is, a conflict with the RA-RNTI corresponding to the terminal device of the second device type or the service of the second service type is avoided. The maximum RO frequency domain index of the terminal device of the first device type or the service of the first service type is 49, that is, a maximum RA-RNTI value corresponding to the terminal device of the first device type or the service of the first service type is 64960, which is within the existing RA-RNTI/MSGB-RNTI value range (65522 in decimal format). Based on the foregoing description, when X is an integer greater than 7, for example, in the case listed in Table 3, a reason for conflict between the RA-RNTI corresponding to the terminal device of the first device type and the RA-RNTI corresponding to the terminal device of the second device type can be avoided. In this solution, a conflict between the RA-RNTI corresponding to the terminal device of the first device type and the RA-RNTI corresponding to the terminal device of the second device type can also be avoided, or a conflict between the RA-RNTI corresponding to the service of the first service type and the RA-RNTI corresponding to the service of the second service type can be avoided. Therefore, according to the method provided in this embodiment of this application, an RNTI conflict caused by using a same RNTI calculation rule for different terminal device types or different service types in the conventional technology can be avoided, and a case in which an RNTI value exceeds an RNTI value range defined in the conventional technology can be avoided.

Figure 15:
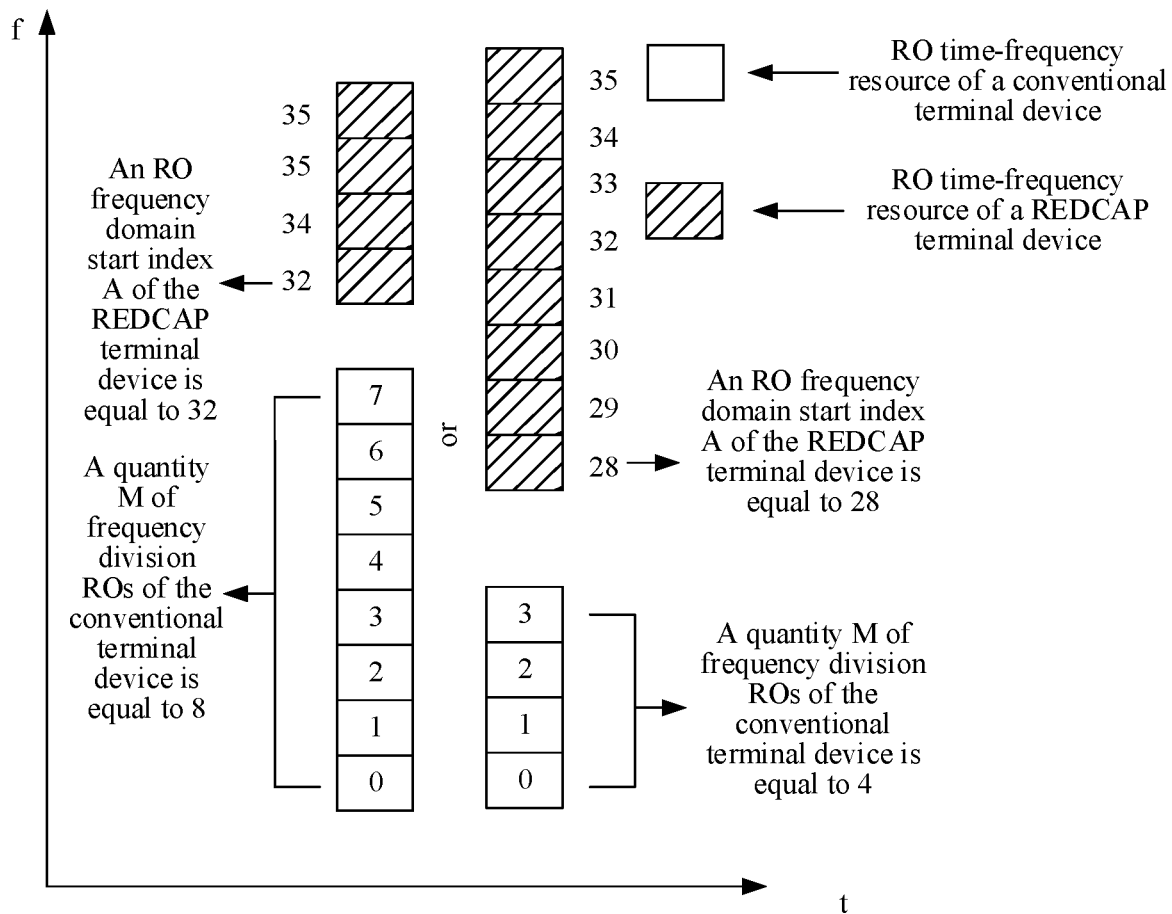
FIG. 15 is another schematic diagram of modifying a numbering rule of an RO frequency domain start index of a REDCAP terminal device according to an embodiment of this application.

In another possible implementation, when the network device supports 2-step random access, X may be an integer greater than 23. For example, the terminal device of the first device type is a REDCAP terminal device, and the terminal device of the second device type is a conventional terminal device. Refer to FIG. 15, for example, when X=24 and M=8, A=32. Alternatively, for example, when X=24 and M=4, A=28.

The calculation rule of the RA-RNTI corresponding to the terminal device of the second device type or the service of the second service type satisfies the foregoing formula (1), and details are not described herein again.

The calculation rule of the MSGB-RNTI corresponding to the terminal device of the second device type or the service of the second service type satisfies the foregoing formula (2), and details are not described herein again.

The calculation rule of the RA-RNTI corresponding to the terminal device of the first device type or the service of the first service type satisfies the foregoing formula (1), and details are not described herein again.

The calculation rule of the MSGB-RNTI corresponding to the terminal device of the first device type or the service of the first service type satisfies the foregoing formula (2), and details are not described herein again.

It should be noted that in this embodiment of this application, when the RA-RNTI or the MSGB-RNTI corresponding to the terminal device of the second device type or the service of the second service type is calculated, in the foregoing formula (1) or formula (2), $0 \le f\_id < 8$. When the RA-RNTI or the MSGB-RNTI corresponding to the terminal device of the first device type or the service of the first service type is calculated, in the foregoing formula (1), $M+X \le f\_id \le M+X+7$.

It can be learned from the foregoing parameter ranges that the minimum RO frequency domain index of the terminal device of the first device type or the service of the first service type is the RO frequency domain index of the terminal device of the second device type or the service of the second service type plus 25. In other words, the RO frequency domain index of the terminal device of the first device type or the service of the first service type cannot be the RO frequency domain index of the terminal device of the second device type or the service of the second service type plus 8. Therefore, in this embodiment of this application, for example, in a case listed in Table 3, a conflict between the RA-RNTI or the MSGB-RNTI corresponding to the terminal device of the first device type and the RA-RNTI or the MSGB-RNTI corresponding to the terminal device of the second device type can be avoided. Alternatively, a conflict between the RA-RNTI corresponding to the service of the first service type and the RA-RNTI corresponding to the service of the second service type can be avoided. Further, based on the fact that the RO frequency domain index of the terminal device of the first device type is the RO frequency domain index of the terminal device of the second device type plus 32, it may be deduced that the RA-RNTI corresponding to the RO of the terminal device of the first device type is at least the MSGB-RNTI corresponding to the RO of the terminal device of the second device type plus 17920. Therefore, in this embodiment of this application, a conflict between the RA-RNTI corresponding to the terminal device of the first device type and the MSGB-RNTI corresponding to the terminal device of the second device type can be avoided. Alternatively, a conflict between the RA-RNTI corresponding to the service of the first service type and the MSGB-RNTI corresponding to the service of the second service type can be avoided. In conclusion, in this embodiment of this application, a conflict between the RA-RNTI corresponding to the terminal device of the first device type and the RNTI (including the RA-RNTI and the MSGB-RNTI) corresponding to the terminal device of the second device type can be avoided. Alternatively, a conflict between the RA-RNTI corresponding to the service of the first service type and the RNTI (including the RA-RNTI and the MSGB-RNTI) corresponding to the service of the second service type can be avoided.

Further, when the network device supports 2-step random access, X may be an integer greater than 23 and less than 35.

It can be learned from the foregoing parameter ranges that the maximum RO frequency domain index of the terminal device of the first device type or the service of the first service type is 49, that is, the maximum RA-RNTI value corresponding to the terminal device of the first device type or the service of the first service type is 64960, which is within the existing RA-RNTI/MSGB-RNTI value range.

Based on the foregoing description, when X is an integer greater than 23, a reason for conflict between the RA-RNTI corresponding to the terminal device of the first device type and the RNTI (including the RA-RNTI and the MSGB-RNTI) corresponding to the terminal device of the second device type can be avoided. In this solution, a conflict between the RA-RNTI corresponding to the terminal device of the first device type and the RNTI (including the RA-RNTI and the MSGB-RNTI) corresponding to the terminal device of the second device type can also be avoided. Alternatively, a conflict between the RA-RNTI corresponding to the service of the first service type and the RNTI (including the RA-RNTI and the MSGB-RNTI) corresponding to the service of the second service type can be avoided. Therefore, according to the method provided in this embodiment of this application, an RNTI conflict caused by using a same RNTI calculation rule for different terminal device types or different service types in the conventional technology can be avoided, and a case in which an RA-RNTI value exceeds an RNTI value range defined in the conventional technology can be avoided.

It should be noted that in the foregoing embodiment, when the network device supports 2-step random access, the solution of determining the MSGB-RNTI corresponding to the terminal device of the first device type or the service of the first service type provided in this embodiment of this application may also be applied to a scenario in which the network device supports only 4-step random access to determine the RA-RNTI corresponding to the terminal device of the first device type or the service of the second service type. In addition, based on reasons similar to the foregoing solution for determining the MSGB-RNTI corresponding to the terminal device of the first device type or the service of the first service type, this solution can also implement a technical effect similar to that of the solution for determining the MSGB-RNTI corresponding to the terminal device of the first device type or the service of the first service type.

In the foregoing embodiment of this application, the quantity M of frequency division ROs corresponding to the terminal device of the second device type may be read by the terminal device of the first device type from the shared SIB1 when the terminal device of the first device type and the terminal device of the second device type share the SIB1. The quantity of frequency division ROs corresponding to the service of the second service type may be read by the terminal device from the shared SIB1 when the service of the first service type and the service of the second service type share the SIB1. Certainly, when the quantity M of frequency division ROs corresponding to the terminal device of the second device type or the service of the second service type cannot be learned, this embodiment of this application may further provide the following solution.

The network device sends first indication information to the terminal device. Correspondingly, the terminal device receives the first indication information from the network device, where the first indication information indicates the quantity M of frequency division ROs corresponding to terminal device of the second device type or to the service of the second service type. In this way, the terminal device may learn, based on the first indication information, the quantity M of frequency division ROs corresponding to the terminal device of the second device type or the service of the second service type. Optionally, in this embodiment of this application, the first indication information may be carried in the SIB1, or may be sent independently of the SIB1. This is not specifically limited in this embodiment of this application.

Figure 16:
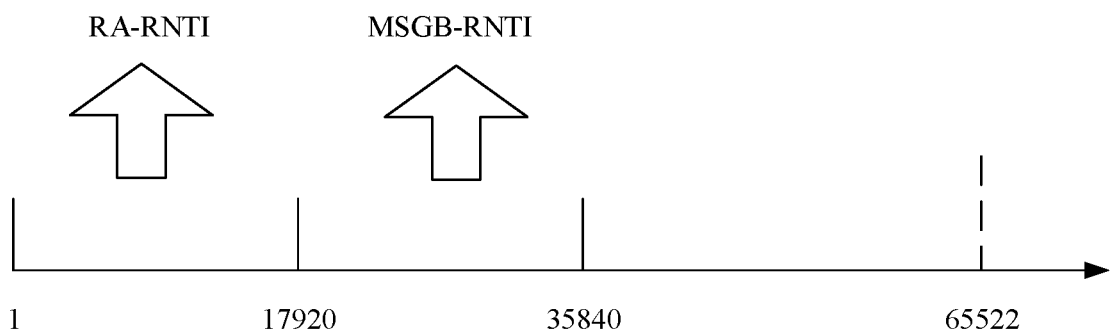
FIG. 16 is a schematic diagram of an RNTI value range of a conventional terminal device according to an embodiment of this application.

An example in which the terminal device of the second device type is a conventional terminal device is used. In this embodiment of this application, considering different value ranges of the RA-RNTI/MSGB-RNTI of the conventional terminal device shown in FIG. 16, a value range of the RA-RNTI is [1, 17920] in decimal format, and value range of the MSGB-RNTI is [17921, 35840] in decimal format. However, for example, in the RA-RNTI value range [1, 17920] of the conventional terminal device, a quantity of actually used RA-RNTI values obtained by the conventional terminal device based on an RO configuration resource is far less than 17920. For example, according to an RO configuration for 4-step random access of the conventional terminal device, a maximum of 140 ROs are configured in one frame in time domain, and a maximum of 8 frequency division ROs are configured in a given time domain. Therefore, a maximum quantity of ROs that may be configured in time-frequency domain in one frame is 140×8=1120, that is, there are a maximum of 1120 RA-RNTI values for the conventional terminal device. It is considered that in configuration of SUL and NUL, there are a maximum of 2240 conventional RA-RNTI values, which is far less than the maximum value 17920. Therefore, in the RNTI value range of the conventional terminal device, there are many "idle" values that are not actually used. Based on this, this embodiment provides a solution. In the solution, by using an unused idle value in a value range of an RA-RNTI of a terminal device of a second device type or a service of a second service type and/or an MSGB-RNTI of a terminal device of a second device type or a service of a second service type, a mapping mechanism is established, so that an RA-RNTI and/or an MSGB-RNTI of a terminal device of a first device type or a service of a first service type can be mapped to the RNTI idle value of the terminal device of the second device type or the service of the second service type. Therefore, a conflict between the RNTI corresponding to the terminal device of the first device type and the RNTI corresponding to the terminal device of the second device type can be avoided. Alternatively, a conflict between an RNTI corresponding to a service of a first service type and an RNTI corresponding to a service of a second service type can be avoided.

Figure 17:
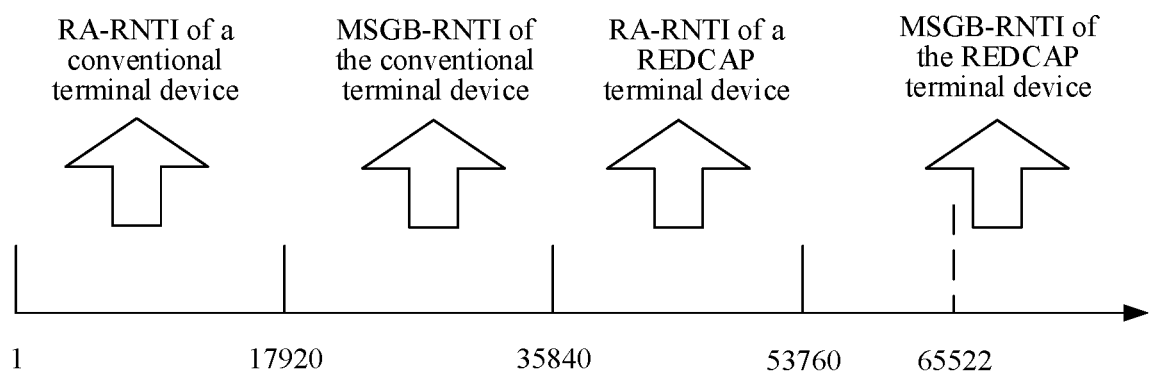
FIG. 17 is a schematic diagram of dividing an RNTI value range of a REDCAP terminal device according to an embodiment of this application.

In addition, for example, as shown in FIG. 17, with division of a PRACH resource by a device type and a service type, if on the basis of an existing division manner of an RA-RNTI and an MSGB-RNTI, an RA-RNTI/MSGB-RNTI corresponding to each device or service type is further divided, for example, an RA-RNTI and an MSGB-RNTI of a REDCAP terminal device, a value range of the obtained RA-RNTI/MSGB-RNTI may exceed the existing maximum value (65522 in decimal format) of the RA-RNTI/MSGB-RNTI. Therefore, a quantity of bits occupied by the RNTI needs to be extended, a scrambling process of a CRC of a PDCCH is affected, and implementation complexity of the terminal device and the network device is increased. Based on this, this embodiment provides a solution. An RA-RNTI and/or an MSGB-RNTI of the terminal device of the first device type or the service of the first service type can be mapped to an RNTI idle value of the terminal device of the second device type or an RNTI idle value of the service of the second service type, so that the RA-RNTI and/or MSGB-RNTI of the terminal device of the first device type or the service of the first service type does not exceed an existing value range of the RA-RNTI/MSGB-RNTI.

That is, for step S902 and step S903, in still another possible implementation, the first RNTI is determined based on a second RNTI, and the second RNTI is a value other than an RNTI associated with a second RO. The second RO is an RO configured for the second device type and/or the second service type. The following describes the implementation in detail.

S1201: Determine the second RNTI other than the RNTI associated with the second RO.

A current value range of the RNTI is shown in Table 4. It can be learned that the current value range of the RNTI is 0000-FFFF in hexadecimal format, including 16 bits. The RA-RNTI and/or MSGB-RNTI may be 65522 values (0001-FFF2 in hexadecimal format). An RNTI value set available for the RA-RNTI and/or MSGB-RNTI may be denoted as RNTI_S1, which satisfies the following relationship: RNTI_S1(i)∈RNTI_S1, indicating that RNTI_S1(i) is a value in RNTI_S1. i=1, . . . , N1, i represents an index of a value in the set RNTI_S1, and N1 is a quantity of values included in the set RNTI_S1. Optionally, indexes of elements in the RNTI_S1 may be increased in ascending or descending order of elements. Optionally, a start index of the RNTI_S1 may be 0 or 1, that is, i=1, . . . , N1, or i=0, . . . , N1−1.

TABLE 4

| Value (in hexadecimal format) | RNTI |
| --- | --- |
| 0000 | None |
| 0001-FFF2 | RA-RNTI, MSGB-RNTI, TC-RNTI, C-RNTI, CI-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNTI, PS-RNTI, SL-RNTI, SLCS-RNTI SL SPS V-RNTI and AI-RNTI |
| FFF3-FFFD | Reserved |
| FFFE | P-RNTI |
| FFFF | SI-RNTI |

The RNTI associated with the second RO may include an RA-RNTI associated with the second RO and/or an MSGB-RNTI associated with the second RO. The second RO is an RO configured by the network device for the second device type and/or the second service type. In this embodiment of this application, a calculation rule of the RA-RNTI associated with the second RO satisfies the foregoing formula (1), and a calculation rule of the MSGB-RNTI associated with the second RO satisfies the foregoing formula (2). Details are not described herein again. A set of RA-RNTI/MSGB-RNTI values associated with the second RO may be denoted as RNTI_S2, which satisfies the following relationship: RNTI_S2(j)∈RNTI_S2, indicating that RNTI_S2(j) is a value in RNTI_S2. j=1, . . . , N2, and j represents an index of a value in the set RNTI_S2. N2 is a quantity of values included in the set RNTI_S2, and is determined based on configuration information of the second RO. The RNTI_S2 is included in the RNTI_S1, that is, RNTI_S2 S RNTI_S1.

The second RNTI is an idle value obtained after the value of the RNTI associated with the second RO is removed from all values in the value range of the RA-RNTI and/or MSGB-RNTI. Therefore, it may be denoted as RNTI_S3=$C_{RNTI\_S1}$(RNTI_S2), indicating that RNTI_S3 is a complementary set of RNTI_S2 in RNTI_S1. RNTI_S3 is a set of second RNTIs, and satisfies the following relationship: RNTI_S3(k) E RNTI_S3, indicating that RNTI_S3(k) is a value in RNTI_S3. RNTI_S3(k) is a value of the second RNTI, k=1, . . . , N3, k represents an index of the second RNTI in the set RNTI_S3, and N3 is a quantity of second RNTIs included in the set RNTI_S3.

S1202: Determine a third RNTI, where the third RNTI is an RNTI determined based on a calculation rule and the first RO.

The third RNTI is an RNTI value determined based on the calculation rule and the first RO. A set formed by the third RNTI determined based on the first RO and the calculation rule may be denoted as RNTI_S4, and a value of the third RNTI is denoted as RNTI_S4(m). In this case, RNTI_S4 and RNTI_S4(m) satisfy the following relationship: RNTI_S4 (m) E RNTI_S4, indicating that RNTI_S4(m) is a value in RNTI_S4. m=1, . . . N4, m represents an index of a value in the set RNTI_S4, and N4 is a quantity of values included in the set RNTI_S4, and is determined based on the configuration information of the first RO. It should be noted that the third RNTI is not an RNTI actually used by the terminal device or the network device to scramble or descramble the PDCCH, but an intermediate parameter in a process of determining the first RNTI corresponding to the first RO. For details, see the following description.

Optionally, the calculation rule of the third RNTI satisfies the foregoing formula (1). In this case, the first RNTI determined by using the third RNTI and the mapping mechanism in this embodiment is an RA-RNTI associated with the first RO, or the first RN determined by using the third RNTI and the mapping mechanism in this embodiment is an MSGB-RNTI associated with the first RO.

Optionally, the calculation rule of the third RNTI satisfies the foregoing formula (2). In this case, the first RNTI determined by using the third RNTI and the mapping mechanism in this embodiment is an MSGB-RNTI associated with the first RO.

Optionally, the calculation rule of the third RNTI satisfies any one of the foregoing formulas (19) to (24), and in this case, the first RNTI determined by using the third RNTI and the mapping mechanism in this embodiment is an MSGB-RNTI associated with the first RO. Optionally, the third RNTI does not belong to the existing RA-RNTI/MSGB-RNTI value range, and may be denoted as the third RNTI∈RNTI_S1, or the third RNTI>RNTI_S1(N1), or the third RNTI>RNTI_S1(1).

Optionally, the calculation rule of the third RNTI satisfies another formula. In this case, the first RNTI determined by using the third RNTI and the mapping mechanism in this embodiment is an RA-RNTI or an MSGB-RNTI associated with the first RO. Optionally, the third RNTI does not belong to the existing RA-RNTI/MSGB-RNTI value range, and may be denoted as the third RNTI∈RNTI_S1, or the third RNTI>RNTI_S1(N1), or the third RNTI>RNTI_S1(1). Optionally, the third RNTI conflicts with the RNTI associated with the second RO, and may be denoted as the third RNTI∈RNTI_S3.

It should be noted that there is no necessary execution sequence between step S1201 and step S1202, and step S1101 may be performed first, and then step S1102 is performed. Alternatively, step S1102 may be performed first, and then step S1101 is performed. Alternatively, step S1101 and step S1102 may be simultaneously performed. This is not specifically limited in this embodiment of this application.

S1203: Determine the first RNTI based on the second RNTI and the third RNTI.

In a possible implementation, the first RNTI is a value of the second RNTI when an index of the second RNTI corresponds to the third RNTI. That is, the first RNTI is a value of RNTI_S3(k) when k corresponds to RNTI_S4(m).

The index of the second RNTI is the index of the second RNTI in the set RNTI_S3. Optionally, an index rule of the second RNTI may be that indexes increase in ascending order of the second RNTIs, or indexes increase in descending order of the second RNTIs, or indexes start from a preset specific value and increase in ascending order of the second RNTIs, or indexes start from a preset specific value and increase in descending order of the second RNTIs. Optionally, the indexes may be in ascending order, or some RNTI values are skipped when the indexes increase in ascending order. Optionally, a start index of the second RNTI may be 0 or 1. That is, k=1, 2, ... N3, or k=0, 1, ..., N3−1.

The first RNTI is determined by using a correspondence between the index of the second RNTI and the third RNTI.

Optionally, the first RNTI is a value of the second RNTI when the index of the second RNTI is equal to the third RNTI. That is, the first RNTI=RNTI_S3(k), where k is equal to the third RNTI. The first RNTI may be denoted as a value of RNTI_S3(k) when k=RNTI_S4(m).

Figure 18:
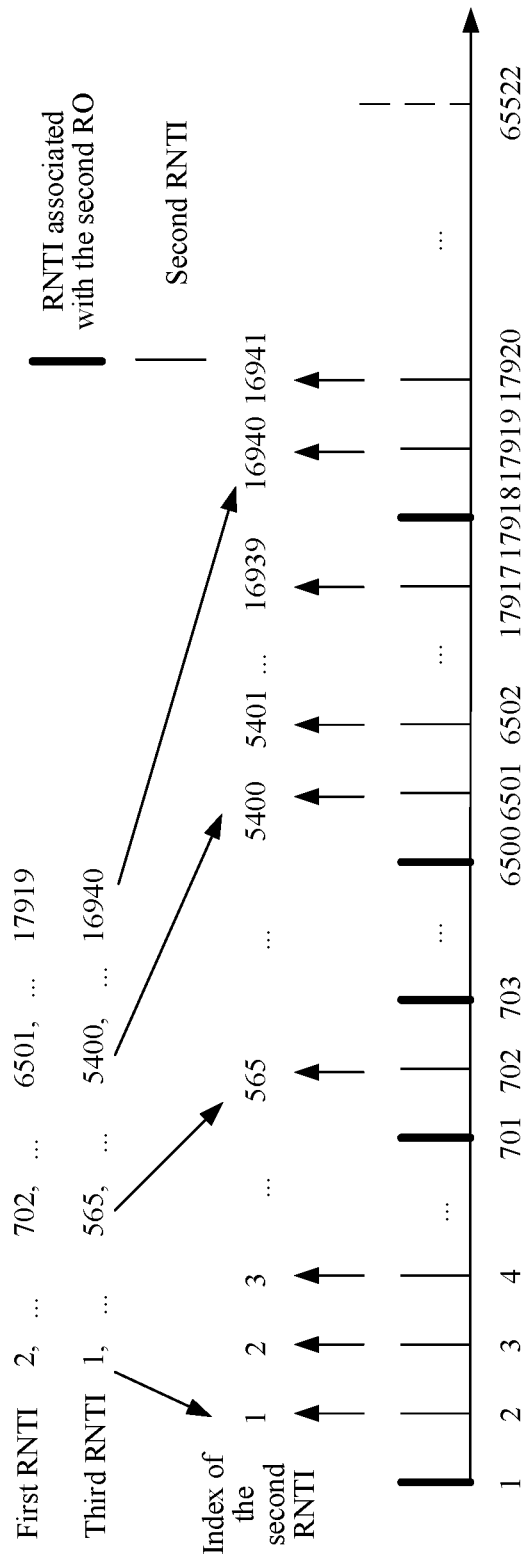
FIG. 18 is a schematic diagram of mapping for determining a first RNTI according to an embodiment of this application.

For example, as shown in FIG. 18, a specific example is described as follows. In FIG. 18, an RA-RNTI and/or MSGB-RNTI value range is RNTI_S1={1, 2, ..., 65522}. The RNTI associated with the second RO may be values such as 1, 701, 703, and 6500 in the RNTI value range in FIG. 18, that is, RNTI_S2={1, ..., 701, 703, ..., 6500, 17918}. The second RNTI includes values such as 2, 3, 4, 702, 6502, and 17920, and is an idle value obtained after the RNTI associated with the second RO is removed from the RA-RNTI/MSGB-RNTI value range, that is, RNTI_S3=$C_{RNTI\_S1}$(RNTI_S2)={2, 3, 4, ..., 700, 702, 704, ..., 6499, 6501, ..., 17919, 17920, ..., 65522}. The index of the second RNTI is a value of a corresponding number when the second RNTI is numbered in ascending order. For example, an index 1 corresponds to an idle value 2, an index 2 corresponds to an idle value 3, an index 3 corresponds to an idle value 4, an index 565 corresponds to an idle value 702, and the like, that is, RNTI_S3(1)=2, RNTI_S3(2)=3, RNTI_S3(3)=4, RNTI_S3(565)=702, and the like. The third RNTI is, for example, determined by the terminal device of the first device type or the service of the first service type based on the foregoing calculation rule and the first RO, and includes values such as 1, 565, 5400, and 16940, that is, RNTI_S4={1, ..., 565, ..., 5400, ..., 16940}. In the method provided in this embodiment of this application, the first RNTI is the value of the second RNTI when the index of the second RNTI corresponds to the third RNTI. For example, when the third RNTI determined based on the calculation rule and the first RO is 1, the first RNTI is a corresponding idle value 2 when the index of the second RNTI is 1, that is, the first RNTI=RNTI_S3(1)=2. Alternatively, when the third RNTI determined based on the calculation rule and the first RO is 565, the first RNTI is a corresponding idle value 702 when the index of the second RNTI is 565, that is, the first RNTI=RNTI_S3(565)=702. That is, when the third RNTI is 1, the third RNTI may be mapped to a value 2 of the second RNTI. When the third RNTI is 565, the third RNTI may be mapped to a value 702 of the second RNTI.

Optionally, the first RNTI is a value of the second RNTI when the index of the second RNTI is equal to (the third RNTI−1). That is, the first RNTI is equal to RNTI_S3(n), where n is equal to (the third RNTI−1). It may be denoted as a value of RNTI_S3(k) when the first RNTI is k=(RNTI_S4(m)−1). A mapping manner in this solution is similar to a mapping manner in the foregoing solution of the value of RNTI_S3(k) when the first RNTI is k=RNTI_S4(m). For a specific example, refer to the foregoing description of FIG. 18. Details are not described herein again.

In another possible implementation, the first RNTI is a value of the second RNTI when the index of the second RNTI corresponds to an index of the third RNTI, that is, the first RNTI is a value of RNTI_S3(k) when k corresponds to m.

The index of the second RNTI is not described again. The index of the third RNTI is an index of the third RNTI in the set RNTI_S4. Optionally, an index rule of the third RNTI may be that indexes increase in ascending order of the third RNTIs, or indexes increase in descending order of the third RNTIs, or indexes start from a preset specific value and increase in ascending order of the third RNTIs, or indexes start from a preset specific value and increase in descending order of the third RNTIs. Optionally, a start index of the third RNTI may be 0 or 1. That is, m=1, 2, ..., N4, or m=0, 1, ..., N4−1.

The first RNTI is determined based on a correspondence between the index of the second RNTI and the index of the third RNTI.

Optionally, the first RNTI is a value of the second RNTI when the index of the second RNTI is equal to an index of the third RNTI. That is, the first RNTI is equal to RNTI_S3(k), where k is equal to an index of the third RNTI. It may be denoted as a value of RNTI_S3(k) when the first RNTI is k=m.

Figure 19:
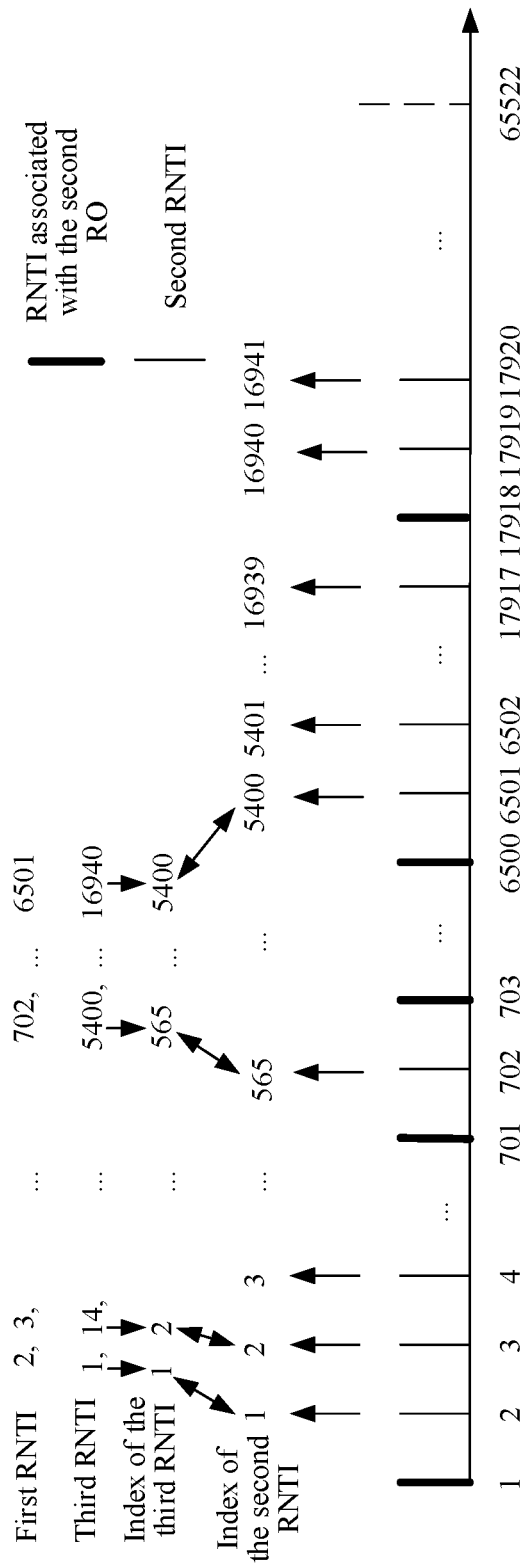
FIG. 19 is another schematic diagram of mapping for determining a first RNTI according to an embodiment of this application.

For example, as shown in FIG. 19, a specific example is described as follows. In FIG. 18, an RA-RNTI and/or MSGB-RNTI value range is RNTI_S1={1, 2, ..., 65522}. The RNTI associated with the second RO may be values such as 1, 701, 703, and 6500 in an RNTI value range in FIG. 19, that is, RNTI_S2={1, ..., 701, 703, ..., 6500, 17918}. The second RNTI includes values such as 2, 3, 4, 702, 6502, and 17920, and is an idle value obtained after the RNTI associated with the second RO is removed from the RA-RNTI/MSGB-RNTI value range, that is, RNTI_S3=$C_{RNTI\_S1}$(RNTI_S2)={2, 3, 4, ..., 700, 702, 704, ..., 6499, 6501, ..., 17919, 17920, ..., 65522}. The index of the second RNTI is a value of a corresponding number when the second RNTI is numbered in ascending order. For example, an index 1 corresponds to an idle value 2, an index 2 corresponds to an idle value 3, an index 3 corresponds to an idle value 4, an index 565 corresponds to an idle value 702, and the like, that is, RNTI_S3(1)=2, RNTI_S3(2)=3, RNTI_S3(3)=4, RNTI_S3(565)=702, and the like. The third RNTI is, for example, an MSGB-RNTI determined by the terminal device of the first device type or the service of the first service type according to the foregoing calculation rule, and includes values such as 1, 14, 5400, and 16940, that is, RNTI_S4={1, 14, ..., 5400, ..., 16940}. In the method provided in this embodiment of this application, the first RNTI is the value of the second RNTI when the index of the second RNTI is equal to the index of the third RNTI. For example, values that are of the third RNTI and that are determined based on the calculation rule and the first RO are numbered in ascending order, to obtain the index of the third RNTI. For example, the index is 1 when the third RNTI is 1, the index is 2 when the third RNTI is 14, and the index is 565 when the third RNTI is 5400, that is, RNTI_S4(1)=1, RNTI_S3(2)=14, and RNTI_S3(565)=5400. When the third RNTI is determined to be 1, the index of the third RNTI is 1, and the first RNTI is a corresponding idle value 2 when the index of the second RNTI is 1, that is, when the third RNTI=1, m in RNTI_S4(m) is equal to 1, and the first RNTI=RNTI_S3(1)=2. Alternatively, when the third RNTI is determined to be 14, the index of the third RNTI is 2, and the first RNTI is a corresponding idle value 3 when the index of the second RNTI is 2, that is, when the third RNTI is determined to be 14, m in RNTI S4(m) is equal to 2, and RNTI=RNTI_S3(2)=3. Alternatively, when the third RNTI is determined to be 5400, the index of the third RNTI is 565, and the first RNTI is a corresponding idle value 702 when the index of the second RNTI is 565, that is, when the third RNTI is determined to be 5400, m in RNTI_S4(m) is equal to 565, and RNTI=RNTI_S3(565)=702. That is, when the third RNTI is 1, the third RNTI may be mapped to a value 2 of the second RNTI. When the third RNTI is 14, the third RNTI may be mapped to a value 3 of the second RNTI. When the third RNTI is 5400, the third RNTI may be mapped to a value 702 of the second RNTI.

Optionally, the first RNTI is a value of the second RNTI when an index of the second RNTI is equal to (N3–the index of the third RNTI). That is, the first RNTI is equal to RNTI_S3(N3−m), where m is the index of the third RNTI. It may be denoted as a value of RNTI_S3(k) when the first RNTI is k=(N3−m). A mapping manner in this solution is similar to a mapping manner in the foregoing solution of the value of RNTI_S3(k) when the first RNTI is k=m. For a specific example, refer to the foregoing description of FIG. 19. Details are not described herein again.

It should be noted that the set concept in this embodiment may alternatively be an array.

In this embodiment, a mapping mechanism is established, so that the first RNTI associated with the first RO of the terminal device of the first device type or the first RO of the service of the first service type is mapped to an idle RNTI other than the RNTI associated with the second RO. In this case, the RNTI that is associated with the first RO and that is used to scramble the PDCCH is an idle RNTI that is not used by the terminal device of the second device type or the service of the second service type. Therefore, a conflict between the RNTI corresponding to the terminal device of the first device type and the RNTI corresponding to the terminal device of the second device type can be avoided. Alternatively, a conflict between the RNTI corresponding to the service of the first service type and the RNTI corresponding to the service of the second service type can be avoided.

In addition, different from a manner in which an RO of a REDCAP terminal device and an RO of a conventional terminal device are staggered in frequency domain to identify a device type or a service type in the conventional technology, it is considered that in a 2-step random access manner, a preamble and a PUSCH are sent together. Therefore, the PUSCH may directly carry indication information used to indicate a device type or a service type. After receiving the PUSCH, the network device may identify the device type or the service type based on the indication information. Further, in this embodiment of this application, both the calculation rule of the MSGB-RNTI corresponding to the terminal device of the second device type and the calculation rule of the MSGB-RNTI corresponding to the terminal device of the first device type may satisfy the foregoing formula (2). The calculation rule of the MSGB-RNTI corresponding to the service of the second service type or the service of the first service type may satisfy the foregoing formula (2).

According to the foregoing formula (2), when the RO of the terminal device of the second device type is different from the RO of the terminal device of the first device type, it is clear that there is no conflict between the MSGB-RNTI associated with the RO of the terminal device of the second device type and the MSGB-RNTI associated with the RO of the terminal device of the first device type. Similarly, according to the foregoing formula (2), when the RO of the service of the second service type is different from the RO of the service of the first service type, it is clear that there is no conflict between the MSGB-RNTI associated with the RO of the service of the second service type and the MSGB-RNTI associated with the RO of the service of the first service type.

When the RO of the terminal device of the second device type is the same as the RO of the terminal device of the first device type, the MSGB-RNTI corresponding to the terminal device of the second device type is also the same as the MSGB-RNTI corresponding to the terminal device of the first device type. The network device includes, in a same RAR MAC PDU, RARs respectively corresponding to the terminal device of the second device type and the terminal device of the first device type. In this case, both the terminal device of the second device type and the terminal device of the first device type receive the RAR MAC PDU. Therefore, there is no problem that an RAR MAC PDU that does not belong to the terminal device of the second device type or the terminal device of the first device type cannot be parsed because the RNTIs are the same, that is, there is no problem of an MSGB-RNTI conflict. Similarly, when the RO of the service of the second service type is the same as the RO of the service of the first service type, there is no conflict between the MSGB-RNTI associated with the RO of the service of the second service type and the MSGB-RNTI associated with the RO of the service of the first service type.

It should be noted that in the foregoing description of the solution for determining the RNTI value corresponding to the terminal device of the first device type or the service of the first service type, 4-step random access and 2-step random access are distinguished. The description is on a basis that the network device includes a network device that supports only 4-step random access and a network device that supports 2-step random access. If the network device is not divided based on a supported random access form, for example, when all the network devices support 2-step random access or all the network devices support only 4-step random access, the solution for determining the terminal device of the first device type or the MSGB-RNTI corresponding to the service of the first service type provided in this embodiment of this application is also applicable to a network device that is not divided based on a random access form, and corresponding technical effect is implemented.

It should be noted that in a solution provided in this embodiment of this application for determining the RNTI corresponding to the terminal device of the first device type or the service of the first service type, a maximum value of f_id is determined based on the fact that a quantity of frequency division ROs of the terminal device of the first device type or the service of the first service type in this embodiment of this application can be {1, 2, 4, or 8} based on an existing definition. It is easy to understand that, if the available value of the quantity of frequency division ROs of the terminal device of the first device type or the service of the first service type no longer satisfies the existing definition, a value range of f_id in this embodiment of this application may be correspondingly adjusted, without affecting technical solutions in this embodiment of this application.

For step S1104, after sending the preamble and determining the first RNTI, the terminal device may listen to, in the RAR window, the PDCCH scrambled by using the first RNTI, to receive a corresponding RAR. For a specific process, refer to the conventional technology. Details are not described herein again.

Based on the random access method provided in this embodiment of this application, an RNTI conflict caused by using a same RNTI calculation rule for different terminal device types or different service types in the conventional technology can be avoided, thereby reducing mutual impact between different types of terminal devices or different types of services during random access, and improving a success rate of random access. For related technical effect analysis, refer to the foregoing embodiments, and details are not described herein again.

The actions of the terminal device in steps S1101 to S1104 may be performed by the terminal device instructed by the processor 1001 in the terminal device 100 shown in FIG. 9 by invoking the application program code stored in the memory 1002. The actions of the network device in steps S1101 to S1104 may be performed by the network device instructed by the processor 901 in the network device 90 shown in FIG. 9 by invoking the application program code stored in the memory 902. This is not limited in this embodiment.

It may be understood that, in the foregoing embodiments, the method and/or steps implemented by the terminal device may alternatively be implemented by a component (for example, a chip or a circuit) applicable to the terminal device. The method and/or steps implemented by the network device may alternatively be implemented by a component (for example, a chip or a circuit) applicable to the network device.

The foregoing mainly describes the solutions provided in embodiments of this application from a perspective of interaction between the network elements. Correspondingly, an embodiment of this application further provides a communication apparatus, and the communication apparatus is configured to implement the foregoing methods. The communication apparatus may be the terminal device in the foregoing method embodiment, or an apparatus including the foregoing terminal device, or a component applicable to the terminal device. Alternatively, the communication apparatus may be the network device in the foregoing method embodiment, or an apparatus including the foregoing network device, or a component applicable to the network device. It may be understood that, to implement the foregoing functions, the communication apparatus includes a hardware structure and/or a software module for performing a corresponding function. A person skilled in the art should easily be aware that the units and algorithm steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software function module. It should be noted that the module division in embodiments of this application is an example, and is merely logical function division. There may be another division manner in an actual implementation.

Figure 20:
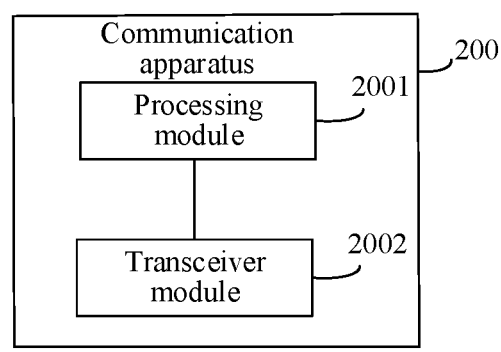
FIG. 20 is a schematic diagram of a structure of a communication apparatus according to an embodiment of this application.

For example, the communication apparatus is the terminal device in the foregoing method embodiment. FIG. 20 is a schematic diagram of a structure of a communication apparatus 200. The communication apparatus 200 includes a transceiver module 2002 and a processing module 2001. The transceiver module 2002 may also be referred to as a transceiver unit, and is configured to implement a transceiver function. For example, the transceiver module may be a transceiver circuit, a transceiver machine, a transceiver, or a communication interface.

In a possible implementation, the transceiver module 2002 is configured to send a random access preamble to a network device on a first RO, where the first RO corresponds to a first device type and/or a first service type. The processing module 2001 is configured to listen to a PDCCH scrambled by using a first RNTI associated with the first RO. Calculation of the first RNTI is related to the first device type and/or the first service type.

Optionally, the transceiver module 2002 is further configured to receive first indication information from the network device, where the first indication information indicates a quantity M of frequency division ROs corresponding to a terminal device of a second device type or a service of a second service type.

In another possible implementation, the transceiver module 2002 is configured to send a random access preamble to a network device on a first RO, where the first RO corresponds to a first device type and/or a first service type. The processing module 2001 is configured to listen to a PDCCH scrambled by using a first RNTI associated with the first RO, where a frequency domain start identifier A of the first RO is equal to M+X. X is an integer greater than 7, or X is an integer greater than 23. M is a quantity of frequency division ROs corresponding to a terminal device of a second device type or a service of a second service type.

Optionally, the transceiver module 2002 is further configured to receive first indication information from the network device, where the first indication information indicates a quantity M of frequency division ROs corresponding to a terminal device of a second device type or a service of a second service type.

In still another possible implementation, the transceiver module 2002 is configured to send a random access preamble to a network device on a first RO, where the first RO corresponds to a first device type and/or a first service type. The processing module 2001 is configured to listen to a PDCCH scrambled by using a first RNTI associated with the first RO, where the first RNTI is determined based on a second RNTI, and the second RNTI is a value other than an RNTI associated with a second RO. The second RO is an RO configured for a second device type and/or a second service type.

All related content of the steps in the foregoing method embodiments may be cited in function descriptions of a corresponding functional module. Details are not described herein again.

In this embodiment, the communication apparatus 200 is presented in a form in which functional modules are divided in an integrated manner. The "module" herein may be a specific ASIC, a circuit, a processor that executes one or more software or firmware programs, a memory, an integrated logic circuit, and/or another device that can provide the foregoing function.

In a simple embodiment, a person skilled in the art may figure out that the communication apparatus 200 may be in a form of the terminal device 100 shown in FIG. 9.

For example, the processor 1001 in the terminal device 100 shown in FIG. 9 may invoke the computer-executable instructions stored in the memory 1002, so that the terminal device 100 performs the random access method in the foregoing method embodiment. Specifically, functions/implementation processes of the transceiver module 2002 and the processing module 2001 in FIG. 20 may be implemented by the processor 1001 in the terminal device 100 shown in FIG. 9 by invoking the computer-executable instructions stored in the memory 1002. Alternatively, functions/implementation processes of the processing module 2001 in FIG. 20 may be implemented by the processor 1001 in the terminal device 100 shown in FIG. 9 by invoking the computer-executable instructions stored in the memory 1002. A function/implementation process of the transceiver module 2002 in FIG. 20 may be implemented by using the transceiver 1003 in the terminal device 100 shown in FIG. 9.

Because the communication apparatus 200 provided in this embodiment can perform the foregoing random access method, for technical effects that can be obtained by the communication apparatus 200, refer to the foregoing method embodiment. Details are not described herein again.

Figure 21:
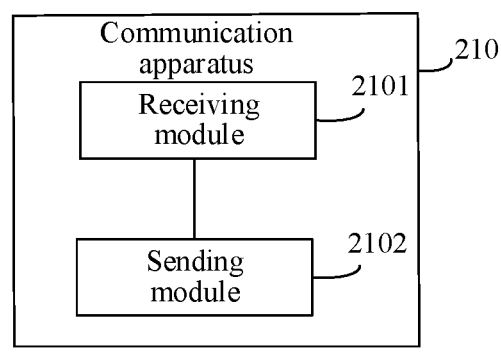
FIG. 21 is a schematic diagram of a structure of another communication apparatus according to an embodiment of this application.

For example, the communication apparatus is the network device in the foregoing method embodiment. FIG. 21 is a schematic diagram of a structure of a communication apparatus 210. The communication apparatus 210 includes a receiving module 2101 and a sending module 2102. The receiving module 2101 may also be referred to as a receiving unit, and is configured to implement a receiving function, for example, may be a receiving circuit, a receiver machine, a receiver, or a communication interface. The sending module 2102 may also be referred to as a sending unit, and is configured to implement a sending function, for example, may be a sending circuit, a sending machine, a sender, or a communication interface. In addition, the receiving module 2101 and the sending module 2102 in this embodiment of this application may alternatively be collectively referred to as a transceiver module. This is not specifically limited in this embodiment of this application.

In a possible implementation, the receiving module 2101 is configured to receive a random access preamble from a terminal device on a first RO, where the first RO corresponds to a first device type and/or a first service type. The sending module 2102 is configured to send, to the terminal device, a PDCCH scrambled by using a first RNTI associated with the first RO. Calculation of the first RNTI is related to the first device type and/or the first service type.

Optionally, the sending module 2102 is further configured to send first indication information to the terminal device, where the first indication information indicates a quantity M of frequency division ROs corresponding to terminal device of a second device type or a service of a second service type.

In another possible implementation, the receiving module 2101 is configured to receive a random access preamble from a terminal device on a first RO, where the first RO corresponds to a first device type and/or a first service type. The sending module 2102 is configured to send, to the terminal device, a PDCCH scrambled by using a first RNTI associated with the first RO, where a frequency domain start identifier A of the first RO is equal to M+X. X is an integer greater than 7, or X is an integer greater than 23. M is a quantity of frequency division ROs corresponding to a terminal device of a second device type or a service of a second service type.

Optionally, the sending module 2102 is further configured to send first indication information to the terminal device, where the first indication information indicates a quantity M of frequency division ROs corresponding to a terminal device of a second device type or a service of a second service type.

In still another possible implementation, the receiving module 2101 is configured to receive a random access preamble from a terminal device on a first RO, where the first RO corresponds to a first device type and/or a first service type. The sending module 2102 is configured to send, to the terminal device, a PDCCH scrambled by using a first RNTI associated with the first RO, where the first RNTI is determined based on a second RNTI, and the second RNTI is a value other than an RNTI associated with a second RO. The second RO is an RO configured for a second device type and/or a second service type.

All related content of the steps in the foregoing method embodiments may be cited in function descriptions of a corresponding functional module. Details are not described herein again.

In this embodiment, the communication apparatus 210 is presented in a form in which functional modules are divided in an integrated manner. The "module" herein may be a specific ASIC, a circuit, a processor that executes one or more software or firmware programs, a memory, an integrated logic circuit, and/or another device that can provide the foregoing function.

In a simple embodiment, a person skilled in the art may figure out that the communication apparatus 210 may be in a form of the network device 90 shown in FIG. 9.

For example, the processor 901 in the network device 90 shown in FIG. 9 may invoke the computer-executable instructions stored in the memory 902, so that the network device 90 performs the random access method in the foregoing method embodiment. Specifically, functions/implementation processes of the receiving module 2101 and the sending module 2102 in FIG. 21 may be implemented by the processor 901 in the network device 90 shown in FIG. 9 by invoking the computer-executable instructions stored in the memory 902. Alternatively, functions/implementation processes of the receiving module 2101 and the sending module 2102 in FIG. 21 may be implemented by using the transceiver 903 in the network device 90 shown in FIG. 9.

Because the communication apparatus 210 provided in this embodiment can perform the foregoing random access method, for technical effects that can be obtained by the communication apparatus 210, refer to the foregoing method embodiment. Details are not described herein again.

It should be noted that one or more of the foregoing modules or units may be implemented by using software, hardware, or a combination thereof. When any one of the foregoing modules or units is implemented by using software, the software exists in a form of a computer program instruction, and is stored in the memory. The processor may be configured to execute the program instruction to implement the foregoing method procedures. The processor may be built into a SoC (system on chip) or an ASIC, or may be an independent semiconductor chip. In addition to the core configured to perform calculation or processing by executing a software instruction, the processor may further include a necessary hardware accelerator, for example, a field programmable gate array (field programmable gate array, FPGA), a PLD (programmable logic device), or a logic circuit that implements a dedicated logic operation.

When the foregoing modules or units are implemented by using hardware, the hardware may be any one of or any combination of a CPU, a microprocessor, a digital signal processing (digital signal processing, DSP) chip, a microcontroller unit (microcontroller unit, MCU), an artificial intelligence processor, an ASIC, a SoC, an FPGA, a PLD, a dedicated digital circuit, a hardware accelerator, or a non-integrated discrete device, and may run necessary software or not depend on software to perform the foregoing method procedures.

Optionally, an embodiment of this application further provides a chip system, including: at least one processor and an interface, where the at least one processor is coupled to a memory by using an interface, and when the at least one processor executes a computer program or instructions in the memory, the method in any one of the foregoing method embodiments is performed. In a possible implementation, the communication apparatus further includes a memory. Optionally, the chip system may include a chip, or may include a chip and another discrete component. This is not specifically limited in this embodiment of this application.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, the term "comprise" (comprising) does not exclude another component or another step, and "a" or "one" does not exclude a case of plurality. A single processor or another unit may implement several functions enumerated in the claims. Some measures are recorded in dependent claims that are different from each other, but this does not indicate that these measures cannot be combined to produce a better effect.

Although this application has been described with reference to specific features and embodiments thereof, it is obvious that various modifications and combinations may be made to this application without departing from the spirit and scope of this application. Correspondingly, the specification and the accompanying drawings are merely exemplary descriptions of this application defined by the following claims, and are deemed to have covered any and all modifications, variations, combinations, or equivalents that fall within the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. A random access method, wherein the method comprises:
    sending a random access preamble to a network device on a first random access channel occasion (RO), wherein the first RO corresponds to at least one of a first device type or a first service type; and
    listening to a downlink control channel (PDCCH) scrambled by using a first radio network temporary identifier (RNTI) associated with the first RO, wherein the first RNTI is determined based on a second RNTI, the second RNTI is a value other than an RNTI associated with a second RO, and the second RO is an RO configured for at least one of a second device type or a second service type, wherein that the first RNTI is determined based on a second RNTI comprises: the first RNTI is determined based on the second RNTI and a third RNTI, and the third RNTI is an RNTI determined according to a calculation rule and based on the first RO.

2. The random access method according to claim 1, wherein that the first RNTI is determined based on the second RNTI and a third RNTI comprises:
    the first RNTI is a value of the second RNTI, and an index of the second RNTI corresponds to the third RNTI.

3. The random access method according to claim 1, wherein that the first RNTI is determined based on the second RNTI and a third RNTI comprises:
    the first RNTI is a value of the second RNTI, and an index of the second RNTI corresponds to an index of the third RNTI.

4. The random access method according to claim 1, wherein the calculation rule of the third RNTI satisfies the following relationship:
    $RNTI = 1 + s\_id + 14 \times t\_id + 14 \times 80 \times f\_id + 14 \times 80 \times 8 \times ul\_carrier\_id$; or
    $RNTI = 1 + s\_id + 14 \times t\_id + 14 \times 80 \times f\_id + 14 \times 80 \times 8 \times ul\_carrier\_id + 14 \times 80 \times 8 \times 2$; or
    $RNTI = 1 + s\_id + 14 \times t\_id + 14 \times 80 \times (f\_id + N) + 14 \times 80 \times 8 \times ul\_carrier\_id$, wherein N is an integer greater than 47; or
    $RNTI = 1 + s\_id + 14 \times t\_id + 14 \times 80 \times f\_id + 14 \times 80 \times 8 \times ul\_carrier\_id + 14 \times 80 \times 8 \times G$, wherein G is an integer greater than 5; or
    $RNTI = 1 + s\_id + 14 \times t\_id + 14 \times 80 \times (f\_id + N) + 14 \times 80 \times 8 \times ul\_carrier\_id + 14 \times 80 \times 8 \times 2$, wherein N is an integer greater than 31; or
    $RNTI = 1 + s\_id + 14 \times t\_id + 14 \times 80 \times f\_id + 14 \times 80 \times 8 \times ul\_carrier\_id + 14 \times 80 \times 8 \times 2 + 14 \times 80 \times 8 \times G$, wherein G is an integer greater than 3; or
    $RNTI = 1 + s\_id + 14 \times t\_id + 14 \times 80 \times f\_id + 14 \times 80 \times 8 \times ul\_carrier\_id + 14 \times 80 \times 8 \times 4 + 14 \times 80 \times 8 \times 2 \times UE\_type$, wherein a value of UE type corresponding to a terminal device of the first device type is 1; or RNTI=1+s_id+14×t_id+14×80×f_id+14×80×8×ul_carrier_id+14×80×8×4+14×80×8×2×ser vice_type, wherein a value of service_type corresponding to a service of the first service type is 1, wherein f_id represents a frequency domain index of the first RO, and 0≤f_id<8; s_id represents an index of a first orthogonal frequency division multiplexing (OFDM) symbol of the first RO, and 0≤s_id<14; t_id represents an index of a first timeslot of the first RO, and 0≤t_id<80; and ul_carrier_id represents an uplink UL carrier for transmitting the random access preamble, and when the UL carrier is a normal uplink (NUL) carrier, ul_carrier_id is 0, or when the UL carrier is a supplementary uplink SUL carrier, ul_carrier_id is 1.

5. A random access method, wherein the method comprises:

receiving a random access preamble from a terminal device on a first random access channel occasion (RO), wherein the first RO corresponds to at least one of a first device type or a first service type; and sending, to the terminal device, a downlink control channel (PDCCH) scrambled by using a first radio network temporary identifier (RNTI) associated with the first RO, wherein the first RNTI is determined based on a second RNTI, the second RNTI is a value other than an RNTI associated with a second RO, and the second RO is an RO configured for at least one of a second device type or a second service type, wherein that the first RNTI is determined based on a second RNTI comprises: the first RNTI is determined based on the second RNTI and a third RNTI, and the third RNTI is an RNTI determined according to a calculation rule and based on the first RO.

6. The random access method according to claim 5, wherein that the first RNTI is determined based on the second RNTI and a third RNTI comprises:

the first RNTI is a value of the second RNTI, and an index of the second RNTI corresponds to the third RNTI.

7. The random access method according to claim 5, wherein that the first RNTI is determined based on the second RNTI and a third RNTI comprises:

the first RNTI is a value of the second RNTI, and an index of the second RNTI corresponds to an index of the third RNTI.

8. The random access method according to claim 5, wherein the calculation rule of the third RNTI satisfies the following relationship:

RNTI=1+s_id+14×t_id+14×80×f_id+14×80×8×ul_carrier_id; or

RNTI=1+s_id+14×t_id+14×80×f_id+14×80×8×ul_carrier_id+14×80×8×2; or

RNTI=1+s_id+14×t_id+14×80×(f_id+N)+14×80×8×ul_carrier_id, wherein N is an integer greater than 47; or RNTI=1+s_id+14×t_id+14×80×f_id+14×80×8×ul_carrier_id+14×80×8×G, wherein G is an integer greater than 5; or RNTI=1+s_id+14×t_id+14×80×(f_id+N)+14×80×8×ul_carrier_id+14×80×8×2, wherein N is an integer greater than 31; or RNTI=1+s_id+14×t_id+14×80×f_id+14×80×8×ul_carrier_id+14×80×8×2+14×80×8×G, wherein G is an integer greater than 3; or RNTI=1+s_id+14×t_id+14×80×f_id+14×80×8×ul_carrier_id+14×80×8×4+14×80×8×2×UE _type, wherein a value of UE_type corresponding to a terminal device of the first device type is 1; or RNTI=1+s_id+14×t_id+14×80×f_id+14×80×8×ul_carrier_id+14×80×8×4+14×80×8×2×ser vice_type, wherein a value of service_type corresponding to a service of the first service type is 1, wherein f_id represents a frequency domain index of the first RO, and 0≤f_id<8; s_id represents an index of a first orthogonal frequency division multiplexing OFDM symbol of the first RO, and 0≤s_id<14; t_id represents an index of a first timeslot of the first RO, and 0≤t_id<80; and ul_carrier_id represents an uplink (UL) carrier for transmitting the random access preamble, and when the UL carrier is a normal uplink (NUL) carrier, ul_carrier_id is 0, or when the UL carrier is a supplementary uplink SUL carrier, ul_carrier_id is 1.

9. An apparatus comprising:

one or more processors;

one or more computer memory devices interoperably coupled with the one or more processors and having tangible, non-transitory, machine-readable media storing one or more instructions that, when executed by the one or more processors, cause the one or more processors to perform operations comprising:

sending a random access preamble to a network device on a first random access channel occasion (RO), wherein the first RO corresponds to at least one of a first device type or a first service type; and listening to a downlink control channel (PDCCH) scrambled by using a first radio network temporary identifier (RNTI) associated with the first RO; and the first RNTI is determined based on a second RNTI, the second RNTI is a value other than an RNTI associated with a second RO, and the second RO is an RO configured for at least one of a second device type or a second service type, wherein that the first RNTI is determined based on a second RNTI comprises: the first RNTI is determined based on the second RNTI and a third RNTI, and the third RNTI is an RNTI determined according to a calculation rule and based on the first RO.

10. The apparatus according to claim 9, wherein that the first RNTI is determined based on the second RNTI and a third RNTI comprises:

the first RNTI is a value of the second RNTI, and an index of the second RNTI corresponds to the third RNTI.

11. The apparatus according to claim 9, wherein that the first RNTI is determined based on the second RNTI and a third RNTI comprises:

the first RNTI is a value of the second RNTI, and an index of the second RNTI corresponds to an index of the third RNTI.

12. The apparatus according to claim 9, wherein the calculation rule of the third RNTI satisfies the following relationship:

RNTI=1+s_id+14×t_id+14×80×f_id+14×80×8×ul_carrier_id; or

RNTI=1+s_id+14×t_id+14×80×f_id+14×80×8×ul_carrier_id+14×80×8×2; or

RNTI=1+s_id+14×t_id+14×80×(f_id+N)+14×80×8×ul_carrier_id, wherein N is an integer greater than 47; or RNTI=1+s_id+14×t_id+14×80×f_id+14×80×8×ul_carrier_id+14×80×8×G, wherein G is an integer greater than 5; or RNTI=1+s_id+14×t_id+14×80×(f_id+N)+14×80×8×ul_carrier_id+14×80×8×2, wherein N is an integer greater than 31; or RNTI=1+s_id+14×t_id+14×80×f_id+14×80×8×ul_carrier_id+14×80×8×2+14×80×8×G, wherein G is an integer greater than 3; or RNTI=1+s_id+14×t_id+14×80×f_id+14×80×8×ul_carrier_id+14×80×8×4+14×80×8×2×UE_type, wherein a value of UE_type corresponding to a terminal device of the first device type is 1; or RNTI=1+s_id+14×t_id+14×80×f_id+14×80×8×ul_carrier_id+14×80×8×4+14×80×8×2×ser vice_type, wherein a value of service_type corresponding to a service of the first service type is 1, wherein f_id represents a frequency domain index of the first RO, and 0≤f_id<8; s_id represents an index of a first orthogonal frequency division multiplexing OFDM symbol of the first RO, and 0≤s_id<14; t_id represents an index of a first timeslot of the first RO, and 0≤t_id<80; and ul_carrier_id represents an uplink (UL) carrier for transmitting the random access preamble, and when the UL carrier is a normal uplink (NUL) carrier, ul_carrier_id is 0, or when the UL carrier is a supplementary uplink SUL carrier, ul_carrier_id is 1.

13. An apparatus comprising:

one or more processors;

one or more computer memory devices interoperably coupled with the one or more processors and having tangible, non-transitory, machine-readable media storing one or more instructions that, when executed by the one or more processors, cause the one or more processors to perform operations comprising:

receiving a random access preamble from a terminal device on a first random access channel occasion (RO), wherein the first RO corresponds to at least one of a first device type or a first service type; and sending, to the terminal device, a downlink control channel (PDCCH) scrambled by using a first radio network temporary identifier (RNTI) associated with the first RO; and the first RNTI is determined based on a second RNTI, the second RNTI is a value other than an RNTI associated with a second RO, and the second RO is an RO configured for at least one of a second device type or a second service type, wherein that the first RNTI is determined based on a second RNTI comprises: the first RNTI is determined based on the second RNTI and a third RNTI, and the third RNTI is an RNTI determined according to a calculation rule and based on the first RO.

14. The apparatus according to claim 13, wherein that the first RNTI is determined based on the second RNTI and a third RNTI comprises:

the first RNTI is a value of the second RNTI, and an index of the second RNTI corresponds to the third RNTI.

15. The apparatus according to claim 13, wherein that the first RNTI is determined based on the second RNTI and a third RNTI comprises:

the first RNTI is a value of the second RNTI, and an index of the second RNTI corresponds to an index of the third RNTI.

16. The apparatus according to claim 13, wherein the calculation rule of the third RNTI satisfies the following relationship:

RNTI=1+s_id+14×t_id+14×80×f_id+14×80×8×ul_carrier_id; or

RNTI=1+s_id+14×t_id+14×80×f_id+14×80×8×ul_carrier_id+14×80×8×2; or

RNTI=1+s_id+14×t_id+14×80×(f_id+N)+14×80×8×ul_carrier_id, wherein N is an integer greater than 47; or RNTI=1+s_id+14×t_id+14×80×f_id+14×80×8×ul_carrier_id+14×80×8×G, wherein G is an integer greater than 5; or RNTI=1+s_id+14×t_id+14×80×(f_id+N)+14×80×8×ul_carrier_id+14×80×8×2, wherein N is an integer greater than 31; or RNTI=1+s_id+14×t_id+14×80×f_id+14×80×8×ul_carrier_id+14×80×8×2+14×80×8×G, wherein G is an integer greater than 3; or RNTI=1+s_id+14×t_id+14×80×f_id+14×80×8×ul_carrier_id+14×80×8×4+14×80×8×2×UE_type, wherein a value of UE type corresponding to a terminal device of the first device type is 1; or RNTI=1+s_id+14×t_id+14×80×f_id+14×80×8×ul_carrier_id+14×80×8×4+14×80×8×2×ser vice_type, wherein a value of service_type corresponding to a service of the first service type is 1, wherein f_id represents a frequency domain index of the first RO, and 0≤f_id<8; s_id represents an index of a first orthogonal frequency division multiplexing OFDM symbol of the first RO, and 0≤s_id<14; t_id represents an index of a first timeslot of the first RO, and 0≤t_id<80; and ul_carrier_id represents an uplink (UL) carrier for transmitting the random access preamble, and when the UL carrier is a normal uplink (NUL) carrier, ul_carrier_id is 0, or when the UL carrier is a supplementary uplink SUL carrier, ul_carrier_id is 1.

* * * * *